(12) United States Patent
Frihauf et al.

(10) Patent No.: US 12,330,524 B2
(45) Date of Patent: Jun. 17, 2025

(54) SYSTEMS AND METHODS FOR HIGH VOLTAGE BATTERY CHARGING AND VERTIPORT OPERATIONS

(71) Applicant: Archer Aviation, Inc., San Jose, CA (US)

(72) Inventors: Paul Frihauf, San Jose, CA (US); Yalan Bi, San Francisco, CA (US)

(73) Assignee: Archer Aviation, Inc., San Jose, CA (US)

( * ) Notice: Subject to any disclaimer, the term of this patent is extended or adjusted under 35 U.S.C. 154(b) by 0 days.

(21) Appl. No.: 18/740,189

(22) Filed: Jun. 11, 2024

(65) Prior Publication Data

US 2024/0326629 A1 Oct. 3, 2024

Related U.S. Application Data

(63) Continuation of application No. PCT/US2024/029083, filed on May 13, 2024.
(Continued)

(51) Int. Cl.
*B60L 53/62* (2019.01)
*B60L 53/14* (2019.01)
(Continued)

(52) U.S. Cl.
CPC ............. *B60L 53/62* (2019.02); *B60L 53/14* (2019.02); *B60L 58/26* (2019.02); *B64F 1/35* (2024.01);
(Continued)

(58) Field of Classification Search
CPC .......... B60L 53/62; B60L 53/14; B60L 58/26; B60L 2200/10; B64F 1/35; H02J 7/0047; H02J 7/00714
(Continued)

(56) References Cited

U.S. PATENT DOCUMENTS

| 4,335,318 A * | 6/1982 | Mabuchi | ............... F02N 11/04 446/457 |
| 7,999,505 B2 * | 8/2011 | Bertness | ............. H02J 7/00036 320/155 |

(Continued)

FOREIGN PATENT DOCUMENTS

| AU | 2015249050 A1 * | 5/2016 | .......... H01M 10/441 |
| CN | 204905906 U | 12/2015 | |

(Continued)

OTHER PUBLICATIONS

Vratny et al., "Battery Pack Modeling Methods for Universally-Electric Aircraft," Conference Paper, Sep. 2013.
(Continued)

*Primary Examiner* — M Baye Diao
(74) *Attorney, Agent, or Firm* — Finnegan, Henderson, Farabow, Garrett & Dunner, LLP

(57) ABSTRACT

Aspects of the present disclosure generally relate to systems and methods for the configuration and control of charging and cooling systems for aircrafts driven by electric propulsion systems and in other types of vehicles. In some embodiments, a method of charging an aircraft is disclosed comprising: receiving a mode of operation indicating whether battery packs of the aircraft are connected in parallel prior to joining a charging bus, receiving charging protocol information, and controlling charging operations of the battery packs based on the mode of operation and the charging protocol information.

27 Claims, 26 Drawing Sheets

Related U.S. Application Data

(60) Provisional application No. 63/616,316, filed on Dec. 29, 2024, provisional application No. 63/590,729, filed on Oct. 16, 2023.

(51) Int. Cl.
  B60L 58/26 (2019.01)
  B64F 1/35 (2024.01)
  H02J 7/00 (2006.01)

(52) U.S. Cl.
  CPC ........ H02J 7/0047 (2013.01); H02J 7/00714 (2020.01); *B60L 2200/10* (2013.01)

(58) Field of Classification Search
  USPC ........................................................ 320/109
  See application file for complete search history.

(56) References Cited

U.S. PATENT DOCUMENTS

| | | | |
|---|---|---|---|
| 8,022,666 B2 * | 9/2011 | Li ........................ B60L 50/64 | 187/217 |
| 9,960,612 B2 * | 5/2018 | Ono ........................ B60L 55/00 | |
| 10,071,641 B2 | 9/2018 | Ricci | |
| 10,263,435 B2 | 4/2019 | Kim et al. | |
| 10,830,827 B2 * | 11/2020 | Karner ................ G01R 31/374 | |
| 10,894,484 B2 * | 1/2021 | Han ........................ B60L 53/67 | |
| 10,960,785 B2 | 3/2021 | Mllanueva et al. | |
| 11,145,211 B2 | 10/2021 | Goel et al. | |
| 11,207,999 B2 * | 12/2021 | Wei ........................ H01M 10/44 | |
| 11,328,611 B2 | 5/2022 | Shannon | |
| 11,349,324 B2 | 5/2022 | Maeda et al. | |
| 11,373,543 B1 | 6/2022 | Moeykens | |
| 11,476,676 B1 * | 10/2022 | Lohe ........................ B60L 58/21 | |
| 11,552,491 B2 | 1/2023 | Lim | |
| 11,563,338 B1 | 1/2023 | Ambroziak et al. | |
| 11,605,964 B1 * | 3/2023 | Palombini .......... H02J 7/00032 | |
| 11,618,337 B1 | 4/2023 | Palombini | |
| 11,628,746 B1 | 4/2023 | Pill et al. | |
| 11,631,979 B2 * | 4/2023 | Takahashi ............ G05D 1/0225 | 320/109 |
| 11,643,205 B2 * | 5/2023 | Augugliaro ............ B64U 30/20 | 244/114 R |
| 11,685,550 B1 * | 6/2023 | Pill ........................ B60L 53/16 | 320/109 |
| 11,823,583 B2 | 11/2023 | Moeykens | |
| 12,012,229 B2 * | 6/2024 | Villa ........................ B60L 53/65 | |
| 2004/0044452 A1 * | 3/2004 | Bauer ........................ B60L 53/65 | 701/31.4 |
| 2018/0026457 A1 | 1/2018 | Delevski | |
| 2019/0033384 A1 * | 1/2019 | Karner ................ G06F 3/0482 | |
| 2019/0222037 A1 * | 7/2019 | Sherstyuk ............ H02J 7/0047 | |
| 2020/0189402 A1 * | 6/2020 | Tannhäuser ............ B60L 50/60 | |
| 2021/0226267 A1 | 7/2021 | Books et al. | |
| 2021/0284357 A1 | 9/2021 | Villa et al. | |
| 2022/0036740 A1 | 2/2022 | Goel et al. | |
| 2022/0122467 A1 | 4/2022 | Goel et al. | |
| 2022/0208010 A1 | 6/2022 | Villa et al. | |
| 2022/0285758 A1 | 9/2022 | Ziegler | |
| 2022/0285762 A1 | 9/2022 | Ziegler | |
| 2022/0412023 A1 | 12/2022 | Palombini | |
| 2023/0133875 A1 | 5/2023 | Wang | |
| 2023/0169873 A1 | 6/2023 | Tanaka | |
| 2023/0198271 A1 | 6/2023 | Gong | |
| 2023/0299601 A1 | 9/2023 | Tedjarati et al. | |
| 2023/0302960 A1 | 9/2023 | Wiegman | |
| 2023/0347776 A1 | 11/2023 | Mclachlan et al. | |
| 2023/0411980 A1 | 12/2023 | Yamazi | |
| 2024/0051679 A1 | 2/2024 | Bosson et al. | |
| 2024/0054903 A1 | 2/2024 | Mollahan et al. | |
| 2024/0078916 A1 | 3/2024 | Chase et al. | |

FOREIGN PATENT DOCUMENTS

| | | | | |
|---|---|---|---|---|
| CN | 106712202 A | | 5/2017 | |
| CN | 110001430 B | * | 11/2020 | ............. B60L 53/16 |
| CN | 115603351 A | | 1/2023 | |
| CN | 116231796 A | | 6/2023 | |
| EP | 4155208 A1 | | 3/2023 | |
| EP | 4231495 A1 | * | 8/2023 | ............ B60L 15/007 |
| WO | WO-2022192396 A1 | * | 9/2022 | ........... H01M 10/425 |

OTHER PUBLICATIONS

Ouyang et al., "User-Involved Optimal Charging Control for Lithium-Ion Batteries," Conference Paper, Mar. 2019.
Invitation to Pay Additional Fees in International PCT Application No. PCT/US2024/029083, mailed Jan. 22, 2025. 10 pages.

* cited by examiner

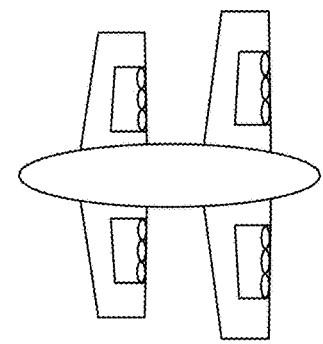
FIG. 2C
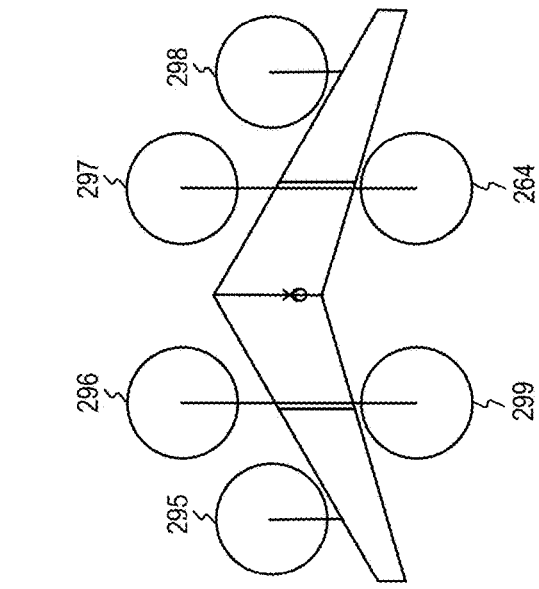
FIG. 2F
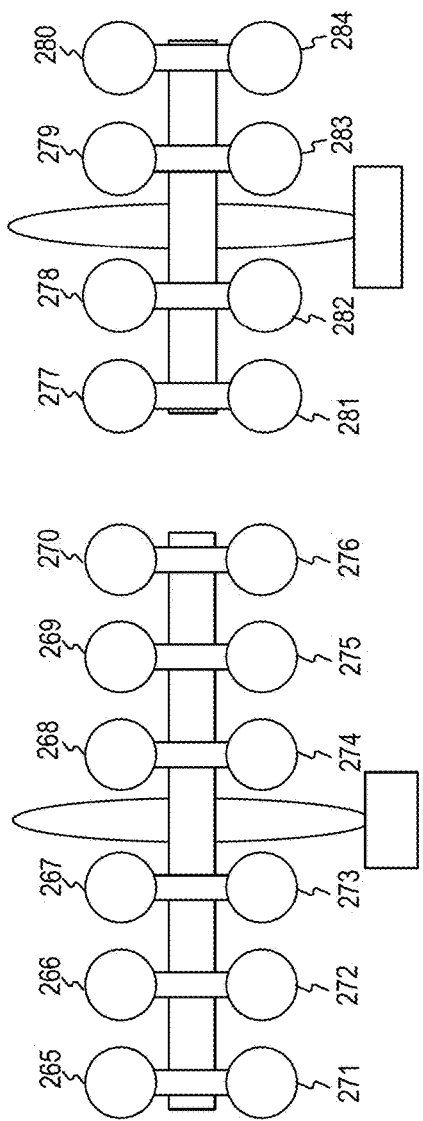
FIG. 2B
FIG. 2A
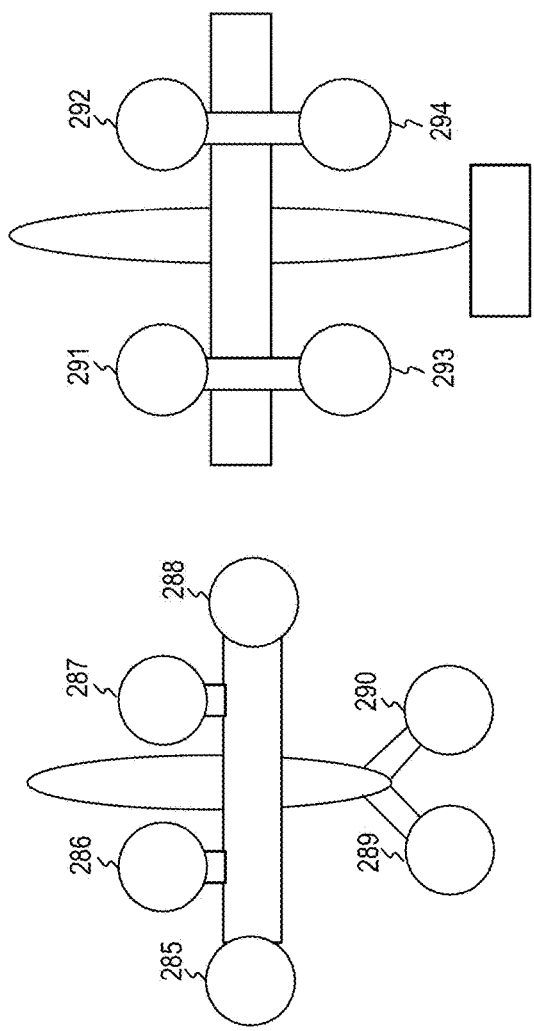
FIG. 2E
FIG. 2D

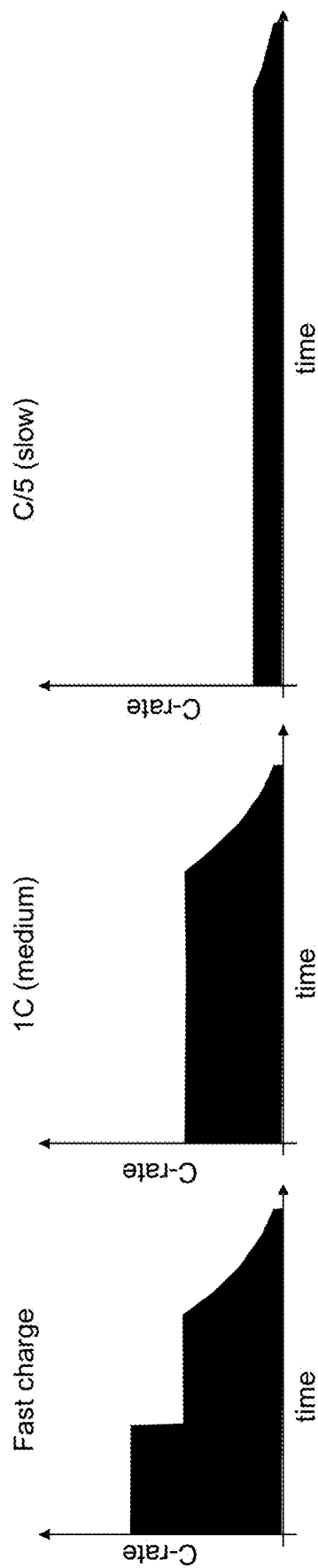

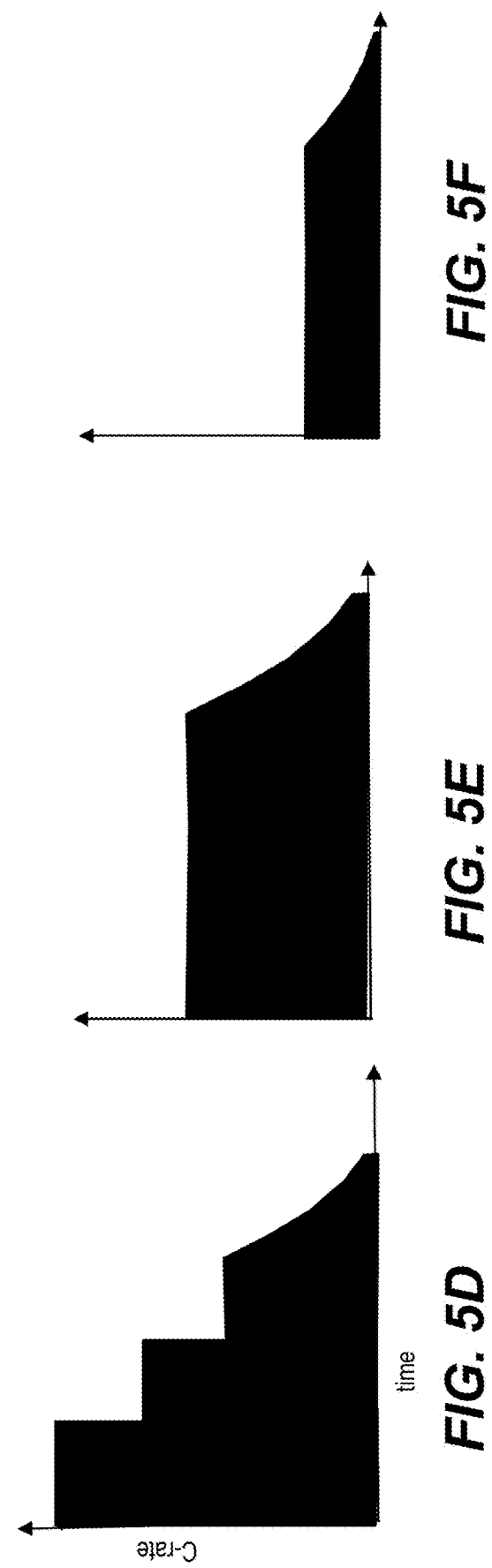

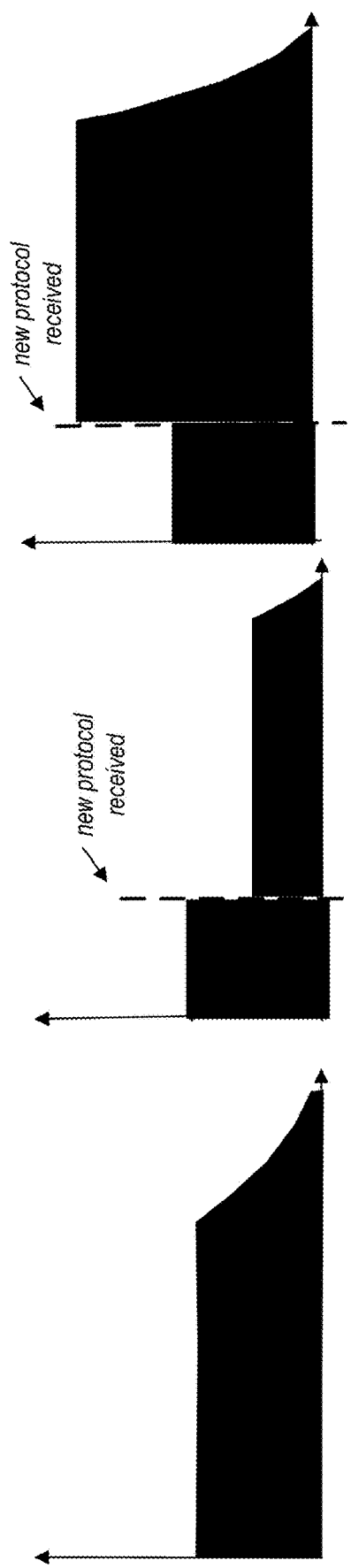

SYSTEMS AND METHODS FOR HIGH VOLTAGE BATTERY CHARGING AND VERTIPORT OPERATIONS

CROSS-REFERENCE TO RELATED APPLICATIONS

This application claims priority to U.S. Provisional Application No. 63/616,316 filed Dec. 29, 2023, titled "Battery Management System," to U.S. Provisional Application No. 63/590,729 filed Oct. 16, 2023, titled "Systems and Methods for Charging and Cooling of eVTOL Aircraft," and to PCT Application PCT/US23/79690 filed Nov. 14, 2023, titled "High Voltage Battery Architecture" which in turn claims priority to and the benefit of U.S. Provisional Application No. 63/383,660, filed Nov. 14, 2022, titled "Systems and Methods for Improved Battery Assemblies for eVTOL Aircraft." The entire contents of the aforementioned applications are incorporated by reference herein for all purposes.

TECHNICAL FIELD

This disclosure relates generally to the field of powered aerial vehicles. More particularly, and without limitation, the present disclosure relates to innovations in aircraft that use electrical propulsion systems. Certain aspects of the present disclosure generally relate to configuration and control of charging and cooling systems for electric aircrafts.

BACKGROUND

The inventors here have recognized several problems associated with charging an electric or hybrid-electric aircraft. Electric or hybrid-electric aircraft battery packs must be sufficiently charged to safely support the aircraft's thrust requirements. However, charging individual battery packs can be time consuming and require significant ground charging infrastructure. Therefore, there is a need to control charging and cooling to multiple battery packs in consideration of battery pack constraints, charging infrastructure constraints, and vertiport operation constraints.

SUMMARY

The present disclosure generally relates to a charging system for an aircraft. More particularly, and without limitation, the present disclosure relates to a system that controls charging and cooling operations across multiple aircrafts at a vertiport. Further, the disclosure relates to a system that controls charging and cooling to multiple battery packs in consideration of battery pack constraints, charging infrastructure constraints, and vertiport operation constraints.

One aspect of the present disclosure is directed to a method of charging an aircraft, the method comprising: receiving a mode of operation indicating whether battery packs of the aircraft are connected in parallel prior to joining a charging bus, receiving charging protocol information, and controlling charging operations of the battery packs based on the mode of operation and the charging protocol information.

Another aspect of the present disclosure is directed to a charging control system of the aircraft, comprising: a communication connection to a ground charging station, a first user input device on a fuselage of the aircraft, a second user input device in a pilot cockpit of the aircraft, and a control unit mounted in the aircraft and in communication with a battery management system within the aircraft, the ground charging station, and the first and second user input devices. The control unit is configured to control charging commands to the ground charging station based on information received from the battery management system, the ground charging station, the first user input device, and the second user input device.

Another aspect of the present disclosure is directed to a method for charging control coordination, comprising: receiving an indication of a battery state associated with a battery aboard a first aircraft, receiving flight plan data associated with the first aircraft, determining one or more electric charging parameters for the first aircraft based on the received indication and the flight plan data, and charging the battery according to the one or more determined electric charging parameters.

A further aspect of the present disclosure is directed to a method for aircraft thermal conditioning control coordination, comprising: receiving an indication of a battery state associated with a battery aboard a first aircraft, receiving flight plan data associated with the first aircraft, determining one or more cooling parameters for the first aircraft based on the received indication and the flight plan data, and thermally regulating the battery according to the one or more determined cooling parameters.

BRIEF DESCRIPTIONS OF FIGURES

FIG. 1 illustrates an example electric aircraft, consistent with disclosed embodiments.

FIGS. 2A, 2B, 2C, 2D, 2E, and 2F illustrate exemplary top plan views of aircraft, consistent with the disclosed embodiments.

FIGS. 5A, 5B, 5C, 5D, 5E, and 5F illustrate charging protocols, consistent with the disclosed embodiments.

FIGS. 5G, 5H, and 5I illustrate how a charging protocol may change during charging, consistent with the disclosed embodiments.

Figure 6:
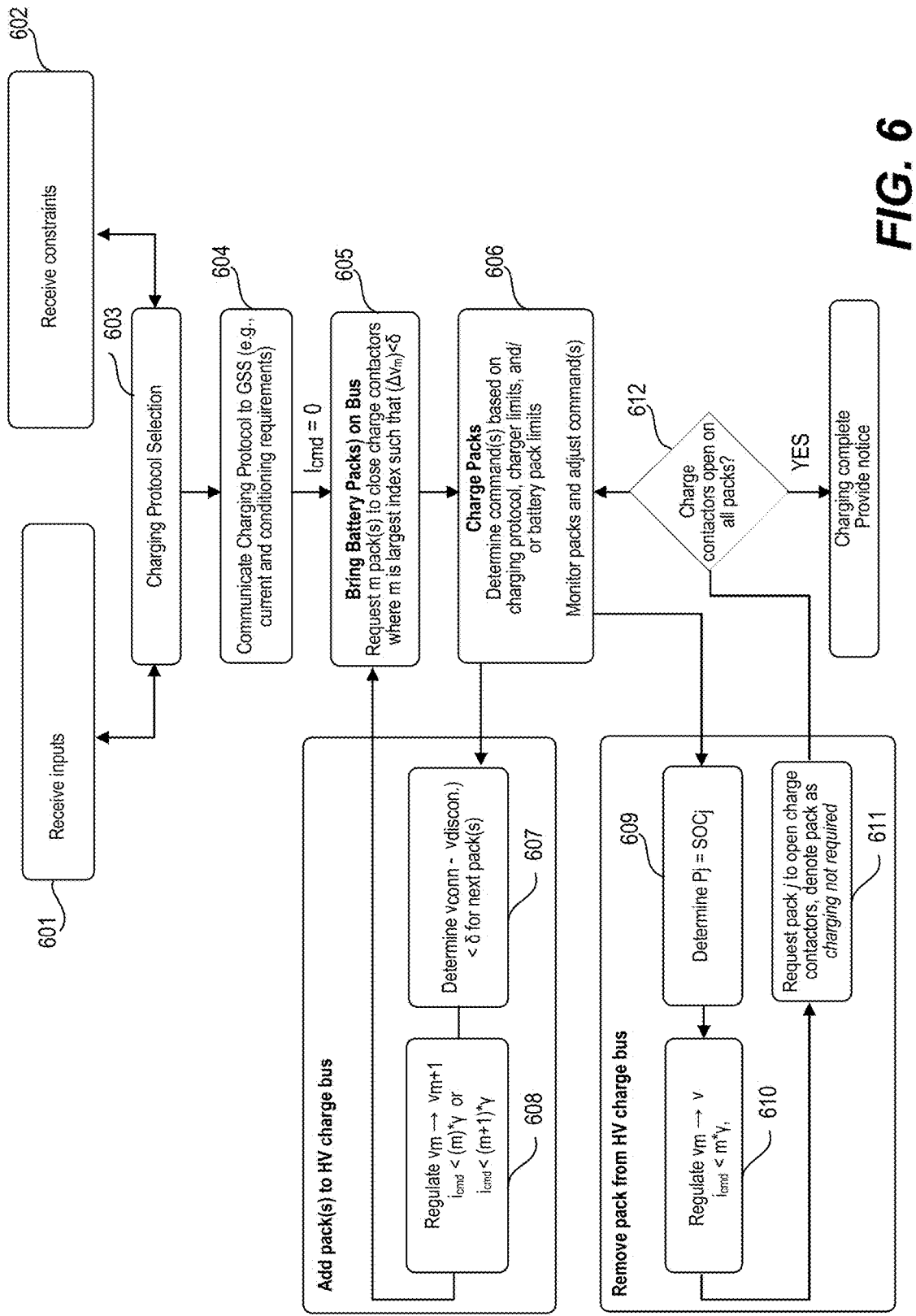

FIG. 6 illustrates a charging control sequence, consistent with the disclosed embodiments.

FIGS. 7A, 7B, 7C, 7D, 7E, 7F, and 7G illustrate examples of charging regulation, consistent with the disclosed embodiments.

Figure 8A:
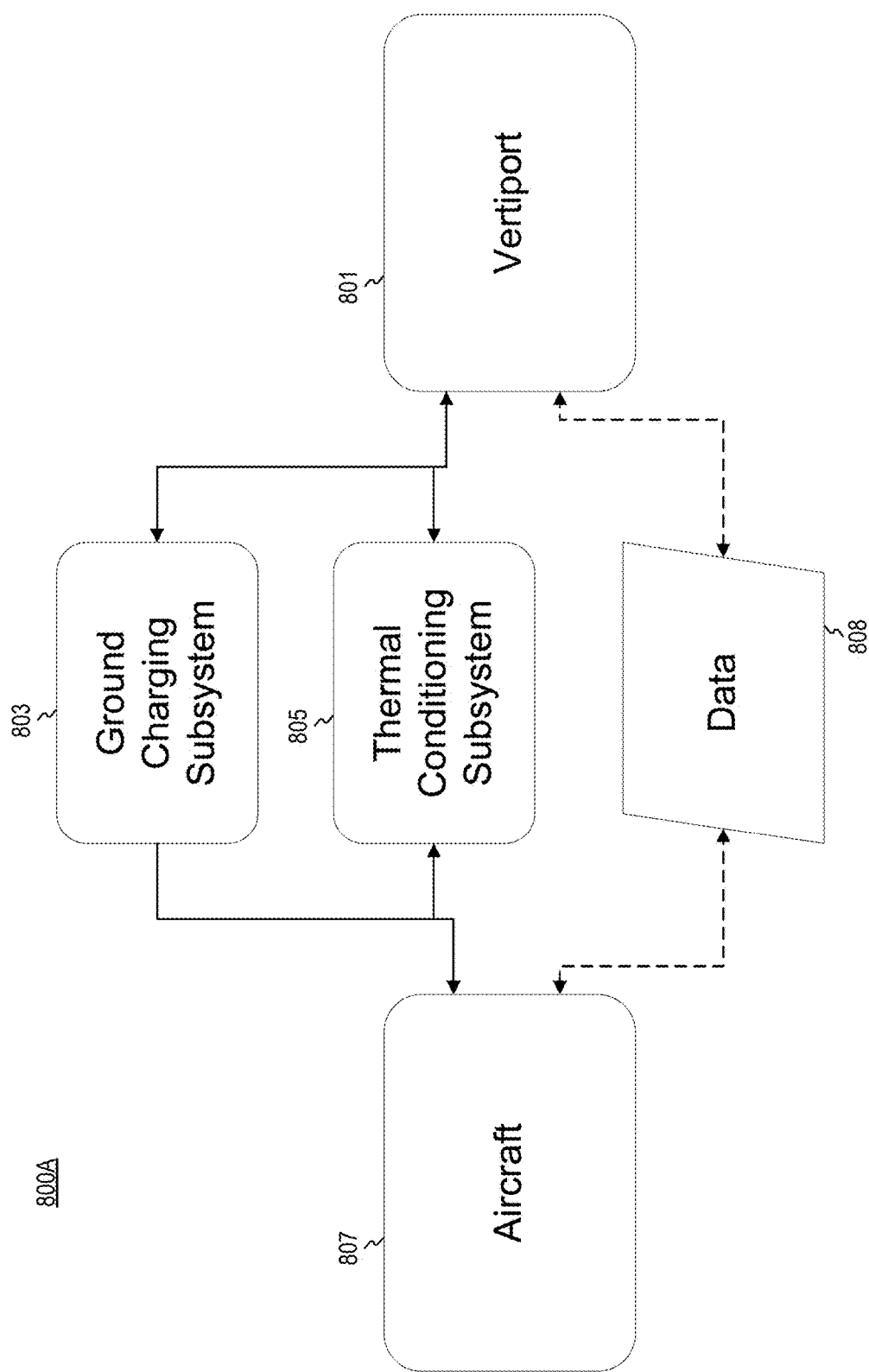
Figure 8B:
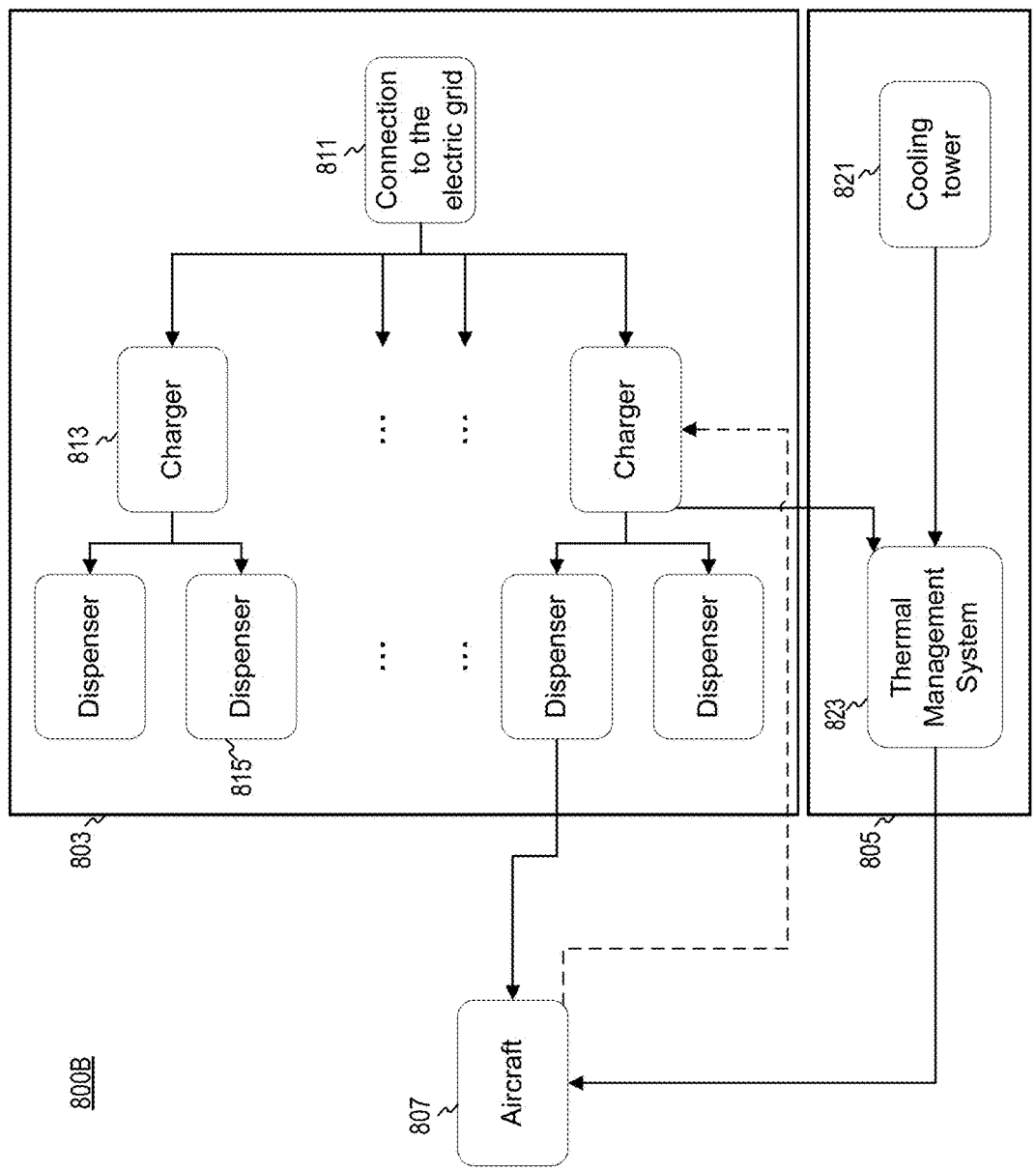

FIGS. 8A-8B illustrate a block diagram of an exemplary of a charging and cooling system for an aircraft, consistent with disclosed embodiments.

Figure 9:
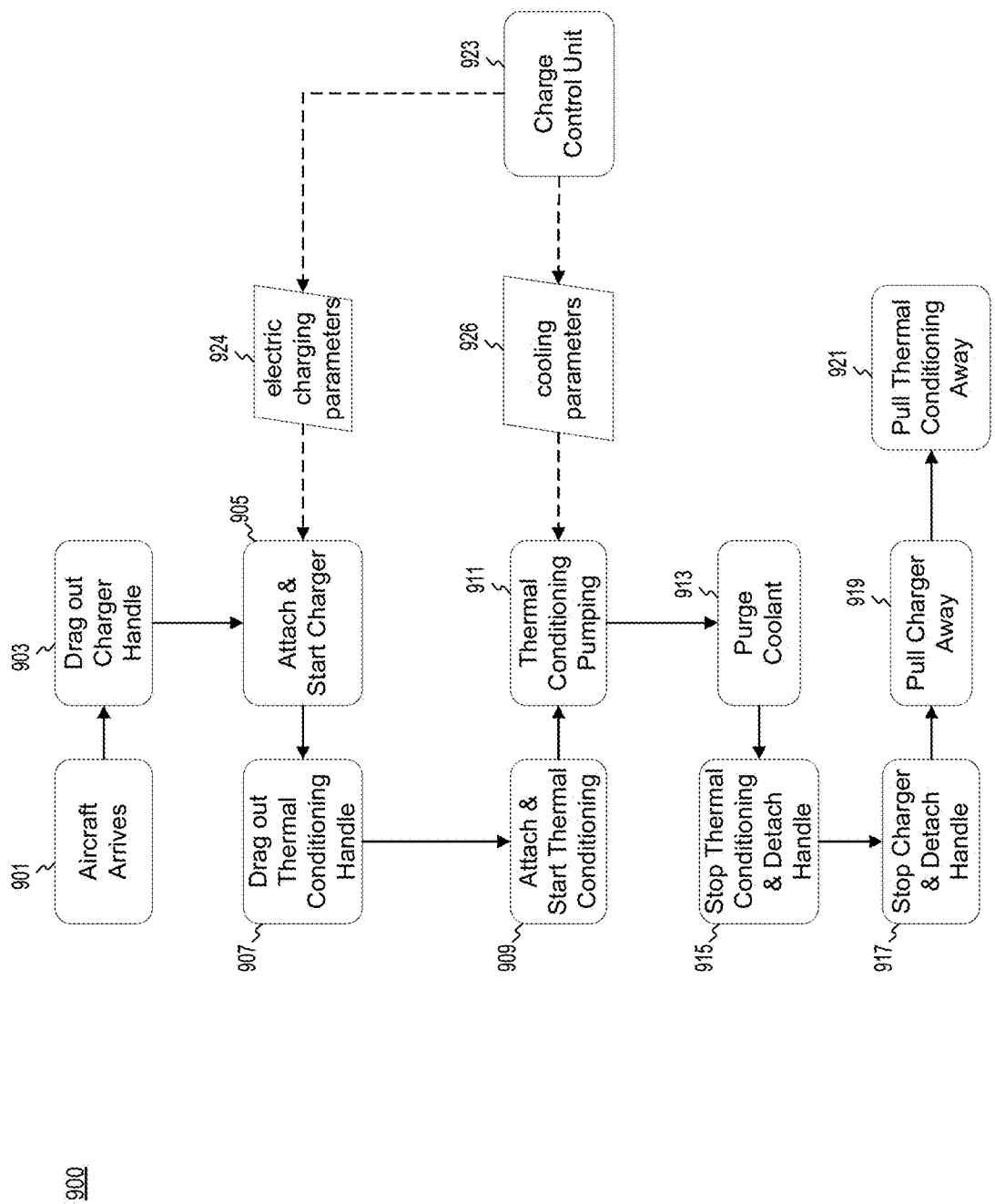

FIG. 9 illustrates a flow diagram of an exemplary charging and cooling process, consistent with disclosed embodiments.

Figure 10:
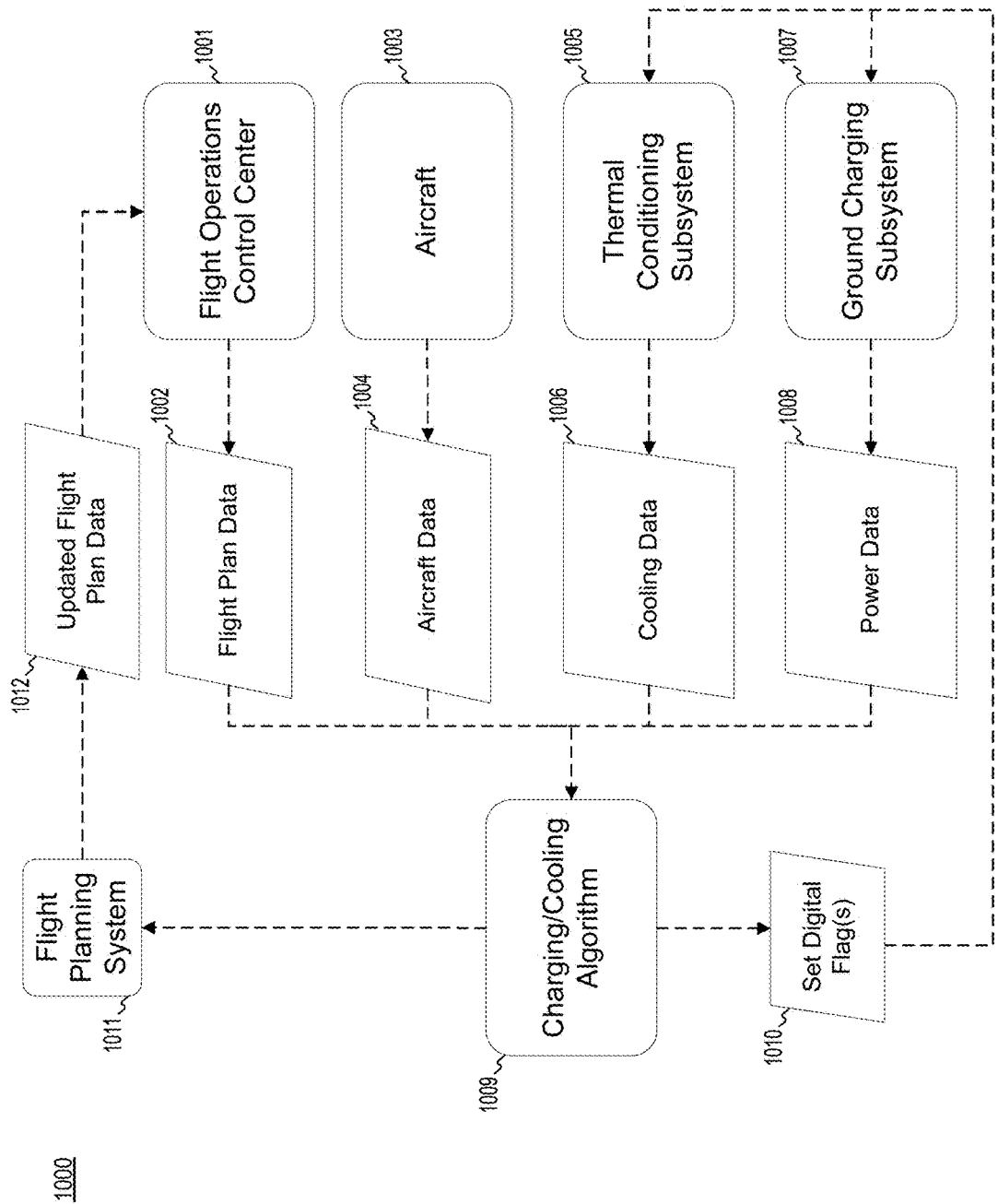

FIG. 10 illustrates a block diagram of an exemplary charging and cooling system, consistent with disclosed embodiments.

Figure 11:
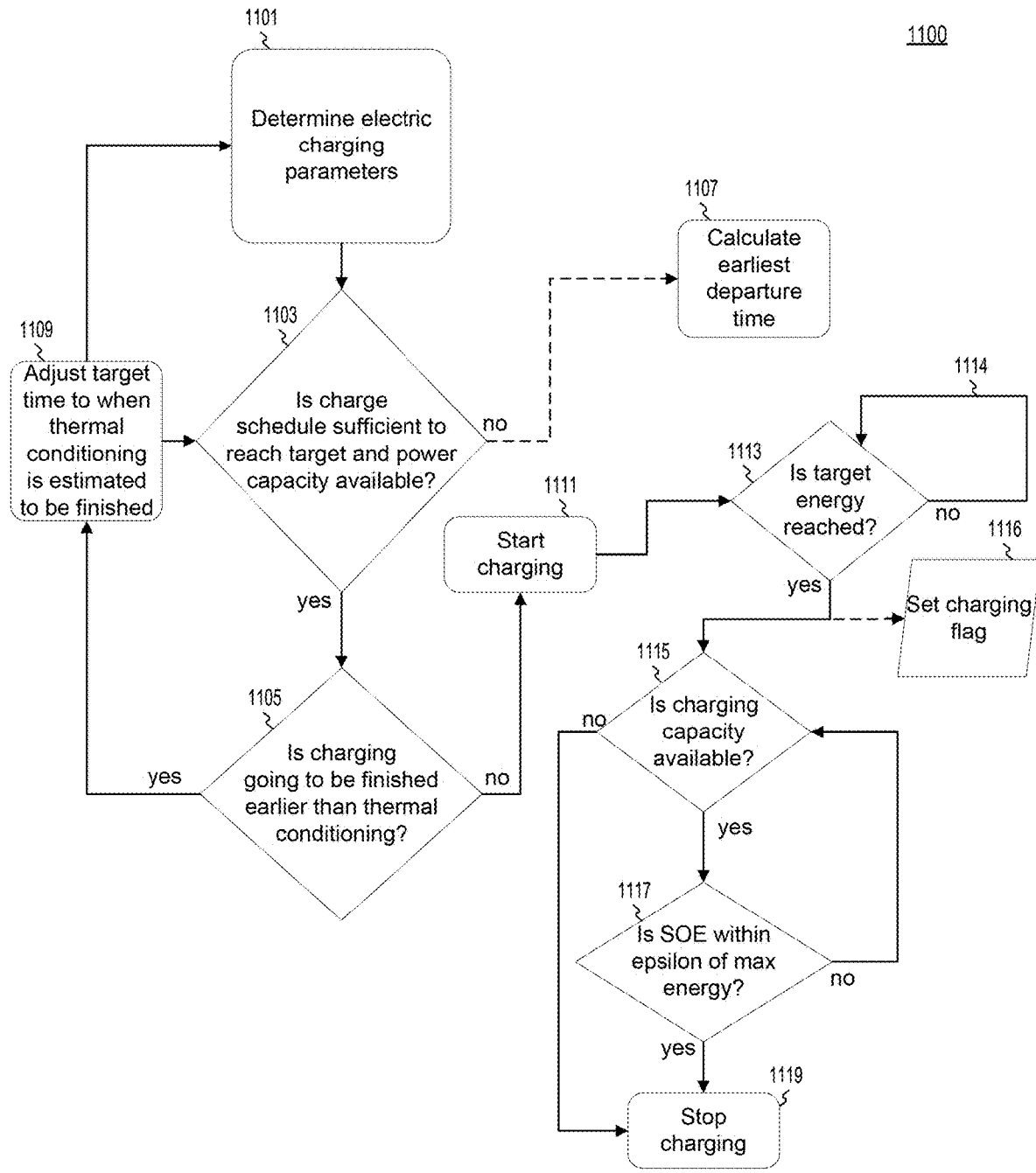

FIG. 11 illustrates a flow diagram of an exemplary charging process, consistent with disclosed embodiments.

Figure 12:
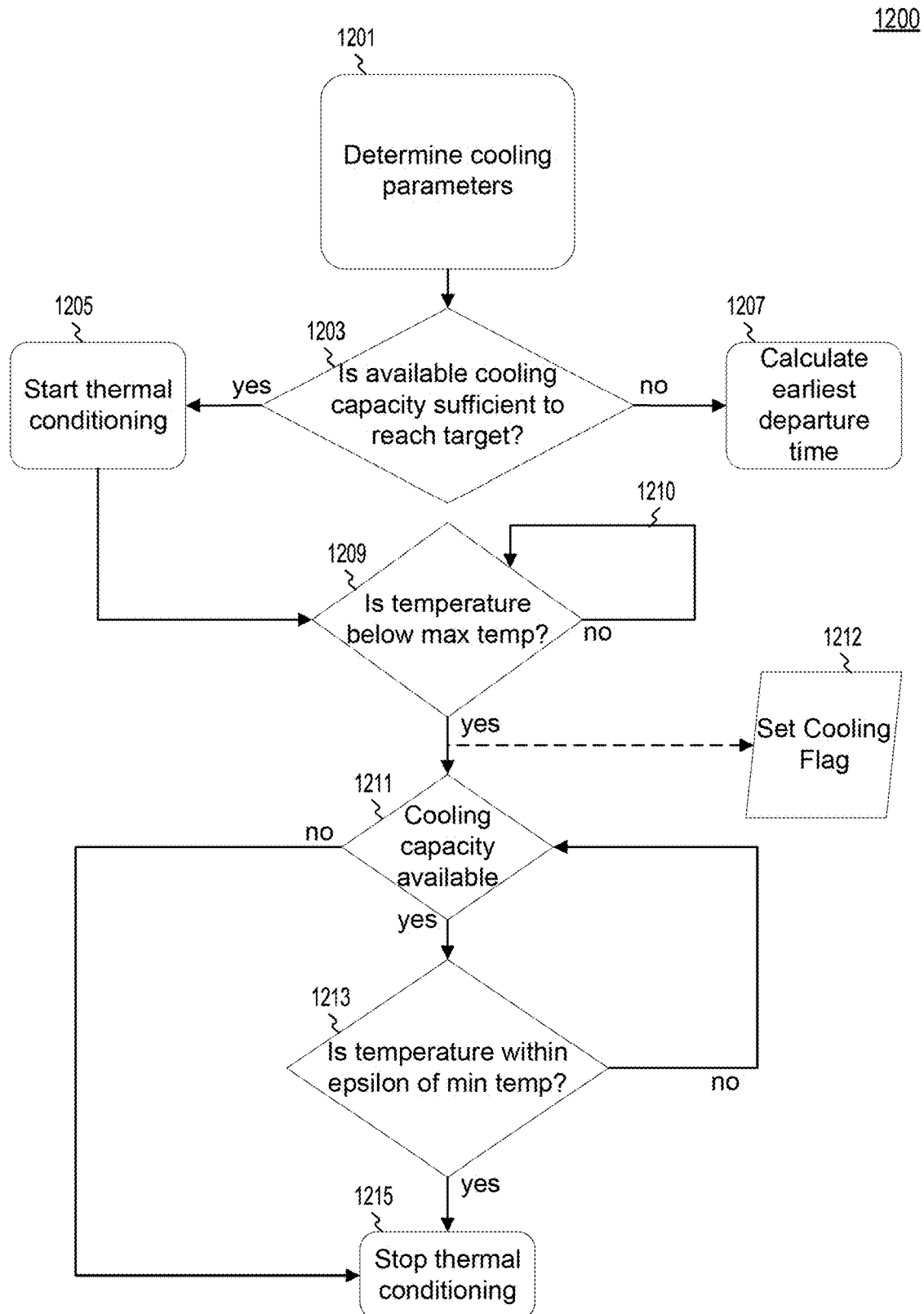

FIG. 12 illustrates a flow diagram of an exemplary cooling process, consistent with disclosed embodiments.

Figure 13:
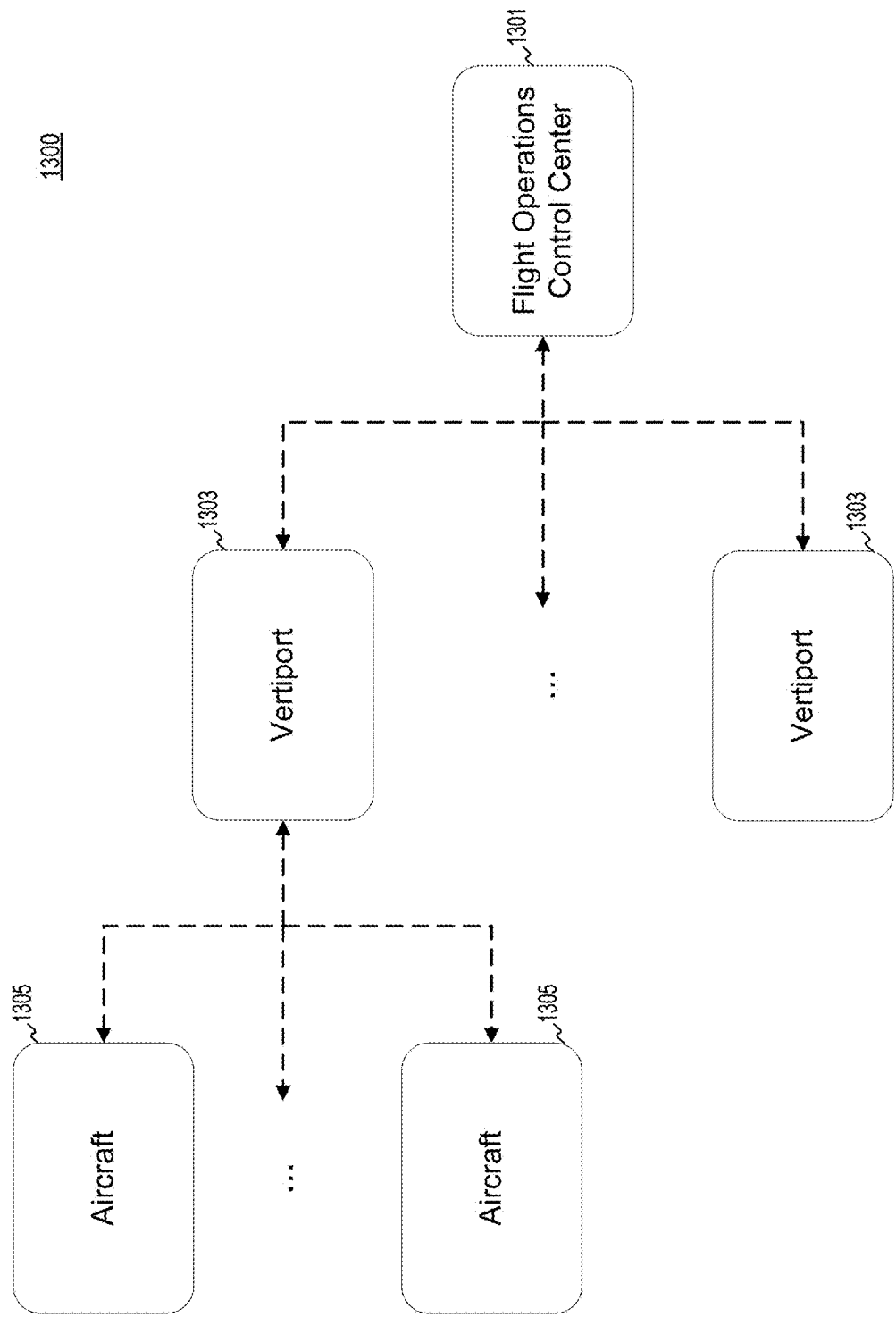

FIG. 13 illustrates a block diagram of an exemplary charging and cooling system network, consistent with disclosed embodiments.

DETAILED DESCRIPTION

The present disclosure addresses a charging system for an electric or hybrid-electric aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven by one or more electric propulsion systems (hereinafter referred to as electric propulsion units or "EPUs"). In some embodiments, the aircraft may comprise an electric aircraft using an electric-based energy source. In some embodiments, the aircraft may comprise a hybrid aircraft using at least one of an electric-based energy source or a fuel-based energy source to power the distributed propulsion system. The aircraft may share (e.g., charge at) a vertiport with other aircrafts and the charging system prioritizes and manages the requirements of each aircraft at the vertiport. Further, the charging system considers the battery pack constraints and the charging infrastructure constraints. The charging system determines and re-determines charging commands to meet these constraints and performs continuous monitoring to ensure charging is performed in a manner that maintains the integrity of the charging infrastructure and battery pack components.

Figure 1:
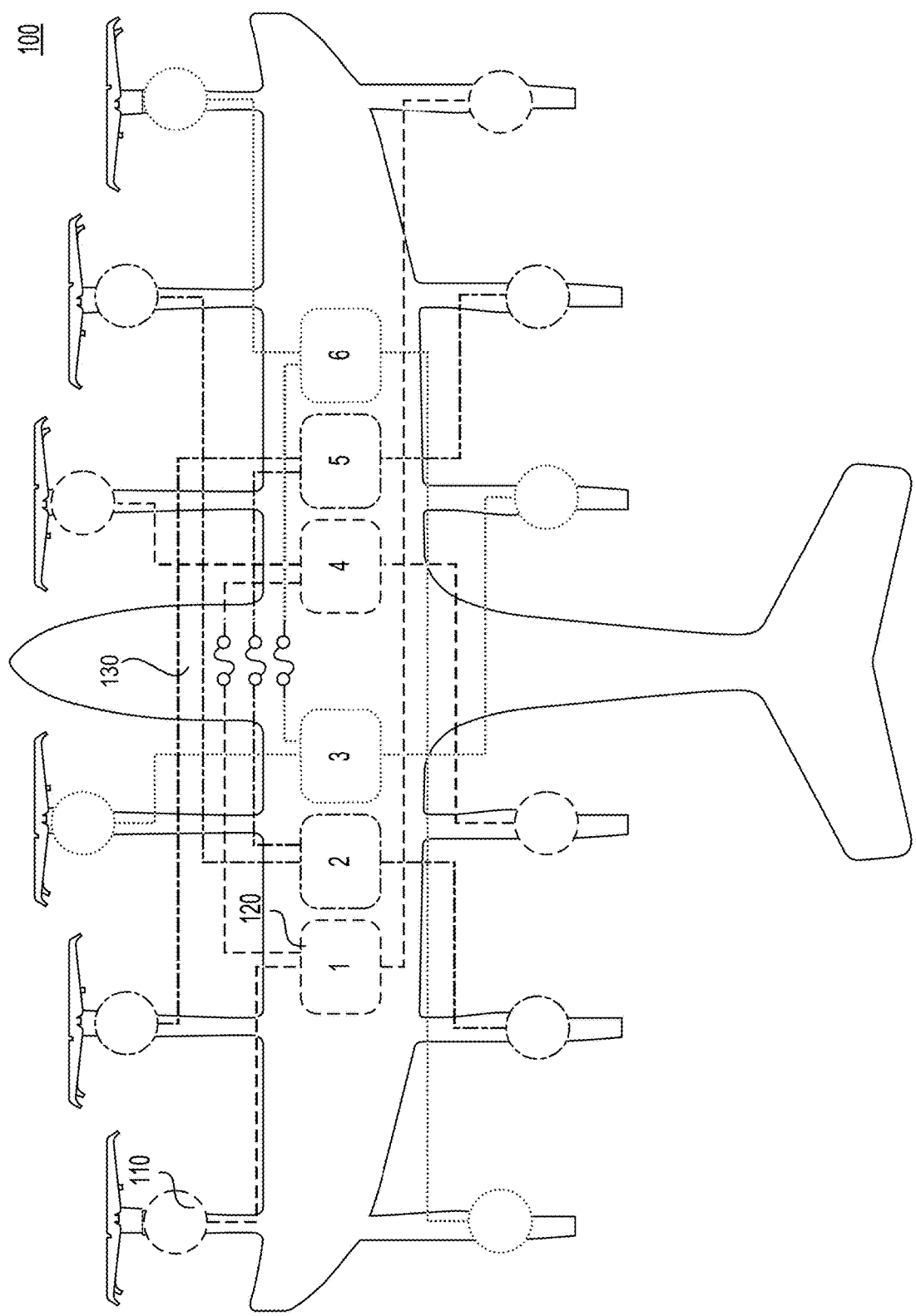

FIG. 1 illustrates an example electric aircraft (e.g., an eVTOL aircraft), consistent with the disclosed embodiments. As shown in FIG. 1, in some embodiments, the distributed electrical propulsion system of the eVTOL aircraft 100 may include twelve electric engines 110, which may be mounted on booms forward and aft of the main wings of the aircraft 100. The forward electric engines 110 may be tiltable mid-flight between a horizontally oriented position (e.g., to generate forward thrust) and a vertically oriented position (e.g., to generate vertical thrust). The forward electric engines 110 may be of a clockwise type or counterclockwise type in terms of direction of propeller rotation. The aft electric engines 110 may be fixed in a vertically oriented position (e.g., to generate vertical thrust), and may also be of a clockwise type or counterclockwise type in terms of direction of propeller rotation. As used herein, the term "eVTOL" or "electric aircraft" may refer to an aircraft that uses at least one electric-based energy source and may include fully electric aircraft as well as hybrid-electric aircraft.

The aircraft 100 may possess various combinations of forward and aft electric engines 110. For example, in some embodiments, the aircraft 100 may possess six forward electric engines 110 and six aft electric engines 110. In some other embodiments, the aircraft 100 may include four forward electric engines 110 and four aft electric engines 110, or any other combination of forward and aft engines 110. In some other embodiments, the number of forward electric engines and aft electric engines are not equivalent.

In some embodiments, for a vertical takeoff and landing (VTOL) mission, the forward electric engines 110 as well as aft electric engines 110 may provide vertical thrust during takeoff and landing. During flight phases where the aircraft 100 is in forward flight, the forward electric engines 110 may provide forward thrust (e.g., in a horizontal direction), while the propellers of the aft electric engines 110 may be stowed at a fixed position in order to minimize drag. The aft electric engines 110 may be actively stowed with position monitoring.

In some embodiments, in a conventional takeoff and landing (CTOL) mission, the forward electric engines 110 may provide forward thrust for wing-borne take-off, cruise, and landing. In some embodiments, the aft electric engines 110 may not be used for generating thrust during a CTOL mission and the aft propellers may be stowed in place.

Transition from vertical flight to forward flight and vice-versa may be accomplished via the tilt propeller subsystem. The tilt propeller subsystem may redirect thrust between a primarily vertical direction during vertical flight phase to a mostly horizontal direction during forward-flight phase. A variable pitch mechanism may change the forward electric engine's propeller-hub assembly blade collective angles for operation during the hover-phase, transition phase, and cruise-phase.

The flight controls may include an integrated fly-by-wire system that features envelope protection and structural load limiting functions. The aircraft 100 will be equipped with advanced cockpit avionics, a flight management system, and the sensors necessary to support the intended operations and system functions.

In some embodiments, the aircraft 100 includes a high voltage power supply (HVPS) system to supply the High Voltage (HV) electric power. The HVPS system is the source of power on the aircraft 100 and configured to distribute the stored electrical energy to other systems on the aircraft 100, including the electrical propulsion system (EPS) for converting electrical power into mechanical rotational shaft power to generate thrust. In some embodiments, the electrical propulsion system (EPS) may generate thrust by supplying High Voltage (HV) electric power to the electric engine 110, which in turn converts HV power into mechanical shaft power which is used to rotate a propeller. The amount of thrust each electric engine 110 generates may be governed by a torque command from the Flight Control System (FCS) over a digital communication interface to each electric engine 110.

As shown in FIG. 1, the HVPS system of the aircraft 100 may include six battery packs 120 (which are numbered 1-6 from left to right) installed within the battery bays in the wing of the aircraft 100. In some embodiments, six battery packs 120 may have an identical design to simplify the design, manufacturing, and logistics. The battery packs 120 may power one or more electric engines 110. While six battery packs 120 are shown, the aircraft 100 may have any number of battery packs 120.

In some embodiments, a single battery pack 120 may be electrically connected to, and power, multiple electric engines 110. For example, in some embodiments, a battery pack 120 may power an electric engine 110 on either side of a longitudinal axis running through the center of the aircraft. In some embodiments a battery pack 120 may power an electric engine 110 on either side of a horizontal axis running through the wing. In some embodiments, as shown in FIG. 1, a battery pack 120 may power two diagonally opposing electric engines 110. Therefore, upon a loss of a battery pack 120, the impact to roll or pitch moments can be reduced because the loss of lift is balanced. In some embodiments, battery packs 120 may power different arrangements of electric engines 110 to reduce roll, pitch, or yaw moments that may be caused by a loss of the battery pack 120. For example, in some embodiments, battery packs 120 may be connected to electric engines 110 in any manner that balances lift and/or forward thrust across the longitudinal and horizontal axis of the aircraft.

Further, the HVPS system includes a cross-link 130 possessing at least one fuse allowing for pairing of two or more battery packs 120. Through the cross-link, power for the electric engines 110 can be shared among the paired battery packs 120. Therefore, multiple battery packs 120 can simultaneously power multiple electric engines 110. This arrangement provides for redundancy and avoids a single point of failure because each paired battery 120 may act as a backup for the other(s). Upon failure of a battery pack 120, one or more connected battery packs 120 may continue powering the failed battery pack's connected electric engines 110. While in the embodiment shown in FIG. 1 electric engines 110 are shown, in other embodiments other types of electric propulsion units may be employed (e.g., fans, turbines, gas engines etc.).

The above aircraft and battery pack configurations are provided as examples, but the aircraft may include a different configuration of electric propulsion units (e.g., as shown below with reference to FIGS. 2A-2F), battery packs, battery pack connections, and battery pack cross link combinations. In some embodiments, each battery pack may power an individual electric propulsion unit (e.g., electric engine). For example, an aircraft may have four, six, eight, ten, twelve, or any number of electric propulsion units and the number of battery packs may match the number of electric propulsion units. In some embodiments, each battery pack may power only one electric propulsion unit and may be electrically separate from all other battery packs. In some embodiments, each battery pack may power one or more partial motors and each electric propulsion unit (e.g., electric engine) may include two or more partial motors. Therefore, each electric propulsion unit may have a backup power source, but the battery packs may still be electrically separate.

In some embodiments, each battery pack may power multiple electric propulsion units (e.g., electric engines). As described above, battery packs may power sets of electric engines that are symmetrical across one or more axes of symmetry. In some embodiments, a battery pack may power electric propulsion units (e.g., electric engines) that are symmetrical across an aircraft's longitudinal axis, lateral axis, or both. For example, as described above, in some embodiments, different battery packs may power diagonally symmetric electric propulsion units (e.g., electric engines).

In some embodiments, a battery pack may power more than two electric propulsion units (e.g., electric engines). In some embodiments, a battery pack 120 may power two or more sets of diagonally symmetric electric propulsion units. In some embodiments, the set of electric engines powered by a battery pack may include an inboard diagonally symmetric pair of electric propulsion units and an outboard diagonally symmetric pair of electric propulsion units (e.g., electric engines). In some embodiments, a battery pack may power four or more electric propulsion units (e.g., electric engines) in a configuration that is symmetrical across the longitudinal axis of symmetry.

In some embodiments, some or all of the battery packs are interconnected. As described above, a cross-link may allow each battery pack to act as backup power for another. For example, in some embodiments, a first battery pack may directly power a first number electric propulsion units (e.g., electric engines) and a second battery pack may directly power a second number of electric propulsion units (e.g., electric engines). The first and second battery packs may be cross-linked together to form a battery pack unit. Therefore, each battery pack in the unit may act as a backup for the other. Upon failure of a battery pack in the unit, the failing battery pack may be disconnected and electric propulsion units (e.g., electric engines) will be powered by one or more non-failing battery packs in the unit. The battery packs in a battery pack unit may be electrically separate from other battery pack units.

In some embodiments, a battery pack unit may comprise three battery packs, wherein each battery pack powers a number of electric propulsion units (e.g., electric engines). For example, in some embodiments, each battery pack may power two diagonally symmetric electric engines. Therefore, each battery pack unit may power a total of six electric engines and each electric engine has two battery pack backups. In some embodiments, each battery pack in the battery pack unit may power four electric engines, comprising two sets of diagonally symmetric electric engines. Therefore, each battery pack unit may power a total of twelve electric engines and each electric engine has two battery pack backups.

In some embodiments, a battery pack unit may comprise four battery packs, wherein each battery pack powers a number of electric propulsion units (e.g., electric engines). For example, in some embodiments, each battery pack may power two diagonally symmetric electric engines. Therefore, each battery pack unit may power a total of eight electric engines and each electric engine has three battery pack backups. In other embodiments, each battery pack in the battery pack unit may power four electric engines, comprising two sets of diagonally symmetric electric engines. Therefore, each battery pack unit may power sixteen electric engines and each electric engine has three battery pack backups.

In some embodiments, all battery packs are connected to a common bus. In some embodiments, the common bus may form a circular power supply, providing for additional redundancy in connections, while in other embodiments the common bus may not form a circular power supply.

In some embodiments, electric engines comprise a single motor that is powered by the one or more battery packs. In some embodiments, each electric engine may include two or more partial motors and the battery packs may power partial motors. In some embodiments, any of the electric engine powering configurations described above may include powering partial motor(s) of battery pack(s).

Different configurations of battery packs, electric propulsion units (e.g., electric engines), battery pack to electric propulsion unit connections, and battery pack cross link combinations may be chosen to best balance aircraft power needs, system redundancy, and fault tolerance. As described below, in some embodiments, the low voltage cut loop routing, bundling, and/or spacing is configured based on the arrangement of battery packs and/or the battery pack cross link combinations. Further, as described below, battery pack disconnect(s) following an emergency response may be based on the arrangement of battery packs and/or the battery pack cross link combinations.

FIGS. 2A, 2B, 2C, 2D, 2E, and 2F illustrate exemplary top plan views of aircraft, consistent with the disclosed embodiments.

FIGS. 2A-2F are illustrations of a top plan view of exemplary aircrafts, consistent with the disclosed embodiments. There may be a number of design considerations (cost, weight, size, performance capability etc.) that may influence the number and/or combination of tilt and lift propellers in an aircraft. The number and orientation of propellers may affect the number of battery packs and connections between battery packs (e.g., to achieve controllability and/or stability upon electric failure).

FIG. 2A illustrates an arrangement of electric propulsion units, consistent with the disclosed embodiments. Referring to FIG. 2A, the aircraft shown in the figure may be a top plan view of an exemplary aircraft. The aircraft may include twelve electric propulsion systems distributed across the aircraft. In some embodiments, a distribution of electric propulsion systems may include six forward electric propulsion systems (265, 266, 267, 268, 269, and 270) and six aft electric propulsion systems (271, 272, 273, 274, 275, and 276). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 2B illustrates an alternate arrangement of electric propulsion units, consistent with the disclosed embodiments. Referring to FIG. 2B, the aircraft shown in the figure may be a top plan view of an exemplary aircraft. The aircraft may include eight electric propulsion systems distributed across the aircraft. In some embodiments, a distribution of electric propulsion systems may include four forward electric propulsion systems (277, 278, 279, and 280) and four aft electric propulsion systems (281, 282, 283, and 284). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 2C illustrates an alternate arrangement of electric propulsion units, consistent with the embodiments of the present disclosure. Referring to FIG. 2C, the aircraft may be a top plan view of an exemplary aircraft. In some embodiments, the aircraft may include ducted fans operably connected to the electric propulsion systems. In some embodiments the aircraft may include a bank of ducted fans on each wing of the aircraft and the bank of ducted fans may be connected to tilt together (e.g., between lift and forward thrust configuration). In some embodiments the aircraft includes a left and right front wing and a left and right rear wing. In some embodiments, each wing of the aircraft includes a bank of connected ducted fans. In some embodiments, each bank of connected ducted fans are tiltable (e.g., between lift and forward thrust), while in other embodiments only the bank of fans on the front wing(s) are tiltable.

FIG. 2D illustrates an alternate arrangement of electric propulsion units, consistent with the disclosed embodiments. Referring to FIG. 2D, the aircraft shown in the figure may be a top plan view of an exemplary aircraft. The aircraft may include six electric propulsion systems distributed across the aircraft. In some embodiments, a distribution of electric propulsion systems may include a first set of four electric propulsion systems 285, 286, 287, and 288 coplanar in a first plane and a second set of two electric propulsion systems 289 and 290 coplanar in a second plane. In some embodiments, the first set of electric propulsion systems 285, 286, 287, and 288 may be operatively connected to tilt propellers and second set of electric propulsion systems 289 and 290 may be operatively connected to lift propellers. In other embodiments, the first set of electric propulsion systems 285, 286, 287, and 288 and the second set of aft electric propulsion systems 289 and 290 may all be operatively connected to tilt propellers.

FIG. 2E illustrates an alternate arrangement of electric propulsion units, consistent with the disclosed embodiments. Referring to FIG. 2E, the aircraft shown in the figure may be a top plan view of an exemplary aircraft. The aircraft may include four electric propulsion systems distributed across the aircraft. In some embodiments, a distribution of electric propulsion systems may include four coplanar electric propulsion systems 291, 292, 293, and 294. In some embodiments, all of the electric propulsion systems may be operatively connected to tilt propellers.

FIG. 2F illustrates an alternate arrangement of electric propulsion units, consistent with the disclosed embodiments. Referring to FIG. 2F, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 295, 296, 297, and 298 operatively connected to tilt propellers and the two aft electric propulsion systems 299 and 264 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 2F, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

Figure 3A:
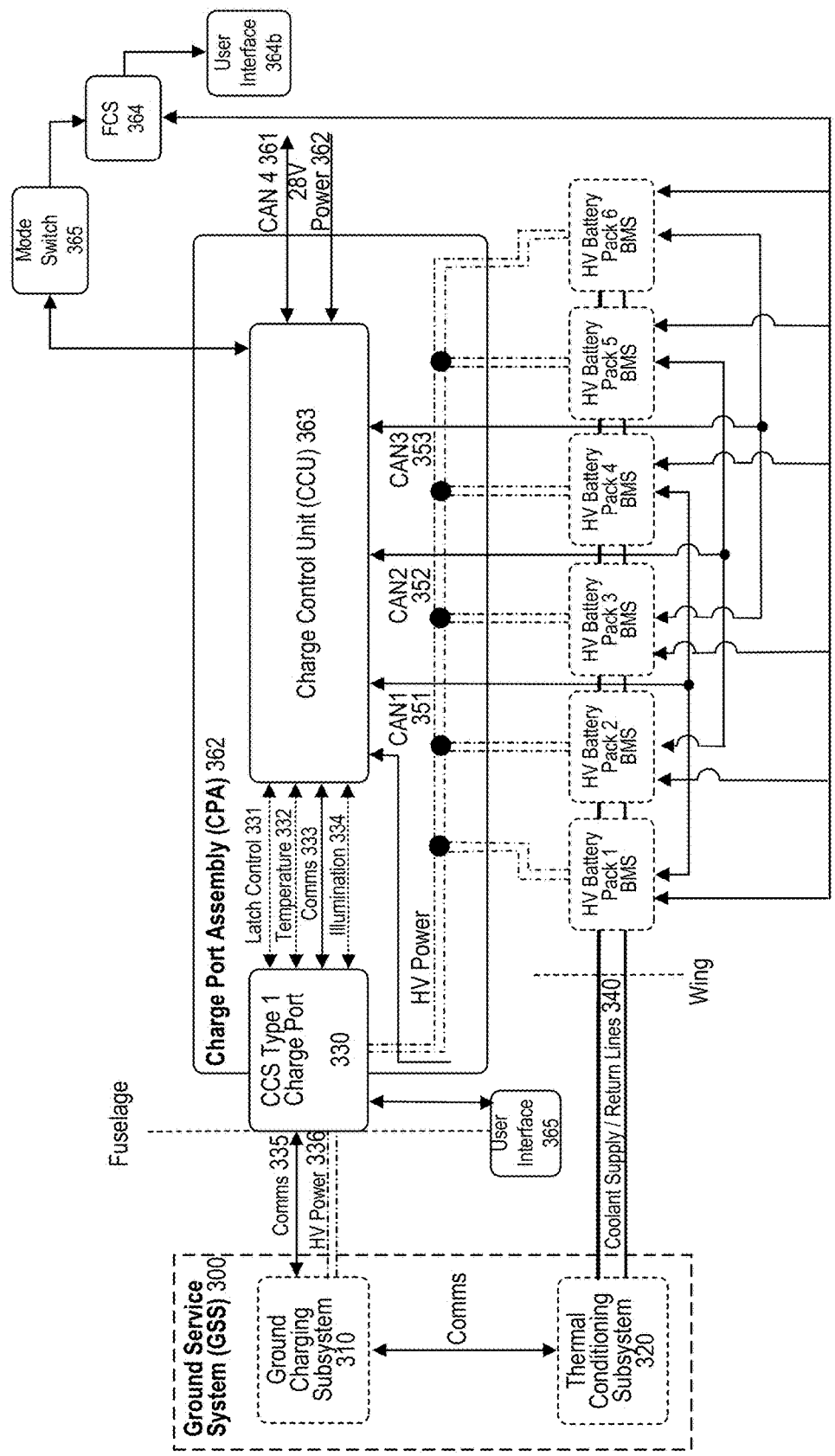
FIG. 3A illustrates a diagram of a charging system, consistent with the disclosed embodiments.

FIG. 3A illustrates a charging system, consistent with the disclosed embodiments. Charge Port Assembly 362 includes a Charge Port 330, providing for communication connection through power line communication 335 and high voltage power transfer through HV power channel 336. In some embodiments, Charge Port 330 may be a JI 772 Type 1 charge port including various pins and connection points to allow for connection to a Ground Service System (GSS 300) (e.g., through a plug). The Charge Port 330 may include one or more proximity pins to detect a high voltage connection between the GSS 300 and the Charge Port 330. Upon detecting a connection with the GSS 300, the Charge Port 330 may engage a latch that prevents the high voltage power 336 from being disconnected under a charged load.

The Charge Port Assembly 362 further includes a Charge Control Unit (CCU), which may include one or more computers, processors, microprocessors, controllers, and/or memory devices, any of which may be special-purpose or general-purpose. Following completion of the charging, Charge Control Unit (CCU 363) may determine that each battery pack 120 has reached the required charge level (e.g., SOC) and signal charge completion to the Ground Service System 300. Upon determining that no charge is being received from the GSS 300, the CCU 363 may provide a signal to the charge port, e.g., through latch control 331, to automatically unlatch the connection to the GSS 300 or to allow for manual unlatching of the connection.

The Charge Port Assembly 362 may include a Charge Control Unit (CCU 363) in communication with the Charge Port 330, e.g., through communication line 333. The CCU 363 may further provide latch control 331, illumination changes 334, and may monitor and respond to a temperature 332 of various charge port components. The CCU 363 may monitor a temperature on an inlet side of the charge port 330. If the temperature gets too high, then the CCU 363 may adjust commands to the Ground Service System 300 to lower a supplied current and/or abort the charge. The CCU 363 may include the temperature of the charge port as a constraint in the charging process as further detailed below with reference to FIG. 6.

The CCU 363 may receive information from and provide commands to Ground Service Station 300 (e.g., through Communication line 335). In some embodiments, a single communication line is provided between the CPA 362 and the Ground Service System (GSS) 300. In some embodiments, two or more communication lines may be provided between the CPA 362 and the GSS 300. For example, communication lines may be provided between the CPA 362 and both Ground Charging Subsystem 310 and Thermal Conditioning Subsystem 320. Ground Charging Subsystem 310 and Thermal Conditioning Subsystem 320 may include one or more computers, processors, microprocessors, and/or memory devices to control charge and conditioning of the aircraft battery packs. The GSS 300 may provide information on the charging infrastructure to CPA 362. For example, the GSS 300 may provide information on charging infrastructure current and/or voltage limits, whether the charging infrastructure is bidirectional, thermal capabilities of the GSS 300 (e.g., cooling capabilities of Thermal Conditioning System 320), and charging availability (e.g., in consideration of vertiport operations described below). The CCU 363 may include these capabilities as constraints in the charging process as further detailed below with respect to FIG. 6.

The GSS 300 may further receive charging protocol information (e.g., charging parameter) from a user interface (not shown) connected to the GSS 300 and provide the charging protocol information to the CPA 362. For example, the GSS 300 may include one or more of screen(s), button(s), knob(s), switch(es), lever(s), any physical interface element, or any combination thereof, which can accept charging protocol information and/or provide a charging status to a charging attendant (e.g., charging time remaining, average charge level etc.). In some embodiments, GSS 300 may include a communication port or wireless connection that allows for a charging attendant to connect a computer, laptop, tablet, or mobile device and provide charging protocol information and receive a charging status via the connected device. As further detailed below, CPA 362 may send various voltage commands, current commands, thermal commands, and/or charging status updates to the GSS 300 based on the information received from the GSS 300 and the battery packs 120. The GSS 300 may further include one or more communication connections to vertiport components as further detailed below, and may receive charging protocol information through these connections.

The CCU 363 may receive information from and provide charging status updates to a charging attendant via user interface 365. For example, the user interface 365 may include screen(s), button(s), knob(s), switch(es), and/or lever(s) that can accept charging protocol information (e.g., charging parameters) and provide a charging status to a charging attendant (e.g., charging time remaining, average battery pack charge level, number of battery packs that have completed charging etc.). In some embodiments, user interface 365 allows charging information to be transmitted and received even when the aircraft is powered off (e.g., in a service mode as described below).

The CCU 363 may receive information from and provide information to flight control system (FCS) 364. In some embodiments, CCU 363 may communicate with FCS 364 via battery packs 120. For example, CCU 363 may communicate with the FCS 364 through one or more battery management system(s) associated with one or more battery packs 120. In some embodiments, CCU 363 hardware integrity rating may be lower than that of the battery management system(s) and therefore communication may be through one or more battery packs 120. In some embodiments, FCS 364 may include a user interface 364b (e.g., in a pilot cockpit as part of flight dashboard). The user interface 364b may allow a user to input charging protocol information (e.g., charging parameters). Further, the user interface 364b may display a charging status (as described above) to the user. The CCU may communicate with the user interface 364b directly (e.g., via CAN 4 361) and/or indirectly through one or more components.

The CCU 363 and FCS 364 may receive information from a mode switch 366. In some embodiments, battery packs 120 may also receive information from a mode switch 366. The mode switch 366 may be a physical switch, knob, button, lever, switch, and/or display element, which may allow a pilot to select a mode of operation for the aircraft. In some embodiments, the mode switch may be located in the cockpit (e.g., on a pilot dashboard, mounted in the cockpit, and/or attached to the cockpit). For example, in some embodiments, a pilot may select between a fly mode, ground mode, service mode, and off mode. In a fly mode, high voltage power is provided to electric propulsion units (e.g., electric engines) of the aircraft and low voltage power is provided to low voltage aircraft systems. In a ground mode, high voltage power is not provided to electric propulsion units (or only allowed in a testing setting) and low voltage power is provided to low voltage aircraft systems. In a service mode, high voltage power is not provided to electric propulsion units (e.g., electric engines) and low voltage power is not provided to low voltage aircraft systems with the exception of systems required for aircraft charging (e.g., CCU 363 or similar unit). In an off mode, all aircraft systems are unpowered. The above modes of operation are provided as an example. In other embodiments, different combinations of aircraft modes are available.

The CCU 363 may receive information from and provide commands to battery packs 120, e.g., through a battery management system of each battery pack. In some embodiments, each battery pack 120 may have a separate low voltage CAN communication line connecting the battery pack 120 to the CCU 363. In some embodiments, a CAN communication line may be shared between one or more battery packs 120 in a battery pack unit. For example, HV battery packs 1 and 4 may communicate with CCU 363 through CAN 351. HV battery packs 2 and 5 may communicate with CCU 363 through CAN 352. HV battery packs 3 and 6 may communicate with CCU 363 through CAN 353.

Figure 4B:
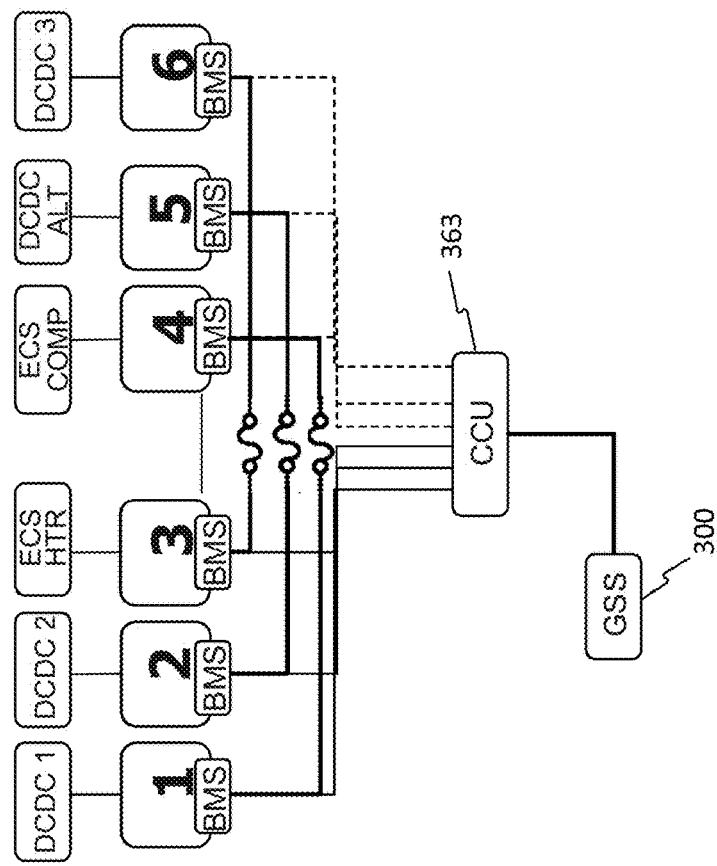
FIG. 4B illustrates an example of a charge control unit in a ground mode, consistent with the disclosed embodiments.
Figure 4A:
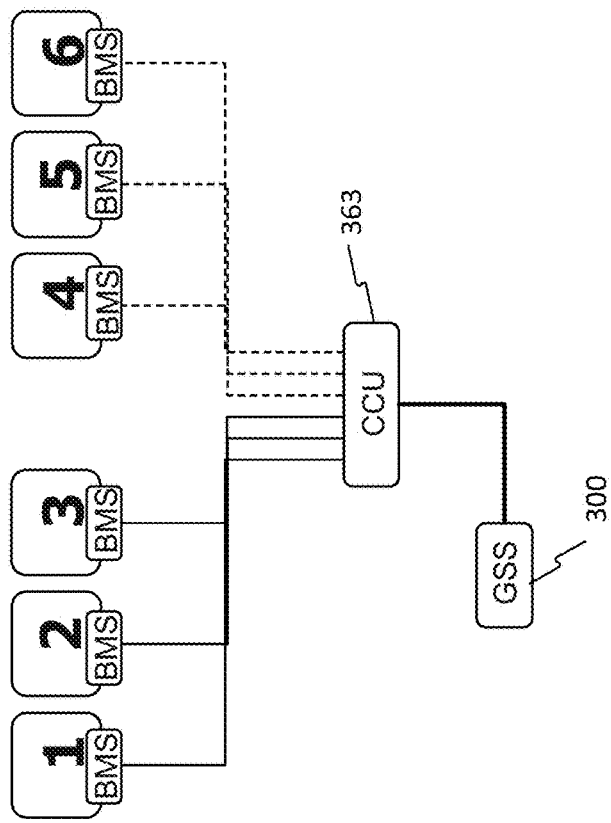
FIG. 4A illustrates an example of a charge control unit in a service mode, consistent with the disclosed embodiments.
Figure 4C:
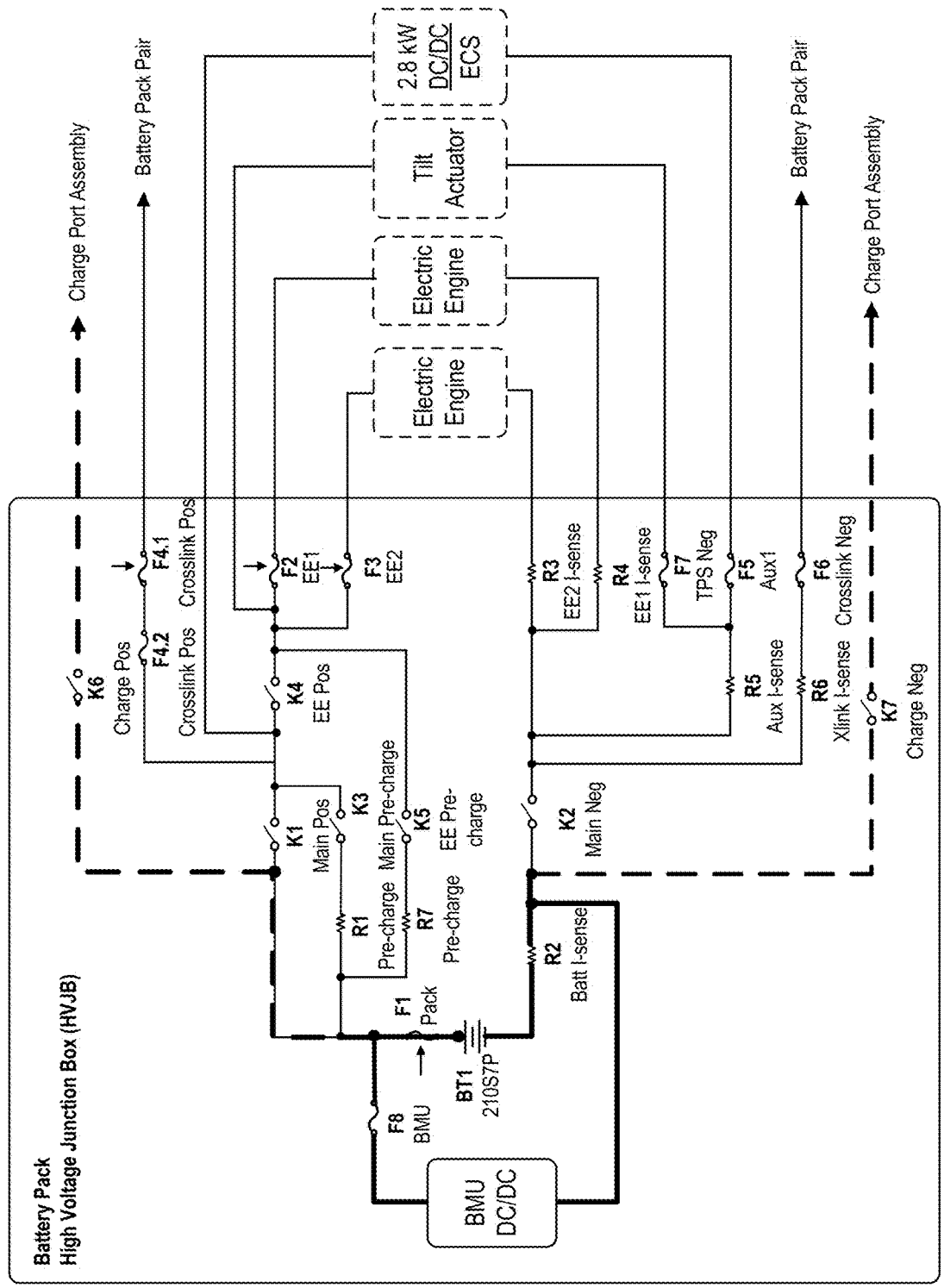
FIG. 4C illustrates a circuit diagram of a battery in service mode, consistent with the disclosed embodiments.
Figure 4D:
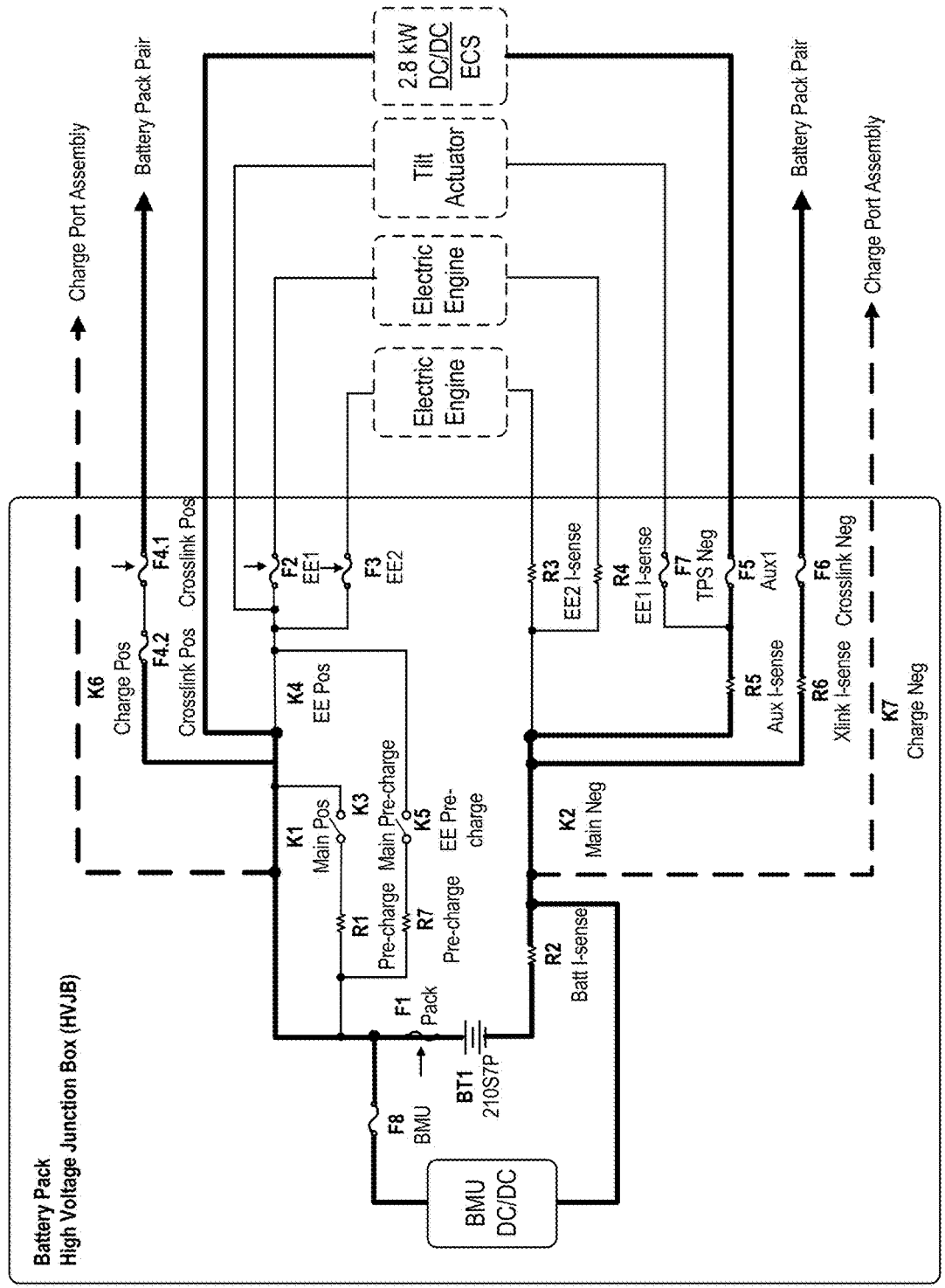
FIG. 4D illustrates a circuit diagram of a battery in ground mode, consistent with the disclosed embodiments.

As described above, CCU 363 receives information from battery packs 120 and provides commands to battery packs 120 to control their charge level (e.g., voltage or SOC) by opening and closing battery pack charge contactors (e.g., K6-K7 in FIGS. 4C and 4D, shown below). The BMS of each battery pack may send battery pack information to the CCU 363, including information on a state of battery pack connection (e.g. whether the battery pack is connected to the HVPS system), state of charge (SOC), state of health (SOH), pack voltage, charging current being received by the battery pack, failure condition (e.g. short circuit or overcurrent), state of power (SOP), state of energy (SOE), state of temperature (SOT), minimum and/or maximum allowable voltage, battery pack contactor limits (e.g., a max charge a contactor can accommodate when opening or closing), battery pack temperature limits, and battery pack heat generation. Charge Control Unit 363 may determine battery pack charge contactor commands to bring the battery packs 120 onto the charging bus (e.g., electrically connect to the bus) and remove the battery packs from the charging bus (e.g., electrically disconnect), exemplary sequences of which are described below with reference to FIG. 6.

As described above, the Charge Control Unit (CCU 363) may provide information on the charging process to a charging attendant. In some embodiments, the CCU 363 may signal a problem (e.g., a battery pack failure, poor health, or excess temperature) through the illumination line 334, user interface 365, user interface 364*b*, and/or GSS 300. For example, in some embodiments, a light of illumination line 334 may be turned on or change colors to indicate the problem. Alternatively, or additionally, the CCU 363 may communicate (e.g., through text, images, and/or animations) the details of the problem (e.g., type of problem, relevant battery pack(s) etc.) to the Ground Service System 300 through communication lines 333 and 335. Ground Service System 300 may provide these details through a display, computer, laptop, tablet, mobile device, or any other device capable of communicating the information to a charging attendant. Additionally, or alternately, may communicate the details of the problem (e.g., type of problem, relevant battery pack(s) etc.) through user interface 365 or 364*b*.

Figure 3B:
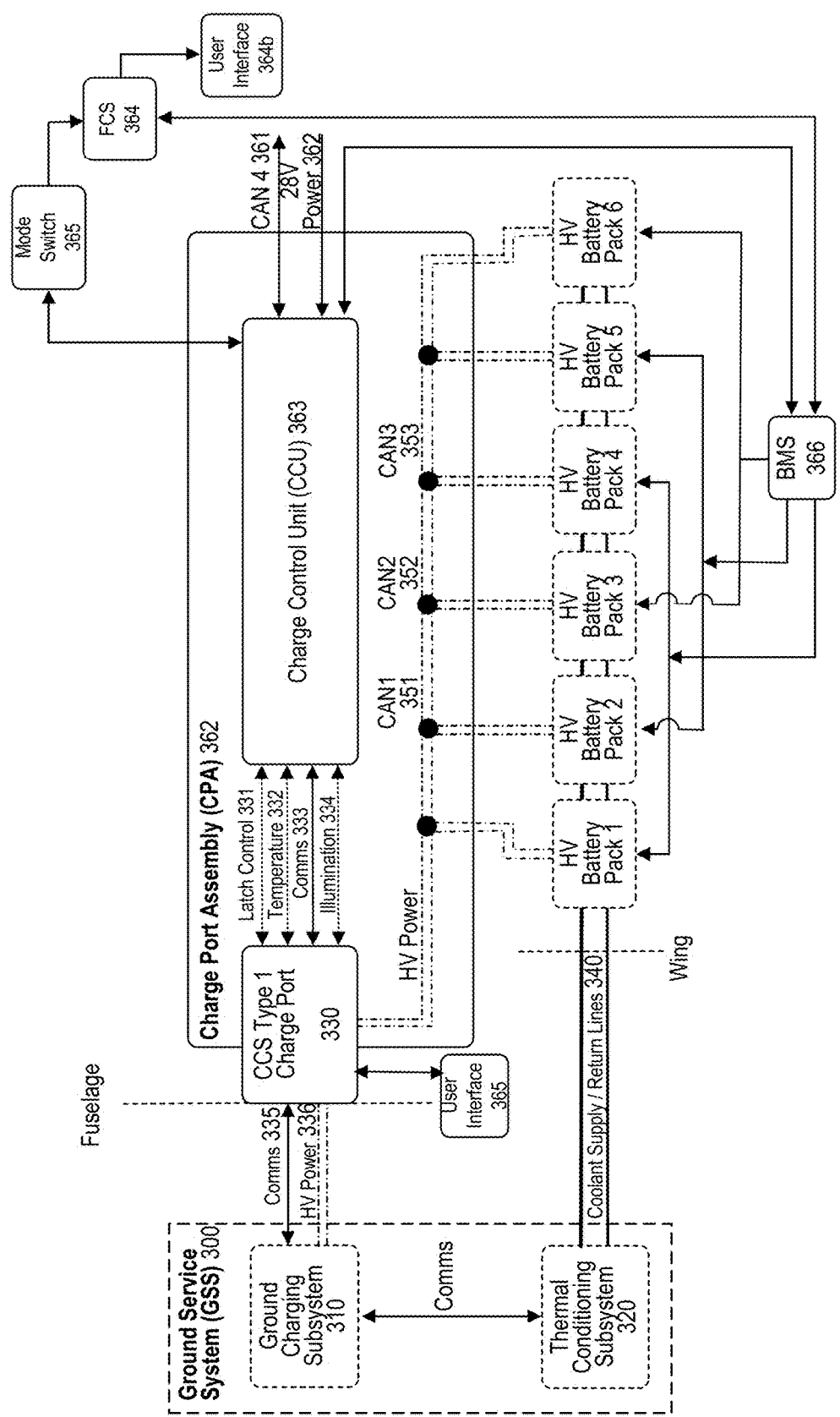
FIG. 3B illustrates another diagram of a charging system, consistent with the disclosed embodiments.

FIG. 3B illustrates a charging system, consistent with the disclosed embodiments. The components of FIG. 3B may function the same as those described above with respect to FIG. 3A. However, instead of the CCU 363 and FCS 364 communicating with battery management systems associated with each of the battery packs 120, the CCU 363 and FCS 364 may communicate with a central battery management system (BMS) 366. The central BMS 366 may receive and relay information from each battery pack 120 and may control the battery packs 120 (e.g., by opening and closing battery pack contactors). In some embodiments, the central BMS 366 may perform one or more functions of the CCU 363, described above. In some embodiments, the BMS 366 may perform all functions of the CCU 363 and no separate charge control unit may be provided. The battery management systems may include one or more computers, processors, microprocessors, and/or memory devices, which may be configured to perform any of the functionality (e.g., operations) discussed herein.

Figure 3C:
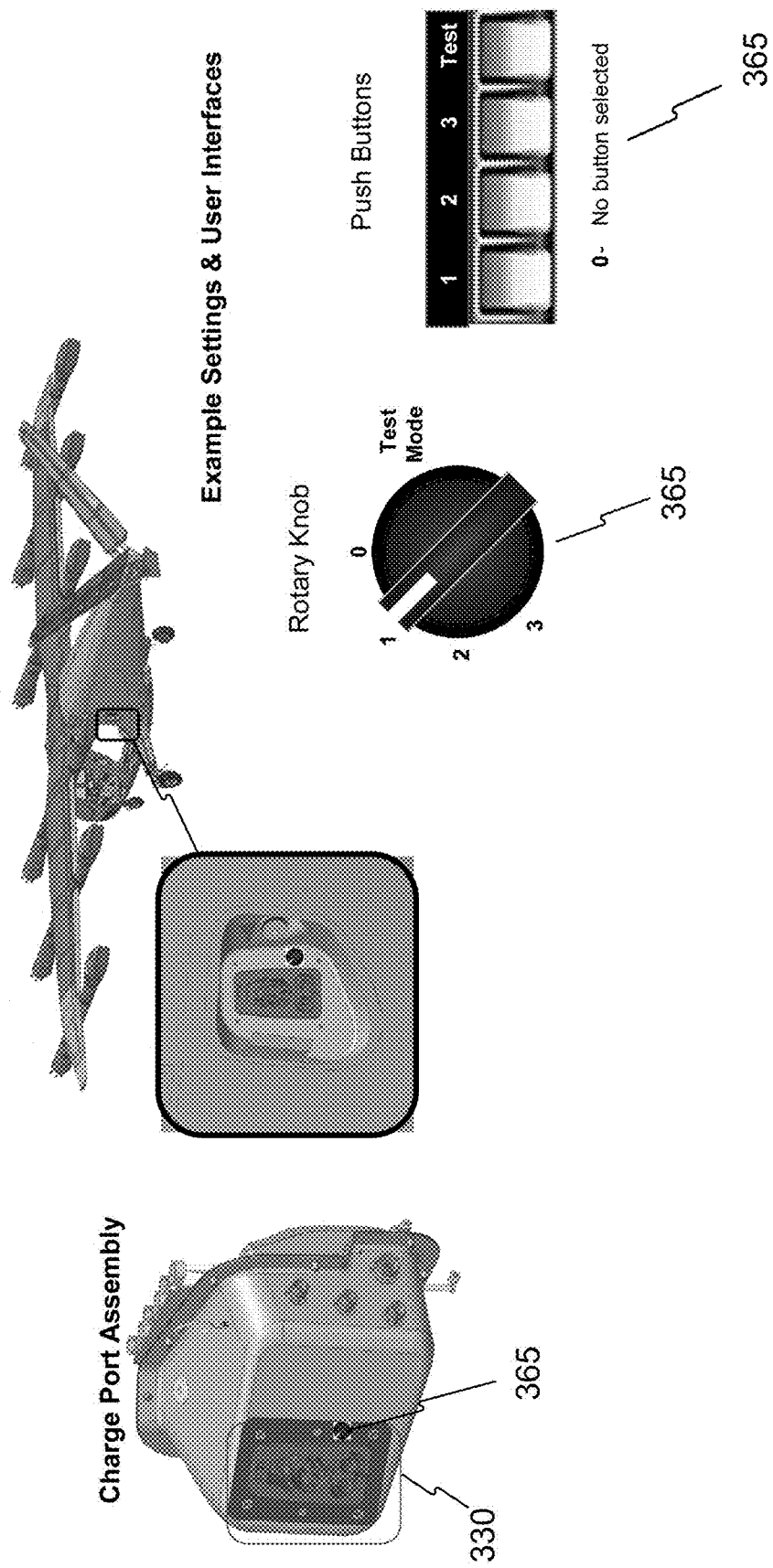
FIG. 3C illustrates an example of a charge port and user interface, consistent with the disclosed embodiments.

FIG. 3C illustrates an example of a charge port and user interface, consistent with the disclosed embodiments. For example, charge port 330 may include high voltage connections and/or one or more communication connections. In some embodiments GSS 300 may include a single electrical cable with connection points for each of the charge port 330 electrical and communication connections. In some embodiments, charge port 330 may include a connection point(s) for coolant line supply and return. For example, charge port 330 may include two couplers (e.g., threaded couplers) that allow for connection of the coolant supply and return lines 340. In some embodiments, the coolant line connections may be separate from the charge port 330.

In some embodiments, user interface 365 may be installed in proximity to the charge port 330. For example, in some embodiments user interface 365 may be within a few inches of charge port 330 so that a charging attendant does not need to move to set the charge protocol information. As described above, the user interface 365 may include screen(s), button(s), knob(s), switch(es), and/or lever(s) that allow for a charging protocol to be set. In some embodiments, the charging protocol input includes an energy level, C-rate, and/or a time available for charging the electric aircraft and/or any charging parameters for charging. This information may be provided to the CCU 363 in digital or analog form based on the type of user interface 365.

In some embodiments, charge port 330 and/or user interface 365 may be located in a position that is readily accessible by a charging attendant. For example, as shown, the charge port 330 and/or user interface 365 may be mounted to the body of the aircraft, for example aft of a door of the aircraft. Further, the charge port 330 and/or user interface 365 may be mounted at a height that is accessible by a charging attendant.

FIG. 4A illustrates an example of a charge control unit in a service mode, consistent with the disclosed embodiments. In some embodiments, when the aircraft is in a service mode, battery packs 120 may be electrically isolated from one another and may not provide a power supply to one or more low voltage systems. The mode may be set by a user selection on mode switch 366 shown in FIGS. 3A-3B above.

FIG. 4B illustrates an example of a charge control unit in a ground mode, consistent with the disclosed embodiments. In some embodiments, when the aircraft is in a ground mode, battery packs 120 may be electrically connected to one or more other battery packs 120 and/or may provide a power supply to one or more low voltage systems. The mode may be set by a user selection on mode switch 366 shown in FIGS. 3A-3B above. While FIG. 4B details a cross-link connection between pairs of two battery packs, any number of battery packs may be connected. For example, as described above, two, three, four, five, and/or all battery packs may be cross-linked.

FIG. 4C illustrates a circuit diagram of a battery in service mode, consistent with embodiments of the present disclosure. In some embodiments, a selection on mode switch 366 may command the battery packs 120 to adjust contactors to a service mode configuration. The selection on mode switch 366 may be communicated to a battery management system of battery packs 120 directly and/or indirectly (e.g., through CCU 363 and/or FCS 364). In some embodiments, the battery management system may control contactors to not provide power to electric engines, low voltage systems, and/or other battery packs 120. For example, the battery management system(s) may open contactors K1-K5 associated with power to electric engines, low voltage systems, and other battery packs.

FIG. 4D illustrates a circuit diagram of a battery in ground mode, consistent with the disclosed embodiments. In some embodiments, a selection on mode switch 366 may command the battery packs 120 to adjust contactors to a ground mode configuration. The selection on mode switch 366 may be communicated to a battery management system of battery packs 120 directly and/or indirectly (e.g., through CCU 363 and/or FCS 364). The battery management system may control contactors to provide power to low voltage systems, and/or other battery packs 120, while keeping electric engines unpowered. For example, the battery management system(s) may close contactors K3 and K5 to perform pre-charge. The battery management system(s) may then close contactors K1 and K2 to provide power to low voltage systems and/or other battery packs 120, while keeping contactor K4 open to prevent power to electric engines.

While FIGS. 4A-4D detail selection between two modes of operation, in other embodiments there may be more modes of operation. For example, a first mode of operation may correspond to no low voltage loads connected, a second mode of operation may correspond to low voltage loads connected, a third mode of operation may correspond to causing battery packs to be electrically isolated from each other, and a fourth mode of operation may correspond to causing battery packs to be electrically connected (e.g., to each other and/or to other components). In some embodiments, different interfaces may be used to select between a first and second mode and a third and fourth mode of operation, while in other embodiments all four operation options may be presented on the same interface.

FIGS. 5A, 5B, 5C, 5D, 5E, and 5F illustrate charging protocols, consistent with the disclosed embodiments. As described above, charging protocol information (e.g., charging parameters) may be provided on user input devices, such as user interface 365 and/or user interface 364b. In some embodiments, a user may enter an energy target (e.g., kWh) and time allotted for charging (e.g., minutes). In some embodiments, a user may enter an energy target (e.g., kWh) and a C-rate limit. A C-rate limit may correspond to an amount of time for charging the battery. For example, 1 C may indicate 1 hour of charge time, 0.5 C may indicate 2 hours of charge time etc. The energy targets, time allocation, and/or C-rate limits may be set by a user typing values or by a user selecting between a variety of preset options. For example, a user may select from a list of energy and time options provided by the GSS 300 and/or a central vertiport system in consideration of the charging infrastructure and/or needs of other aircrafts at the vertiport further described below.

In some embodiments, based on the input energy target, time allocation, and/or C-rate limit, the charge control unit (CCU) 363 may determine a charging protocol that meets the input parameters. For example, the charge control unit 363 may determine a charging profile that meets the input parameters in consideration of the battery packs energy levels and capacitance (e.g., received from the battery packs 120), while also meeting other stored and/or received constraints. For example, other constraints may include a charging limit of the ground charging subsystem 310 (e.g., a current limit), a thermal limit of thermal conditioning system 320 (e.g., a cooling capacity), a maximum current that may be accepted by battery packs 120, a maximum current that wiring can accommodate without overheating, and/or maximum acceptable charge and associated time frames to avoid lithium plating of battery packs.

CCU 363 may store charging protocol profiles and/or associated parameters to develop a charging profile based on the variety of constraints. For example, CCU 363 may store charging protocol profiles in one or more data structures (e.g., lookup tables) in connection with one or more of the constraints listed above. In some embodiments, CCU 363 may retrieve a charging protocol profile that meets the one or more constraints. For example, CCU 363 may store charging protocol parameters (e.g., current level(s) and associated time(s)) in lookup tables in connection with one or more of the constraints listed above. In some embodiments, CCU 363 may retrieve parameters and construct a charging protocol profile that meets the one or more constraints. While lookup tables are used as an example, the charging protocol profiles may be determined using any other data storage, linking, and retrieval method. Further, in some embodiments, CCU 363 may determine a start time to begin the charging in consideration of vertiport operations and the inputted time. For example, CCU 363 may store and/or determine a maximum duration (e.g., based on lowest desirable charge current) and a minimum duration (e.g., based on charge protocol) and may determine a start time in consideration of vertiport operations.

In some embodiments, if the energy level, C-rate, and/or time allocation requested by a user cannot be met, the CCU 363 may output a notice through user interface 365 and/or 364b. In some embodiments, CCU 363 may detail the limiting constraints. For example, CCU 363 may determine and indicate that an allotted time cannot be met because of the thermal limits of thermal conditioning subsystem 320 and/or because it may result in lithium plating of battery pack(s) 120.

FIGS. 5A-5I illustrate how a charging protocol profile may vary based on input. As shown in FIGS. 5A-5I, the charging rate (e.g., current) may start at a higher level and then gradually decrease as charging completes. For example, the gradual decrease may be based on one or more battery packs reaching an upper voltage limit before the battery pack is fully charged. In some embodiments, a battery management unit and/or charge control unit 363 may determine that one or more battery packs have reached an upper voltage limit and communicate to GSS 300 to decrease the charge rate. In some embodiments, the charge rate is decreased to keep the battery pack at a constant voltage and avoid exceeding the upper voltage limit.

FIGS. 5A-5C illustrate how a charging protocol profile may vary based on a time allotted for charging. FIG. 5A illustrates that at a shorter time allotted for charging (e.g., a fast charge), the charge rate (e.g., provided current) may start high and then step down to avoid lithium plating of the battery pack(s). In some embodiments, a charging protocol profile may include multiple steps to avoid lithium plating of the battery pack(s). The provided charge may then gradually decrease until no charge is received.

FIG. 5B illustrates that at a medium time allotted for charging (e.g., a medium charge), the charge rate (e.g., provided current) may start at a medium level and then gradually decrease until no charge is received. FIG. 5C illustrates that at a shorter time allotted for charging (e.g., a slow charge), the charge rate (e.g., provided current) may start at a low level and then gradually decrease until no charge is received.

FIGS. 5D-5F illustrate how a charging protocol profile may vary based on an energy level inputted for charging. FIG. 5D illustrates that at a high inputted energy level, CCU 363 may select a charging profile that starts at a greater charge rate (e.g., provided current). Based on the battery pack 120 constraints (e.g., to avoid lithium plating and/or overheating), the selected charging protocol profile may include multiple steps down in the charge rate (e.g., current). FIG. 5E illustrates that at a medium inputted energy level, CCU 363 may select a charging profile that starts at a medium charge rate and then gradually decreases. FIG. 5F illustrates that at a low inputted energy level, CCU 363 may select a charging profile that starts at a low charge rate and then gradually decreases.

FIGS. 5G, 5H, and 5I illustrate how a charging protocol may change during charging, consistent with the disclosed embodiments. In some embodiments, while the aircraft is charging, a user may change a charging protocol on user interface 365 or 364b or a vertiport system may communicate a change in the charging protocol. For example, a change may involve an adjustment to an energy target, time allocation, and/or C-rate limit. Based on the inputted change, the CCU 363 may adjust the charging protocol. For example, CCU 363 may assess a current charge level of the battery packs 120 and determine a second charging protocol that will meet the adjusted input (e.g., energy target, time allocation, and/or C-rate limit) while still meeting the constraints discussed above. Further, the CCU 363 may determine a time for switching from the first charging protocol to the second charging protocol (e.g., based on communication with a central vertiport system and coordination with other aircraft needs). FIG. 5G illustrates an initial charging protocol profile. Based on a communicated change indicating a longer allotted time for charging, CCU 363 may adjust the charging protocol profile as shown in FIG. 5H. Similarly, based on a communicated change indicating a shorter allotted time for charging, CCU 363 may adjust the charging protocol profile as shown in FIG. 5I. Further, a communicated change may indicate a lower energy target or C-rate limit and CCU 363 may step down the charge rate accordingly. Similarly, a communicated change may indicate a higher energy target or C-rate limit and CCU 363 may step up the charge rate accordingly.

FIG. 6 illustrates an exemplary charging control sequence, consistent with the disclosed embodiments. In some embodiments, any or all of the steps of process 600 shown in FIG. 6 may be performed by one or more processors on the CCU 363. Additionally or alternatively, any or all of the process shown in FIG. 6 may be performed by one or more processors of a battery management system (e.g., a central battery management system associated with a group or all the battery packs). In some embodiments, a portion of the process of FIG. 6 may be performed by the CCU 363 and another portion of the process of FIG. 6 may be performed by a battery management system associated with one or more battery packs (e.g., individual battery pack BMS or a central BMS). In some embodiments, only a portion of the steps of process 600 may be performed. Moreover, some steps may be repeated, combined, or re-ordered. In some embodiments, the process of FIG. 6 (e.g., at least one device implementing the process) may not proceed to one step until completing or attempting a preceding step.

At step 601, one or more processors may receive inputs indicating charging protocol information (e.g., charging parameters). As described above, charging protocol inputs may be received via user interface 365, user interface 364b, GSS 300, and/or another component of vertiport system described below with reference to FIG. 8. The inputs may indicate an overall energy target, time allocation, and/or C-rate limit to be achieved when charging all aircraft battery packs. In some embodiments, these inputs may indicate different energy targets, time allocations, and/or C-rate limits for each individual battery pack and/or for groups of battery packs.

In some embodiments, an energy target may be based on flight information. For example, CCU 363 may determine the required (e.g., predicted sufficient) battery pack charge levels based on flight information. For example, in some embodiments CCU 363 may receive flight information from GSS 300, e.g., through communication lines 335 and 333. GSS 300 may receive flight information through a wired or wireless connection to a computer, laptop, tablet, mobile device, or any other device capable of providing flight information. In some embodiments, Charge Port Assembly 362 may provide for a direct wired or wireless connection to a computer, laptop, tablet, or mobile device to directly receive flight information. In some embodiments, CCU 363 may receive flight information from the aircraft's flight control system 230. Flight information is further described below with respect to FIG. 10. In some embodiments, flight information may detail what energy level different battery packs or groups of battery packs should be charged to. For example, flight information may include historical battery consumption of each battery pack on a particular flight path and/or in particular flight conditions (e.g., mode, weight, weather etc.). The CCU 363 and/or another component of the vertiport system may compare these details to an upcoming flight to determine target energy levels that will meet the flight's parameters (e.g., requirements).

At step 602, charging protocol constraints may be received (e.g., from battery packs 120 and/or GSS 300) and/or retrieved (e.g., from memory) by one or more processors. As described above, charging protocol constraints may include a charging limit of the ground charging subsystem 310 (e.g., a current limit of a charging port), a thermal limit of thermal conditioning system 320 (e.g., a cooling capacity), a battery pack thermal limit, a battery pack contactor limit, a maximum current that may be accepted by battery packs 120, a battery pack capacitance, a maximum current that wiring can accommodate without overheating, and/or maximum acceptable charge(s) and associated time frames to avoid lithium plating of battery packs. In some embodiments, one or more limits may be received based on the needs of other aircraft. Further, the charging protocol constraints may include a mode of operation of the battery packs. For example, the battery packs may be in a service mode (e.g., a first mode) with each battery pack electrically isolated from one another prior to joining the charging bus or in a ground mode (e.g., a second mode) with one or more battery packs electrically connected to each other (e.g., in parallel) prior to joining the charging bus. In some embodiments, in a service mode, the battery packs are not connected to any loads. In some embodiments, in a ground mode, the battery packs are connected to at least one load (e.g., supplying power low voltage loads and/or air conditioning equipment). While "service" mode and "ground mode" are provided as examples, the one or more processors may receive any selection of modes that indicate whether the battery packs are connected together and/or whether they are connected to any loads. Further, in some embodiments, there are more than two possible modes to be received by the one or more processors. For example, in some embodiments, there may be four separate modes (e.g., indicating battery pack(s) connected together, battery pack(s) not connected together, battery pack(s) connected to load(s), battery pack(s) not connected to load(s)).

At step 603, one or more processors may select a charging protocol. For example, as described above, a charging protocol may be selected based on the received inputs, the current charge level of battery pack(s) and the constraints. If no charging protocol can meet the parameters, a notification may be provided to a user (e.g., via user interface 365 and/or user interface 364b). In some embodiments, an overall charging protocol may be determined. For example, an overall charging protocol may be determined based on a single energy input (e.g., received at Step 601), time allocation, C-rate constraints, an overall battery pack charge level (e.g., a common charge level shared by the battery packs, an average charge level, or a minimum charge level) and/or battery pack constraints. In some embodiments, charging protocols for individual battery packs and/or groups of battery packs may be determined based on an energy input (e.g., either overall, battery pack group specific, or battery pack specific), time allocation, C-rate, battery pack charge level, and/or battery pack constraints. In some embodiments, an overall charging protocol may be determined based on one or more individual charging protocols. For example, a charging protocol may be selected to accommodate the battery pack requiring the greatest charge (e.g., battery pack with lowest charge level) while still meeting the constraints of the battery packs. In some embodiments, the charging protocol may account for the charge loss due to connected loads (e.g., low voltage and/or auxiliary loads). For example, based on a selection of ground mode, the one or more processors will use the charge loss to ensure (e.g., determine an output whereby) the commanded charge still reaches the input targets.

At step 604, one or more processors may communicate the charging protocol and/or commands associated with the charging protocol (e.g., a required, requested, and/or configured current) to the GSS 300. In some embodiments, an entire charging protocol may be communicated, while in other embodiments, the CCU 363 may store the charging protocol and send charge rate commands (e.g., current commands) at set increments of time.

At step 605, one or more processors may determine the battery packs 120 with the lowest voltage level to be the first battery packs to charge. In some embodiments, the battery packs 120 may be in a service mode (e.g., shown in FIG. 4C) with each battery pack 120 electrically isolated from others. When the aircraft is in a service mode (e.g., after determining, in response to, based on etc.), the voltage level of each battery pack 120 may be evaluated to select a number of battery packs 120 with voltage levels within a threshold from the lowest battery pack voltage level. In some embodiments, the battery packs 120 may be in a ground mode (e.g., shown in FIG. 4D) with each battery pack 120 connected to another battery pack or a group of battery packs. When the aircraft is in a ground mode (after determining, in response to, based on etc.), only a single battery pack in the group of connected battery packs may be evaluated since the voltage is equalized. Groups (e.g., pairs) of battery packs may be selected (e.g., by a processor implementing the process depicted in FIG. 6) electrically connect to the charging bus based on the evaluated battery pack being within a threshold of an overall lowest battery pack voltage. In some embodiments, only one battery pack is charged at a time and the battery pack with the lowest voltage level is selected first. The one or more processors may command the selected battery pack(s) to electrically connect to (e.g., close the contactors to) the charging bus and enable charging.

At step 606, one or more processors may determine a charge rate command for GSS 300 for the selected battery packs. The charge rate command may be determined such that the current to each battery pack is less than a minimum of the battery pack's current limit, the target current value determined by the charging protocol, and a charger's capabilities. For example, $I_{comm} \leq \min(I_{tgt}, I_{max}, I_{limit})$, where $I_{comm}$ is the current command, $I_{tgt}$ is the protocol target charge value (e.g., shown in FIG. 5A-5C above), $I_{max}$ is based on a maximum current the charger can provide, $I_{limit}$ is based on a maximum current the battery packs can take. For example, $I_{limit} = i_{limit} *$(number of packs), where $i_{limit}$ is based on each battery pack's individual limits and/or the minimum limit of the battery packs on the bus. In some embodiments, current supplied to the battery packs may be monitored and/or current on the common charging bus may be monitored. In some embodiments, all limits are incorporated into the charging protocol determined at Step 603.

In some embodiments, the commanded current may be adjusted to reduce or minimize a difference between current limits and the current suppled to battery packs (e.g., using integral feedback control). The commanded current may be adjusted based on $I_{comm} = f(\min(\min(i_{tgt}, i_{limit}) - i_j))$, where $i_{tgt}$ and $i_{limit}$ are the battery pack level limits (e.g., $i_{tgt} = I_{tgt}/$(number of packs)) and $i_j$ is the monitored current at the battery pack. Therefore, the commanded current may be regulated to close the difference between battery pack limits and measured current based on the battery pack that is closest to exceeding its limit. If the one or more processors determines a negative value for $\min(i_{tgt}, i_{limit}) - i_j$ for any of the battery packs then the commanded current will be reduced until $\min(i_{tgt}, i_{limit}) >= i_j$.

While commanded current is used as an example in this step and others, commands to GSS 300 may include a current, voltage, and/or power. For example, the one or more processors may convert a command and/or limit(s) from one value (e.g., a current) to another (e.g., a voltage). Further, the one or more processors may specify a time for holding the commanded value and/or may provide a charging profile indicating how the commanded value changes with time.

At step 607, one or more processors may determine that the voltage of the battery packs on the charging bus are within a threshold voltage of a next battery pack to electrically connect to the charging bus. In some embodiments, as described above, one or more processors may determine that the voltage of the battery packs on the charging bus is within a threshold voltage of a next set of battery packs to be added to the charging bus.

At step 608, when the voltages of the battery packs on the bus are within a threshold voltage of the next battery pack (e.g., after determining, in response to, based on etc.), one or more processors may command the GSS 300 to ensure a charge rate accommodates a current limit of the battery pack contactors. For example, $i_{comm} < (m+1)*\gamma$, where m+1 is the battery packs on the charging bus plus the selected battery packs to electrically connect to the charging bus and $\gamma$ is the current limit of each battery pack (e.g., based on contactor limits). In some embodiments, $i_{comm} < (m)*\gamma$, to further limit the current and protect the battery pack contactors. At step 605, the one or more processors may command the selected battery pack(s) to close the contactors to the charging bus and enable charging.

The process of steps 606, 607, 608, and 605 may be repeated until all battery packs have been added to the charging bus. Once all battery packs are on the charging bus, one or more processors adjust the commanded current to match the charging protocol (e.g., shown above in FIG. 5A-5C).

At step 609, one or more processors may select battery pack(s) to electrically disconnect from the charging bus based on determining that a battery pack has reached its state of charge target, $SOC_j$. A target state of charge for each battery pack may be determined based on the input energy target. For example, an input energy target may be based on input received user interface 365, user interface 364b and/or via a component of the vertiport system described below. In some embodiments, the target state of charge may be set as the same value for all battery packs or may vary based on the inputted information. State of Charge may refer to an available battery pack capacity relative to the battery pack's rated capacity. For example, the state of charge may be based on an open circuit voltage (OCV) of the battery pack, where the OCV is the resting voltage of the battery pack (e.g., based on a battery pack without current flow for a set period of time). When the battery pack has not been resting for a set period of time, state of charge of the battery packs may be estimated using a coulomb counting and an initial state of charge (e.g., determined at rest). For example, SOC=(initial_soc+integral (current*dt))/battery capacitance. In other embodiments, other approaches may be used to determine battery pack SOC. For example, SOC may be determine using Kalman filtering which uses a model that relates SOC to battery dynamics, current, and/or voltage measurements. In some embodiments, in both a service mode and a ground mode, the state of charge for each battery pack is evaluated. In a service mode, a first battery pack is selected to electrically disconnect from the charging bus based on its value reaching its target state of charge. In a ground mode, a group (e.g., a pair) of battery packs are selected to electrically disconnect from the charging bus based on all battery packs in the group meeting their target SOC.

While State of Charge is used as an example, in other embodiments a different battery pack state may be evaluated to determine whether the battery pack(s) may be electrically disconnected from the charging bus. In some embodiments, a voltage of the battery packs may be evaluated. In some embodiments a State of Energy (SOE) of the battery packs may be evaluated. A battery pack SOE may refer to an amount of energy available in the battery pack. For example, a state of energy may consider the health of the battery pack (e.g., life, degradation etc.) to determine an amount of energy available from the battery pack.

At step 610, when battery pack(s) reach a target state (e.g., after determining, based on, in response to) one or more processors may command the GSS 300 to ensure a charge rate accommodates a current limit of the battery pack contactors being opened. For example, $i_{comm} < m*\gamma$, where m is the number of battery packs on the charging bus once the battery pack(s) who have reached their targets are removed and $\gamma$ is the current limit of each battery pack (e.g., based on contactor limits).

At step 611, one or more processors may command the selected battery pack(s) to electrically disconnect from (e.g., open contactors to) the charging bus and stop charging. The one or more processors may store an indication that these battery packs have completed charging and/or adjust a count of battery packs currently charging. The process of steps 606, 609, 610, and 611 may repeat until all battery packs have reached their target state of charge and been electrically disconnected from the charging bus. At step 612, one or more processors may provide a notice indicating charging is complete. For example, a notice may be provided on user interface 365, user interface 364b, GSS 300, and/or a vertiport system.

In some embodiments, one or more processors may perform thermal regulation in addition to the charging regulation described above. In some embodiments, cooling parameters may be determined to avoid battery pack overheating when executing a charging protocol. The cooling requirements may be based on the cell chemistry and the charging protocol. For example, the cooling requirements may increase with a higher charging rate and/or associated timeframes of higher charging rates. The one or more processors may monitor a temperature of each battery pack (e.g., using one or more temperature sensors) and may compare the battery pack temperatures to one or more temperature thresholds. If the temperature of the battery pack(s) exceeds a threshold or falls outside of a target range, the one or more processors may adjust a command to GSS 300 to keep the battery pack temperature within the target range. For example, the one or more processors will command the GSS 300 to increase coolant flow rate to the battery packs, increase a coolant pressure to the battery packs, and/or decrease the temperature of the coolant. The commanded adjustments to coolant requirements may be based on one or more models and/or experimental data.

FIGS. 7A, 7B, 7C, 7D, 7E, 7F, and 7G illustrate examples of charging regulation, consistent with the disclosed embodiments.

Figure 7A:
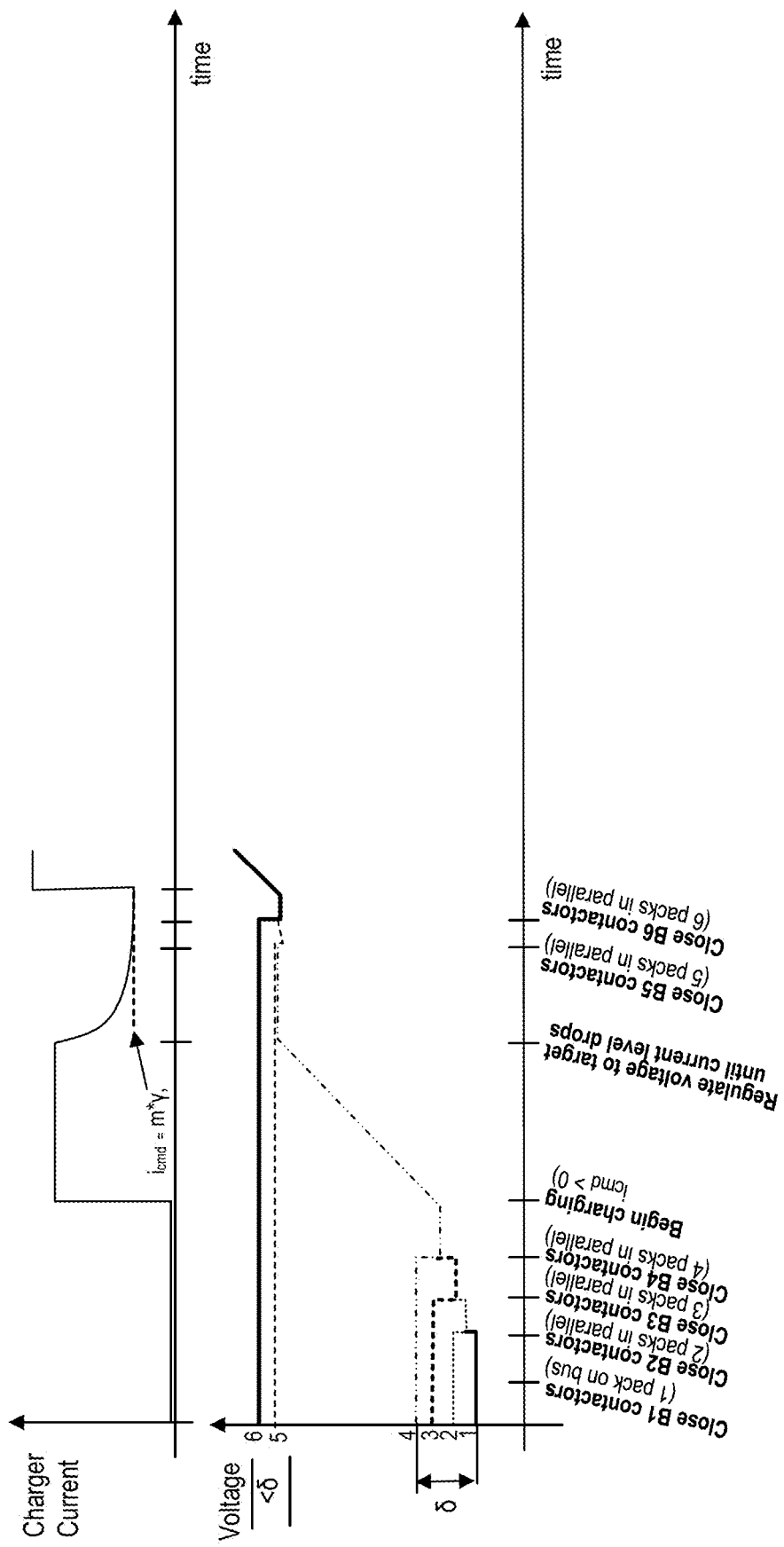

FIG. 7A illustrates an example of adding individual battery packs to an inactive bus in a service mode. For example, as described above with respect to FIG. 6 step 605, battery packs may be selected to electrically connect to a charging bus based on their voltages being within a threshold from the lowest battery pack voltage level, $(\Delta v) < \delta$. In the example shown in FIG. 7A, four battery packs have voltages within a threshold from the lowest battery pack voltage level (voltage of battery pack 1). In some embodiments, the battery packs may be brought on the inactive bus in the order of battery pack with lowest voltage (battery pack 1) to battery pack with the highest voltage (battery pack 4). Bringing battery packs on the inactive bus in this manner may reduce a current flow between battery packs and thereby protect battery pack contactors. Once all battery packs within the threshold are on the bus, charging will commence, and the battery pack voltages will be increased.

FIG. 7A further illustrates an example of adding individual battery packs to an active bus. In some embodiments, commands to GSS 300 will regulate the voltage of the battery packs on the bus to the voltage level of the next lowest battery pack voltage (e.g., voltage of battery pack 5). As described above, the commanded current may be limited to avoid battery pack contactor limits. The next lowest battery pack may be added to the charging bus. After adding the battery pack, the voltage of the battery packs on the bus will dip based on the current being split to the new battery pack. In some embodiments, other battery packs (e.g., battery pack 6) within a threshold voltage of the next lowest battery pack voltage may also be added to the charging bus. Once all battery packs are on the bus, commands to GSS 300 will regulate the current to the target charging current (e.g., as established by a charging protocol).

Figure 7B:
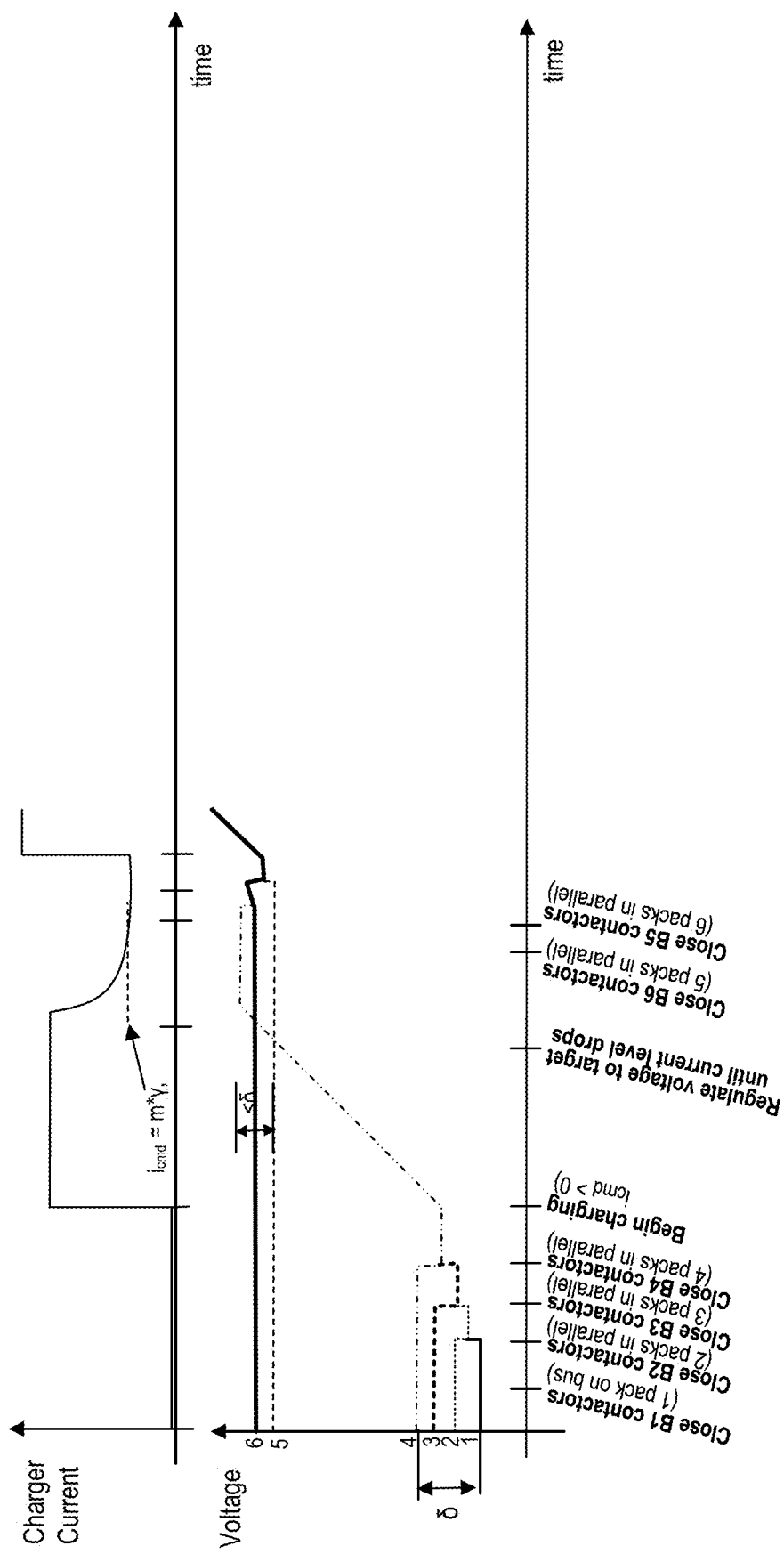

FIG. 7B illustrates another example of adding individual battery packs to an active bus. As shown in FIG. 7B, in some embodiments, commands to GSS 300 may regulate the voltage of the battery packs on the bus above the next lowest battery pack voltage (and/or above all remaining battery packs). For example, the voltage of the battery packs on the bus may be regulated to a threshold above the next lowest battery pack voltage. If multiple battery packs fall within the threshold range, the battery pack with the highest voltage (e.g., battery pack 6) may be added to the charging bus first. In some embodiments, other battery packs (e.g., battery pack 5) within the threshold voltage range may also be added to the charging bus. Once all battery packs are on the bus (e.g., electrically connected to the bus), commands to GSS 300 will regulate the current to the target charging current (e.g., as established by a charging protocol).

Figure 7C:
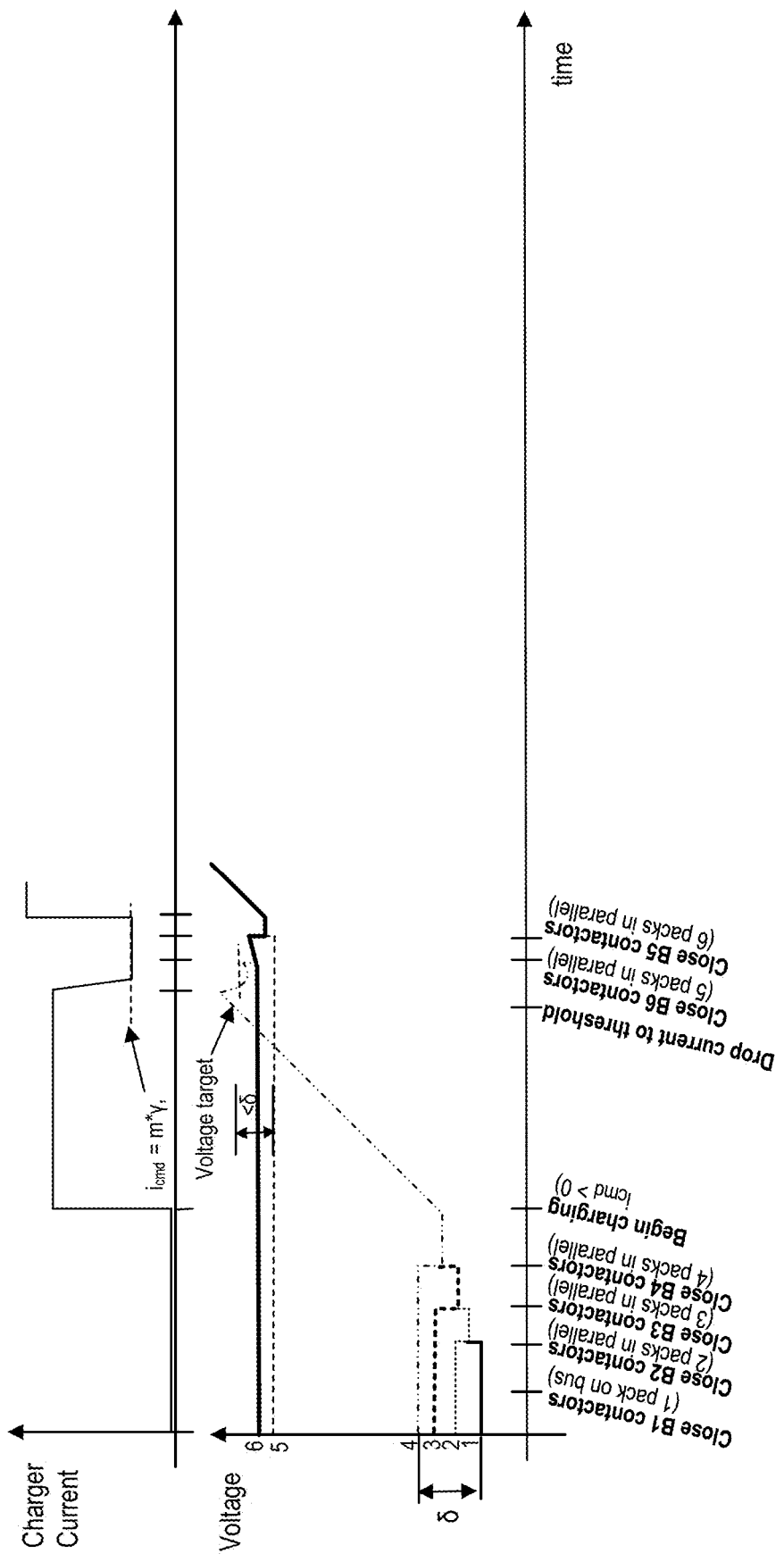

FIG. 7C illustrates another example of adding individual battery packs to an active bus. As shown in FIG. 7C, in some embodiments, commands to GSS 300 may regulate the voltage of the battery packs on the bus above the next lowest battery pack voltage (and/or above all remaining battery pack voltages). For example, the voltage of the battery packs on the bus may be regulated above the threshold associated with adding the next lowest battery pack voltage. The current level may then be stepped down to accommodate adding the next selected battery pack(s). In some embodiments the commanded current may be regulated based on the equation $V=v\_ocv(soc)+v\_polar+R*I$, where v_oc is the open circuit voltage, v_polar is a voltage based on polarization, "R" is the resistance of the battery pack, and "I" is the current flow. The required change in current to drop within the threshold may be determined based on $dV\sim=R*di$.

If multiple battery packs fall within the threshold range, the battery pack with the highest voltage (e.g., battery pack 6) may be added to the charging bus first. In some embodiments, other battery packs (e.g., battery pack 5) within the threshold voltage range may also be added to the charging bus. Once all battery packs are on the bus, commands to GSS 300 will regulate the current to the target charging current (e.g., as established by a charging protocol).

Figure 7D:
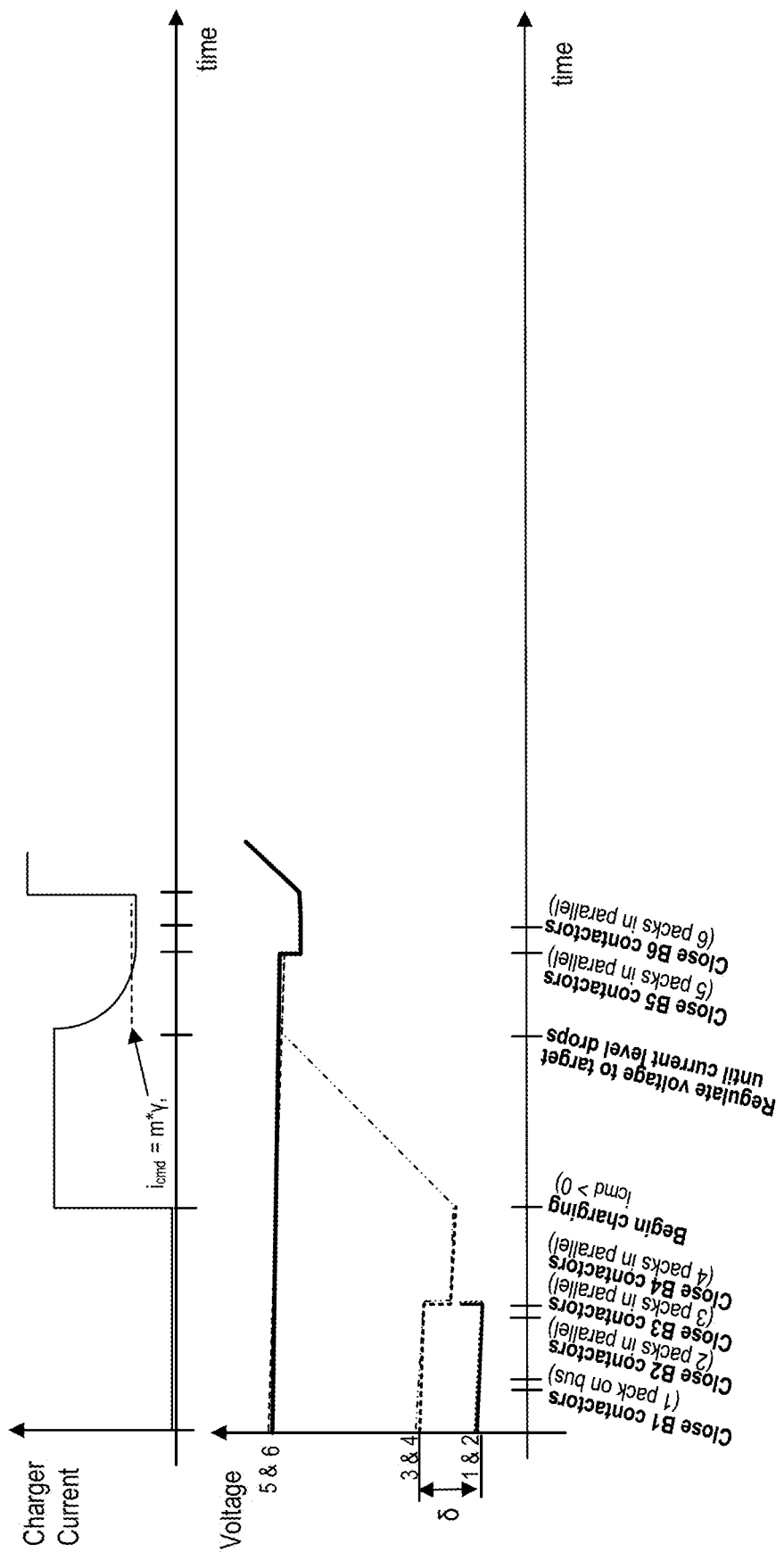

FIG. 7D illustrates an example of adding battery packs to an inactive bus in a ground mode (e.g., FIG. 4D). As described above with respect to FIG. 7A, battery packs may be selected to electrically connect to a charging bus based on their voltages being within a threshold from the lowest battery pack voltage level, $(\Delta v)<8$. In the example shown in FIG. 7D, two pairs of battery packs 1 & 2 and 3 & 4 are within a threshold of the lowest battery pack voltage level (voltage of battery packs 1 & 2). The battery packs may be brought onto the bus in groups of connected batteries from connected battery packs with lowest voltage to connected battery packs with the highest voltage. The connected battery packs may be brought on the bus sequentially or simultaneously. As shown, before charging begins, the voltage level of the battery packs continues to decrease because in the ground mode the battery packs are connected to low voltage loads. Therefore, when the aircraft is determined to be in a ground mode (e.g., after determining, in response to, based on etc.), the one or more processors command the GSS 300 in consideration of the charge lost. Once all battery packs within the threshold are on the bus, charging will commence, and the battery pack voltages will be increased.

FIG. 7D further illustrates an example of adding battery packs to an active bus. In some embodiments, commands to GSS 300 will regulate a charging bus voltage to the voltage level of the next lowest connected battery packs' voltage (e.g., voltage of battery packs 5 & 6). As described above, the commanded current may be limited to avoid battery pack contactor limits. The next group of connected battery packs may be added to the charging bus (e.g., sequentially or simultaneously). After adding the connected battery packs, the voltage of the battery packs on the bus will dip based on the current being split to the new battery packs. Once all battery packs are on the bus, commands to GSS 300 will regulate the current to the target charging current (e.g., as established by a charging protocol).

Figure 7E:
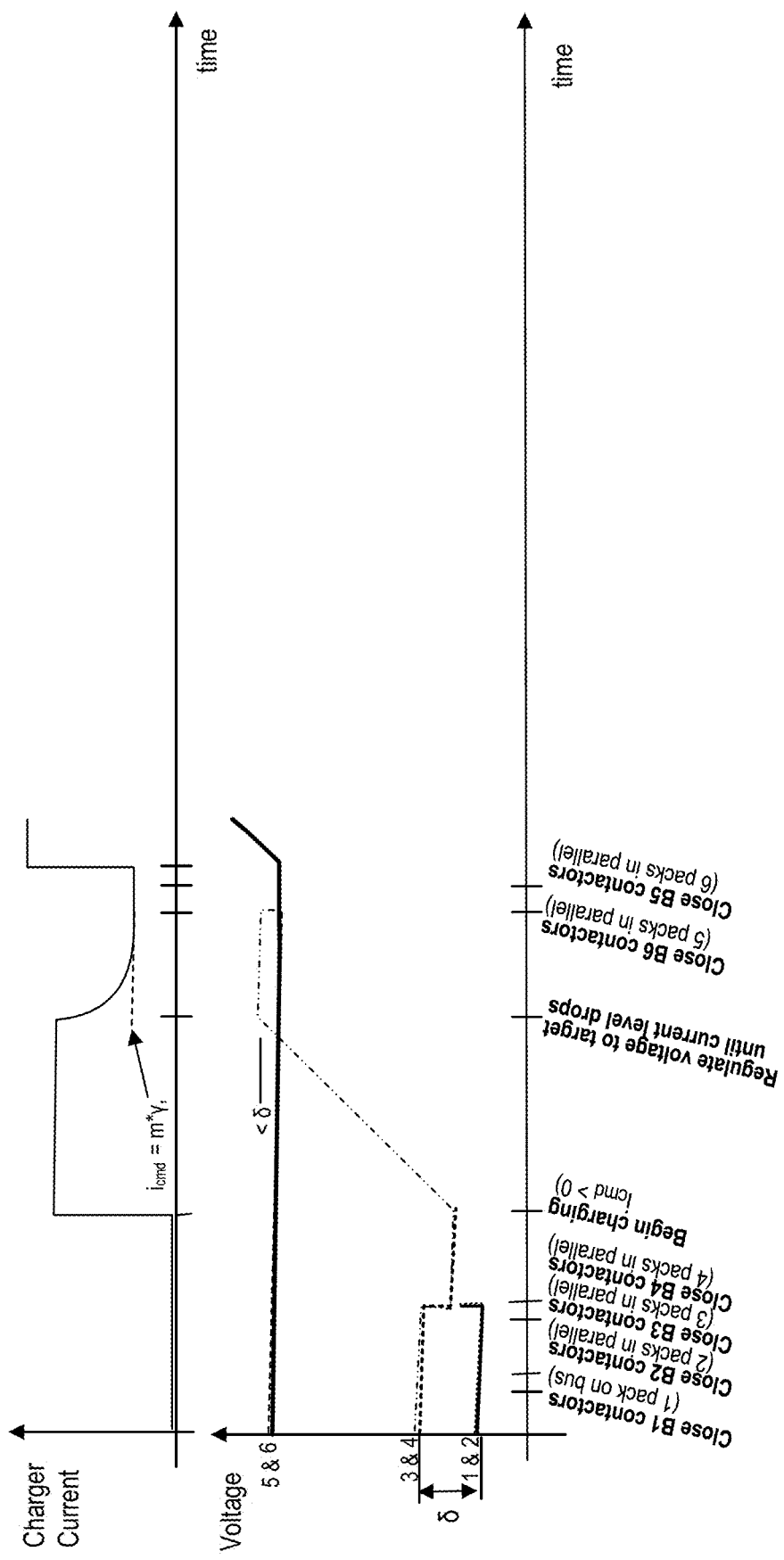

FIG. 7E illustrates an example of adding battery packs to an active bus. As shown in FIG. 7E, in some embodiments, commands to GSS 300 may regulate the voltage of the battery packs on the bus above the next lowest connected battery packs' voltage (and/or above all remaining battery packs). For example, the voltage of the battery packs on the bus may be regulated to a threshold above the next lowest connected battery packs' voltage. If multiple battery packs fall within the threshold range, the connected battery packs with the highest voltage may be added to the charging bus. In the example provided, connected battery packs 5&6 fall within the threshold and are added to the charging bus. In some embodiments, other battery packs within the threshold voltage range may also be added to the charging bus. Once all battery packs are on the bus, commands to GSS 300 will regulate the current to the target charging current (e.g., as established by a charging protocol).

Figure 7F:
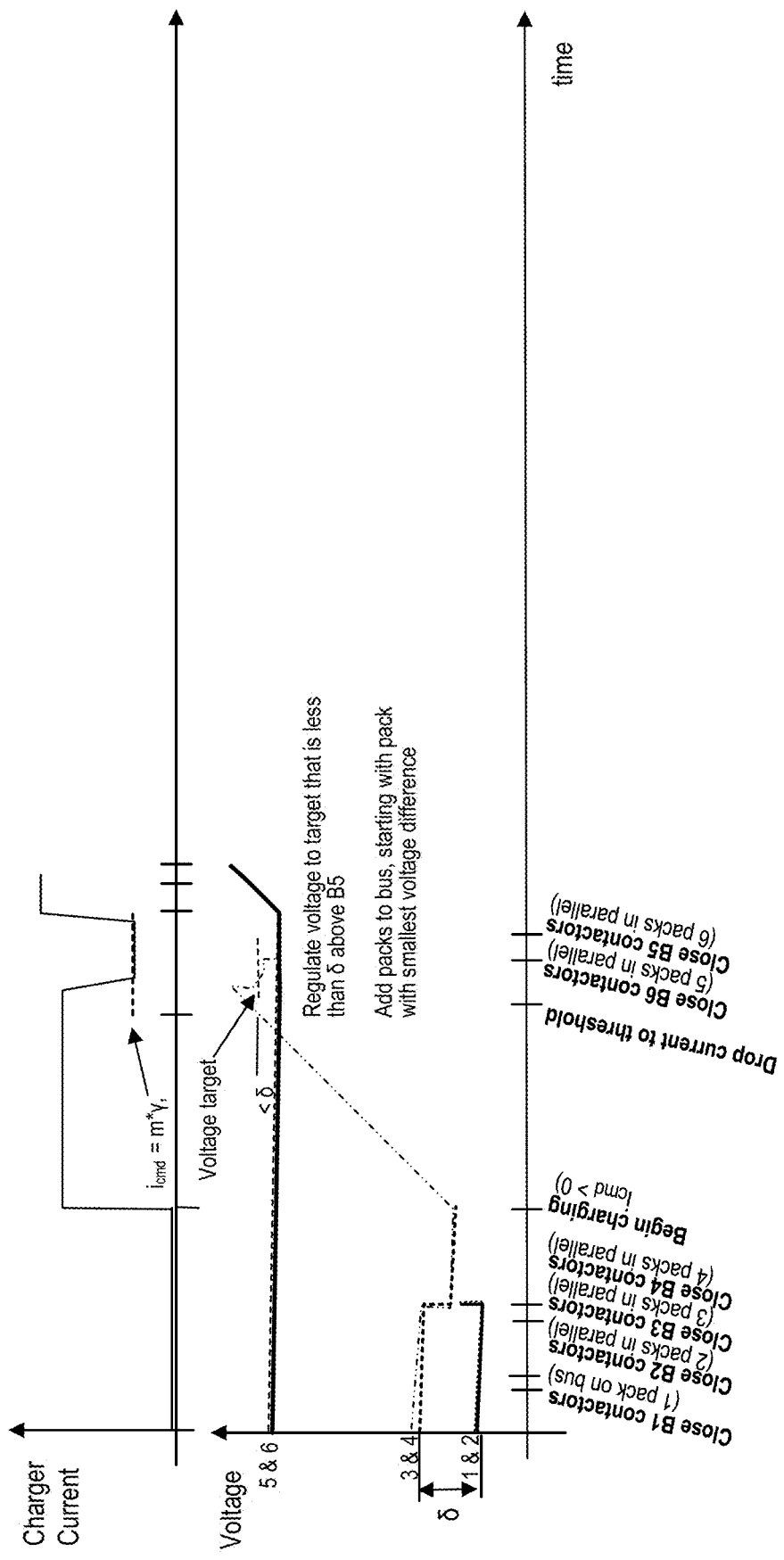

FIG. 7F illustrates another example of adding battery packs to an active charging bus. As shown in FIG. 7F, in some embodiments, commands to GSS 300 may regulate the voltage of the battery packs on the bus above the next lowest connected battery packs' voltage (and/or above all remaining battery pack voltages). For example, the voltage of the battery packs on the bus may be regulated above the threshold associated with adding the next lowest connected battery packs' voltage. In some embodiments the commanded current may be regulated based on the equation $V=v\_ocv(soc)+v\_polar+R*I$, where v_oc is the open circuit voltage, v_polar is a voltage based on polarization, "R" is the resistance of the battery pack, and "I" is the current flow. The required change in current to drop within the threshold may be determined based on $dV\sim=R*di$. The current level may then be stepped down to accommodate adding the next selected battery pack(s).

If multiple sets of connected battery packs fall within the threshold range, the connected battery packs with the highest voltage may be added to the charging bus first. In some embodiments, other connected battery packs within the threshold voltage range may also be added to the charging bus. Once all battery packs are on the bus, commands to GSS 300 will regulate the current to the target charging current (e.g., as established by a charging protocol).

Figure 7G:
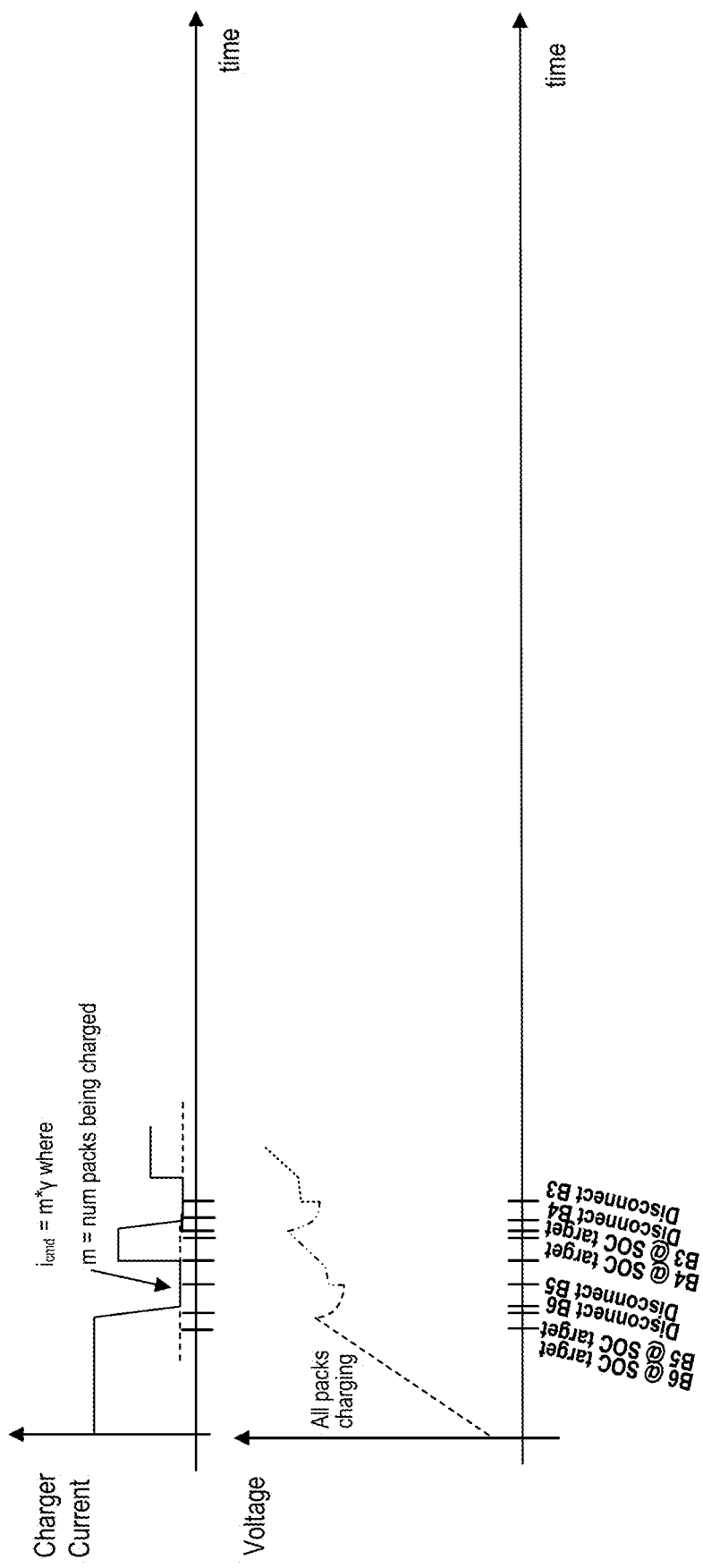

FIG. 7G illustrates an example of disconnecting battery packs once they reach a state of charge target in a ground mode. For example, as described above with respect to FIG. 6 step 609, battery packs may be determined to meet a target state of charge. A group of connected battery packs may be selected for removal from the charging bus once each battery pack in the group of connected battery packs meets their target state of charge. Commands to GSS 300 may regulate the current to ensure the current is below a limit allowed by battery pack contactor limits. The selected connected battery packs may then be electrically disconnected from the charging bus. Once the connected battery packs are removed from the charging bus, commands to GSS 300 will regulate the current to the target charging current (e.g., as established by a charging protocol). The one or more processors will monitor the state of charge of all remaining battery packs and repeat the above process until all battery packs have been electrically disconnected from the charging bus.

FIG. 8A is a block diagram of an exemplary of a charging and cooling system for an aircraft 800A, consistent with disclosed embodiments. In some embodiments, the charging and cooling system may be configured to supply electric power and/or coolant to at least one battery onboard a vehicle. For example, a vertiport 801 (or other location or facility) may be configured to supply electric power via ground charging subsystem 803 and coolant via thermal conditioning subsystem 805 to a battery system onboard aircraft 807. In some embodiments, ground charging subsystem 803 and thermal conditioning subsystem 805 may correspond to Ground Charging Subsystem 310 and Thermal Conditioning Subsystem 320, respectively. A vertiport may refer to a facility or location designed for the takeoff, landing, charging, cooling, and/or storage of aircraft, including VTOL aircraft, and may include operational infrastructure to support such operations. In some embodiments, the vertiport and the aircraft may be configured to send and receive data from each other. For example, vertiport 801 and aircraft 807 may be configured to send and receive data 808, including one or more electric charging parameters, one or more cooling parameters, flight plan data, indications of battery state, any combination of the foregoing, or any other suitable data associated with the aircraft. Further, vertiport 801 and aircraft 807 may transmit data 808 to each other while vertiport 801 is supplying electric power and coolant to aircraft 807. In general, the term "cooling," as used herein, may refer to the lowering, raising, regulation, monitoring, and/or maintenance of the temperature of one or more devices (e.g., battery onboard an aircraft). FIG. 8B is a block diagram of an exemplary charging and cooling system 800B, consistent with disclosed embodiments. In some embodiments, the vertiport (e.g., vertiport 801) may include a ground charging subsystem. A ground charging subsystem 803 may refer to infrastructure, including hardware and/or software, configured to provide electric power. In some embodiments, the ground charging subsystem may include a connection to the electric grid. The connection to the electric grid may include an electrical connection to a power line, a transformer, a processor, any combination of the foregoing, or any other suitable components or circuitry needed to electrically connect ground charging subsystem 803 to the electric grid or transform electric power from the electric grid to at most a power limit associated with the ground charging subsystem. The electric grid may refer to the interconnected network of power generation, transmission, and distribution that delivers electric power from a power source (e.g., power plant). For example, connection 811 may include a wired connection to a power line, a transformer to step down the received electric power to a suitable voltage, and at least one processor configured to monitor how much electric power ground charging subsystem 803 is utilizing.

Further, in some embodiments, the ground charging subsystem may include one or more chargers. A charger may refer to equipment configured to supply electric power to one or more vehicles. A charger may include hardware and/or software components configured to regulate or monitor the flow of electric power as well as communicate with a vehicle, such as at least one processor. For example, ground charging subsystem 803 may include a plurality of chargers 813, each configured to receive electric power from connection 811 and data from a vehicle, such as aircraft 807. In some embodiments, a charger may include a step-down transformer, or any other electric power converter, to transform electric power from the connection to the electric grid to at most a power limit associated with the charger Further, in some embodiments, the ground charging subsystem may include one or more dispensers. A dispenser may refer to equipment configured to operatively connect and couple a vehicle to a charger. For example, dispenser 815 may include a charge port configured to mechanically and electrically couple a vehicle (e.g., aircraft 807) to ground charging subsystem 803. Further, dispenser 815 may include one or more connections configured to facilitate the transfer of data between ground charging subsystem 803 and aircraft 807. For example, data may include an indication of battery state or one or more electric charging parameters. In some embodiments, the dispenser may include a charger handle. The charger handle may be configured to physically connect to the aircraft via at least one positive/negative high voltage connector. In some embodiments, GSS 300 shown in FIGS. 3A-3B may comprise one or more dispensers 815.

In some embodiments, the ground charging subsystem may be configured to output electric power to one or more batteries onboard the aircraft in accordance with one or more electric charging parameters. The electric charging parameters may include one or more of: a charging time, a charging rate, a charging power, a charging current, a charging voltage, a charging mode, a charging capacity, a target state of charge (SOC), and a target state of energy (SOE).

A charging time may include a duration of time to output electric power or charge to a battery. A charging rate may include a charging speed and may refer to how quickly charge is added to a battery or battery pack. For example, a charging rate may be represented as a Coulombs per unit time (e.g., second, minute), an increase of SOC or SOE per unit time (e.g., increase SOC by 5% per minute), a C-rate, or any other suitable representation of charge added per unit time. A charging power may include a power at which charging occurs (e.g., 5 kilowatts, 10 kilowatts, etc.). A charging current may include a current at which charging occurs (e.g., 5 amperes, 10 amperes, etc.). A charging voltage may include a voltage at which charging occurs (e.g., 5 volts, 10 volts, etc.).

A charging mode may refer to a type of charging. For example, a charging mode may include a slow charge mode and a fast charge mode. A slow charge mode may refer to a type of charging in which electric power is added to a battery slowly (e.g., slower than a fast charge mode). A slow charge mode may be desirable because it may optimize charging by maximizing a battery's long-term health at the cost of charging time. For example, FIG. 5C illustrates an exemplary slow charge mode charging profile, e.g., a slow charge mode may charge an aircraft at a C-rate of 0.5 C or less. A fast charge mode may refer to a type of charging in which electric power is added to a battery quickly (e.g., faster than the slow charge mode). A fast charge mode may be desirable because it may optimize charging by minimizing a charging time at the cost of a battery's long-term health. For example, FIG. 5A illustrates an exemplary fast charge mode charging profile, e.g., a fast charge mode may charge an aircraft at a C-rate of 2 C or more.

In some embodiments, a slow charge mode may include a lower bound. At least one processor (e.g., CCU 363, ground charging subsystem 310) may determine the lower bound based at least in part on the minimum current an offboard charger (e.g., charger 813) can deliver to the aircraft (e.g., between 1 A and 10 A). In some embodiments, at least one charger may implement a slow charge mode for overnight charging. Additionally or alternatively, in some embodiments, at least one processor may determine the lower bound for a slow charge mode based at least in part on a charging time. For example, the at least one processor (e.g., ground charging subsystem 310) may implement a slow charge mode for an aircraft for overnight charging using a C-rate, for example, of 0.2 C or less. The lower bound C-rate of a slow charge mode may depend on the length of that overnight period, e.g., 8 hrs. As an additional example, the lower bound for slow charge mode may be at least C/30 for a much longer charging time (e.g., 12 hours, 24 hours).

In some embodiments, a fast charge mode may include an upper bound. At least one processor (e.g., CCU 363, ground charging subsystem 310) may determine the upper bound based at least in part on a battery characteristic. For example, the at least one processor may determine the upper bound based on the maximum charge current a battery cell can handle, which may depend on the battery cell's chemistry and/or design. Additionally or alternatively, in some embodiments, a fast charge mode may comprise a multi-step protocol. A multi-step protocol may refer to a charge protocol that includes charging at a plurality of different rates (e.g., C-rates) at different steps or stages. For example, a 3-step protocol (e.g., as depicted in FIG. 5D) may include starting with a higher C-rate (e.g., 5 C) for a short duration, followed by a middle C-rate (e.g., 2 C), then a lower C-rate (e.g., 1 C), and then decreasing C-rate until the charge is complete. The higher C-rate portion may be realized or implemented only at low SOCs before it is derated to a middle or lower C-rate to avoid violating a battery characteristic (e.g., an upper voltage limit).

A charging capacity may refer to the amount of electric power available to be dispensed to a battery. For example, a charging capacity may include a charging capacity of a dispenser 815, a charger 813, or ground charging subsystem 803. Further, a charging capacity may refer to the amount of electric power is available for dispensing (i.e., power availability). The charging capacity of one dispenser 815 may be less than the charging capacity of the corresponding charger 813, which may have a lower charging capacity value than the charging capacity of the entire ground charging subsystem 803. Charging capacity may also be influenced by an estimated or measured load, for example, on the electric grid to which the vertiport is connected.

A target SOC may refer to a goal SOC at least to which the battery should be charged (e.g., 50%, 70%, etc.). A target SOE may refer to a goal SOE at least to which the battery should be charged (e.g., 50%, 70%, etc.). In some embodiments, the target SOC or target SOE may be determined based on flight data. For example, the target SOC or target SOE may be the minimum SOC or SOE required to accomplish the next scheduled flight, including being in compliance with any safety regulations.

In some embodiments, the one or more electric charging parameters may be based on an indication of battery state associated with a battery onboard an aircraft. An indication of battery state may include an indication of battery state and may include, for example, a state of temperature (SOT), a SOC, a state of health (SOH) and/or an SOE. A battery SOT may refer to a temperature of a battery or battery pack and may include a battery's temperature while charging. A battery SOH may refer to a current condition or overall health of a battery relative to its original, acceptable, preferable, or optimal state and may indicate the battery's remaining capacity, performance, or remaining lifetime.

In some embodiments, the one or more electric charging parameters may be determined by the ground charging subsystem. For example, ground charging subsystem 803 may receive data (e.g., indication of battery state and flight plan data) from aircraft 807. The ground charging subsystem may be configured to determine the one or more electric charging parameters based on the received indication and flight plan data by optimizing the one or more electric charging parameters to charge the battery to a target SOC or SOE before the aircraft's next scheduled flight while also maximizing SOH.

A battery health, or battery state of health (SOH), may refer to a current condition or overall health of a battery relative to its original, acceptable, preferable, or optimal state and may indicate the battery's remaining capacity, performance, or remaining lifetime. A battery temperature may refer to a temperature of a battery or battery pack and may include a battery's temperature while charging.

Additionally or alternatively, in some embodiments, the one or more electric charging parameters may be determined by the aircraft (e.g., by a charge control unit 363 shown in FIGS. 3A-3B), as described and exemplified elsewhere herein. Additionally or alternatively, in some embodiments, the one or more electric charging parameters may be determined by a user. For example, a user may select electric charging parameters via a user interface, such as a display, a touch display, a knob, a slider, any combination of the foregoing, or any other suitable means of selecting or inputting a value. In some embodiments, the user may only select electric charging parameters from a list or range of options. For example, a user may only be able to select a charging power between a minimum and maximum charging power, which may be predetermined and preset or determined dynamically by a processor. For example, a user may input charging parameters via GSS 300, user interface 365, and/or user interface 374b as described above.

In some embodiments, the ground charging subsystem may be configured to charge an aircraft battery according to one or more determined electric charging parameters. In some embodiments, the ground charging subsystem may be configured to charge asymmetrically. For example, the charger may charge each of a plurality of high voltage channels differently. In some embodiments, differential charging of the high voltage channels may be based on an expected load on each of the batteries aboard the aircraft associated with the high-voltage channels. In some embodiments, the differential charging may be configured to balance the SOC or SOE of the batteries aboard the aircraft, or to reduce the imbalance between the SOC or SOE of the batteries aboard the aircraft.

In some embodiments, the ground charging subsystem may be configured to charge a plurality of aircrafts simultaneously. For example, one or more chargers may each charge one or more aircrafts. Further, in some embodiments, the ground charging subsystem may be configured to charge the plurality of aircrafts asymmetrically. For example, the ground charging subsystem may allocate a larger proportion of the charging capacity to a first aircraft and may allocate a smaller proportion of the charging capacity to a second aircraft. The ground charging subsystem may determine which of the plurality of aircraft should receive more power based on the indications of battery state and flight plan data associated with each aircraft. For example, if the first aircraft has a lower SOC than the second aircraft, the ground charging subsystem may prioritize charging the first aircraft, and the ground charging subsystem may set the charge mode of the first aircraft to fast charge mode. Prioritizing charging may include allocating more of the charging capacity to a particular battery or battery system. Further, for example, if a first aircraft has a scheduled flight sooner than a second aircraft, the ground charging subsystem may prioritize charging the first aircraft, and the ground charging subsystem (e.g., GSS 300 or ground charging subsystem 310) may set the charge mode of the first aircraft to fast charge mode. As an additional example, if a first aircraft is charging and a second aircraft is scheduled to land and charge at the vertiport before the first aircraft is currently scheduled to finish charging, the ground charging subsystem may allocate more charging capacity to the first aircraft to finish the required charging of the first aircraft before the second aircraft lands or begins charging. The ground charging subsystem may also determine charging allocation based on other parameters, such as SOC or predicted SOC, consistent with disclosed embodiments. For example, the ground charging subsystem may determine that a first aircraft inbound to the vertiport will have a low predicted SOC when it lands at the vertiport, and may prioritize charging battery packs for that first aircraft over those of at least one second aircraft (e.g., already present at the vertiport), for example when the first aircraft needs to depart quickly for another flight. Additionally or alternatively, in some embodiments, the ground charging subsystem may set one or more digital flags associated with an aircraft based on a corresponding state of the battery pack. For example, the ground charging subsystem may set a digital flag after a first aircraft's battery reaches the target SOC. The ground charging subsystem may then deprioritize charging the first aircraft because the digital flag indicates that no further charging is required, and the ground charging subsystem may set the charge mode of the first aircraft to slow charge mode. Further, in some embodiments, the ground charging subsystem may allocate more of the charging capacity to an aircraft with an associated set digital flag after determining all other aircrafts also have a set digital flag. For example, if the ground charging subsystem determines that all aircraft have at least a minimum SOC (e.g., target SOC), then the ground charging subsystem may allocate more charging capacity to each aircraft.

In some embodiments, the ground charging subsystem may be configured to allocate charging capacity based on an estimated load. An expected load may refer to an amount of electric power the ground charging subsystem determines will be drawn from the electric grid to perform charging operations. For example, the ground charging subsystem may determine the expected load by optimizing an objective function designed to reduce or minimize load subject to constraints. The constraints may include a list of vehicles (each with a current SOE, a target SOE, and a time to reach the target SOE by), a target maximum load (for each dispenser, charger, or the ground charging subsystem), a time of day, any combination of the foregoing, or any other suitable variables associated with electric charging and power consumption. The objective function may be designed to prevent the ground charging subsystem from drawing too much power (e.g., a hazardous amount of power) from the electric grid at any given time during operation.

Additionally or alternatively, in some embodiments, the ground charging subsystem may allocate charging capacity based on a weighted distribution system. A user may input, via a user interface (e.g., at an aircraft at user interface 365 and/or user interface 364*b*, at dispenser or charger), a prioritization value, which may be sent to and stored in the ground charging subsystem. The prioritization value may be a weight, value, or other indicator of relative priority between charging recipients, such as an integer variable (e.g., a value of 1, 5, 10, etc.), indicating how urgently the aircraft requires charging (e.g., very low SOC, next scheduled flight soon). For example, if the ground charging subsystem is charging a plurality of aircraft, the ground charging subsystem may allocate more charging capacity to the aircraft with a greater prioritization value. Further, in some embodiments, the user interface may prompt the user to regularly update the prioritization value. For example, the user interface may prompt the user at regular time intervals (e.g., every 15 minutes, every 30 minutes, etc.) to update the prioritization value or confirm the prioritization value is unchanged. If the user fails to update or confirm the prioritization value, the ground charging subsystem may automatically set the prioritization value of that aircraft to the lowest prioritization value (e.g., 0, −1, etc.).

In some embodiments, the vertiport (e.g., vertiport 801) may include a thermal conditioning subsystem. A thermal conditioning subsystem may refer to infrastructure, including hardware and/or software, configured to provide coolant. Coolant may refer to a fluid or gas used to transfer heat in a system or component to regulate its temperature. For example, coolant may be used to lower the temperature of a battery while charging to prevent it from overheating. Further, coolant may be used to raise the temperature of a battery to prime the battery to an acceptable or preferable operating temperature. For example, when a device or system (e.g., GSS 300 or thermal conditioning subsystem 320) determines that a charging aircraft has an upcoming flight within a predetermined threshold amount of time, it may transmit a command to cause coolant to raise the battery temperature of the aircraft to prepare it for the flight. In some embodiments, the thermal conditioning subsystem may include a cooling tower. A cooling tower may refer to a structure configured to store, manage, and/or thermally regulate battery coolant. Further, a cooling tower may involve at least one processor and one or more sensors configured to monitor and measure data associated with coolant, such as an amount of available coolant or temperature.

In some embodiments, the thermal conditioning subsystem may be configured to output coolant to one or more batteries onboard the aircraft in accordance with one or more cooling parameters. The cooling parameters may include one or more of: a coolant flow rate, a coolant pressure, a coolant temperature, a cooling capacity, and a target battery temperature. A coolant flow rate may refer to a volume or quantity of coolant that passes through a system per unit of time (e.g., L/min). A coolant pressure may refer to a force exerted by coolant in a system (e.g., psi, kPa). A coolant temperature may refer to a temperature of coolant (e.g., Fahrenheit, Celsius). Further, a coolant temperature may refer to a temperature of coolant being dispensed to a battery for thermal conditioning or a temperature of stored coolant (e.g., coolant stored in a cooling tower). A cooling capacity may refer to an amount of coolant available to be dispensed to a battery. Further, a cooling capacity may include an amount of coolant stored in a cooling tower or an amount of coolant within a temperature range. For example, a cooling capacity for coolant for heating a battery may differ from a cooling capacity for coolant for cooling a battery based on a coolant temperature and/or an indication of battery SOT. A target battery temperature may refer to a goal temperature or temperature range for a battery. A target battery temperature may include a temperature range within which the battery may perform preferably or acceptably. Further, a target battery temperature may include a minimum temperature and/or a maximum temperature to which the coolant should thermally condition or regulate the battery.

Further, in some embodiments, the thermal conditioning subsystem may include a thermal management system (TMS) 823. The TMS may include hardware (e.g., at least one processor) and/or software configured to receive data from an aircraft, such as battery cell temperatures, battery cell temperature predictions/estimates, battery pack temperatures, battery pack temperature predictions/estimates, any combination of the foregoing, or any other suitable data related to a battery SOT. In some embodiments, the TMS may be further configured to receive battery coolant from the cooling tower. In some embodiments, the TMS may comprise a thermal conditioning handle. The thermal conditioning handle may be configured to physically connect to the aircraft via an inlet/outlet hose. In some embodiments, the TMS may be configured to facilitate the thermal regulation of one or more batteries onboard an aircraft while the aircraft is not charging. For example, TMS 823 may be configured to, based on (e.g., after, in response to, using information from) receiving battery temperature(s) from an aircraft, determine if the battery temperature(s) are within a preferable or acceptable operating range (e.g., between 50° F. and 140° F. or between 10° C. and 60° C.). Based on (e.g., after, in response to, using information from) determining that the battery temperature(s) are not in the range, a device or system (e.g., GSS 300, thermal conditioning subsystem 320) may supply coolant to raise or lower the battery temperature(s) until they are within the range.

In some embodiments, the aircraft may be configured not to carry any coolant fluid onboard during flight. For example, aircraft 807 may be configured purge or remove all coolant received while cooling before takeoff. In other embodiments, the aircraft may be configured to carry at least some coolant fluid onboard during flight. For example, aircraft 807 may be configured to retain at least some of the coolant received while cooling to continue cooling the battery system during flight.

In some embodiments, the thermal conditioning subsystem may comprise a coolant discharge port configured to output battery coolant. The thermal conditioning subsystem may supply battery coolant to at least one battery onboard an aircraft via the coolant discharge port. Further, in some embodiments, the thermal conditioning subsystem may comprise a coolant intake port. The coolant intake port may be configured to receive battery coolant from the aircraft. For example, in some embodiments, the aircraft may be configured to carry no coolant onboard during flight or a reduced amount of coolant onboard during flight compared to at the vertiport. For such aircraft, before and/or during charging at the vertiport, the coolant discharge port may be configured to output battery coolant to the batteries onboard the aircraft, and the coolant intake port may be configured to receive battery coolant from the batteries onboard the aircraft. In some embodiments, a coolant discharge port and the coolant intake port may be configured to be part of a single assembly that may be configured to be mechanically coupled to the aircraft. Further, the coolant discharge port and/or the coolant intake port may be part of the thermal conditioning handle.

In some embodiments, the thermal conditioning subsystem may be configured to supply coolant to a plurality of aircrafts simultaneously. For example, the TMS may be configured to supply coolant to one or more aircrafts. Further, the thermal conditioning subsystem may be configured to supply coolant to a plurality of aircrafts asymmetrically. For example, the thermal conditioning subsystem may allocate a larger proportion of the coolant capacity to a first aircraft and may allocate a smaller proportion of the coolant capacity to a second aircraft. The thermal conditioning subsystem may determine which of the plurality of aircraft should receive more coolant based on the indications of battery state and flight plan data associated with each aircraft. For example, if the first aircraft has a battery temperature greater than its target battery temperature range, and the second aircraft has a battery temperature within its target battery temperature range, the thermal conditioning subsystem may prioritize cooling the first aircraft. Prioritizing cooling may include allocating more of the coolant capacity to a particular battery or battery system. As an additional example, if the thermal conditioning subsystem is thermally conditioning a first aircraft and a second aircraft is scheduled to land and be thermally conditioned at the vertiport before the first aircraft is currently scheduled to finish thermal conditioning, the thermal conditioning subsystem may allocate more coolant capacity to the first aircraft to finish the required thermal conditioning of the first aircraft before the second aircraft lands or begins thermal conditioning. The thermal conditioning subsystem may also determine coolant allocation based on other parameters, such as SOT or predicted SOT, consistent with disclosed embodiments. For example, the ground charging subsystem may determine that a first aircraft inbound to the vertiport will have a high predicted SOT when it lands at the vertiport, and may prioritize thermal conditioning battery packs for that first aircraft over those of at least one second aircraft (e.g., already present at the vertiport), for example when the first aircraft needs to depart quickly for another flight.

Additionally or alternatively, in some embodiments, the thermal conditioning subsystem may set one or more digital flags associated with an aircraft based on a corresponding state of the battery pack. For example, the thermal conditioning subsystem may set a digital flag after a first aircraft's battery reaches the target battery temperature. The thermal conditioning subsystem may then deprioritize thermal conditioning of the first aircraft because the digital flag indicates that no further thermal conditioning is required. Further, in some embodiments, the thermal conditioning subsystem may allocate more of the coolant capacity to an aircraft with an associated set digital flag after determining all other aircrafts also have a set digital flag. For example, if the thermal conditioning subsystem determines that all aircraft are within a target battery temperature range, then the thermal conditioning subsystem may allocate more coolant capacity to each aircraft.

Additionally or alternatively, in some embodiments, the thermal conditioning subsystem may allocate coolant capacity based on a weighted distribution system. A user may input, via a user interface (e.g., at an aircraft at user interface 365 and/or user interface 364*b*, at TMS 823 or cooling tower 821), a prioritization value, which may be sent to and stored in the thermal conditioning subsystem. The prioritization value may be a weight, value, or other indicator of relative priority between charging recipients, such as an integer variable (e.g., a value of 1, 5, 10, etc.), indicating how urgently the aircraft requires thermal conditioning (e.g., SOT far from target battery temperature range, next scheduled flight soon). For example, if the thermal conditioning subsystem is thermally conditioning a plurality of aircraft, the thermal conditioning subsystem may allocate more coolant capacity to the aircraft with a greater prioritization value. Further, in some embodiments, the user interface may prompt the user to regularly update the prioritization value. For example, the user interface may prompt the user at regular time intervals (e.g., every 15 minutes, every 30 minutes, etc.) to update the prioritization value or confirm the prioritization value is unchanged. If the user fails to update or confirm the prioritization value, the thermal conditioning subsystem may automatically set the prioritization value of that aircraft to the lowest prioritization value (e.g., 0, −1, etc.).

FIG. 9 is a flow diagram of an exemplary charging and cooling process 900, consistent with the embodiments of the present disclosure. It is intended that the sequence of steps shown in FIG. 9 is only for illustrative purposes and is not intended to be limited to any particular sequence of steps. As such, those skilled in the art can appreciate that these steps can be performed in a different order while implementing the same method. Further, some steps of process 900 may be performed simultaneously or removed while implementing the same method. All or any steps of process 900 may be performed by one or more processors (e.g., associated with a vertiport), an aircraft (e.g., CCU 363 in FIGS. 3A-3B), a charging system (e.g., ground charging subsystem), a cooling system (e.g., thermal conditioning subsystem), a flight operations control center, any combination of the foregoing, or any other suitable system configured to facilitate the charging and/or cooling of a vehicle. For example, all or any step of process 900 may be implemented by one or more devices or systems discussed with respect to FIGS. 3A, 3B, 8A, and 8B. In some embodiments, only a portion of the steps of process 900 may be performed. Moreover, some steps may be repeated, combined, or re-ordered. In some embodiments, process 900 (e.g., at least one device implementing the process) may not proceed to one step until completing or attempting a preceding step.

At step 901, the aircraft arrives at the vertiport. For example, the aircraft may land at the vertiport.

At step 903, the charger handle is dragged out. For example, a user may take the charger handle from the charger and move it towards the aircraft. In some embodiments, the ground charging subsystem may be configured to detect an aircraft (e.g., via image sensor, motion sensor, weight sensor, any combination of the foregoing, or any other suitable means of detecting an aircraft) and automatically extend or deploy the charger handle towards the aircraft.

At step 905, the charger handle is attached and charging may begin (e.g., with reference to FIGS. 3A-3B, may be initiated by ground charging subsystem 310, CCU 363, or user interface 365). For example, a user may insert the charger handle into the aircraft and begin charging. In some embodiments, the user may interact with the charger handle or charger to begin charging. In some embodiments, at least one processor associated with a ground charging subsystem may initiate charging based on (e.g., after, in response to, using information from) receiving one or more inputs at a user interface, such as a touchscreen, lever, knob, dial, or switch (e.g., the user may press a button or pull a lever to begin charging). Additionally or alternatively, at least one processor may initiate charging based on (e.g., after, in response to, according to the constraint of, only after) determining that the charger handle is inserted (e.g., has sufficient contact) into the aircraft (e.g., charge port 330). The user interface may be user interface 365 as depicted in FIGS. 3A-3B. Additionally or alternatively, charging may begin automatically after the charger handle is coupled to the aircraft. In some embodiments, charging may occur according to one or more electric charging parameters. For example, charge control unit 923 (e.g., CCU 363 in FIGS. 3A-3B) may send a target SOC to the ground charging subsystem indicating how much charge is required.

In step 907, the thermal conditioning handle is dragged out. For example, a user may take the thermal conditioning handle from the TMS and move it towards the aircraft. In some embodiments, the thermal conditioning subsystem may be configured to detect an aircraft (e.g., via image sensor, motion sensor, weight sensor, any combination of the foregoing, or any other suitable means of detecting an aircraft) and automatically extend or deploy the thermal conditioning handle towards the aircraft.

In some embodiments, the charger handle and the thermal conditioning handle may be two separate components. In other embodiments, the charger handle and the thermal conditioning handle may be two parts of the same component. In some embodiments, the charger handle and thermal conditioning handle may simultaneously be dragged out and attached to the aircraft to simultaneously start the charging process and the thermal conditioning process. In other embodiments, the thermal conditioning handle may first be dragged out and attached to the aircraft prior to the dragging out and attaching of the charging handle to the aircraft.

In step 909, the thermal conditioning handle is attached and thermal conditioning begins (e.g., with reference to FIGS. 3A-3B, is initiated by thermal conditioning subsystem 320, CCU 363, or user interface 365). For example, a user may insert the thermal conditioning handle into the aircraft and begin thermal conditioning. In some embodiments, the thermal conditioning process comprises pumping battery coolant into the aircraft via the TMS. In some embodiments, the user may interact with the thermal conditioning handle or TMS to begin thermal conditioning. In some embodiments, at least one processor associated with a thermal conditioning subsystem may initiate charging based on (e.g., after, in response to, using information from) receiving one or more inputs at a user interface, such as a touchscreen, lever, knob, dial, or switch (e.g., the user may press a button or pull a lever to initiate the dispensing of coolant). Additionally or alternatively, at least one processor may initiate thermal conditioning based on (e.g., after, in response to, according to the constraint of, only after) determining that the thermal conditioning handle is inserted (e.g., has sufficient contact) into the aircraft (e.g., thermal conditioning port). The user interface may be user interface 365 as depicted in FIGS. 3A-3B. Additionally or alternatively, thermal conditioning may begin automatically after the thermal conditioning handle is coupled to the aircraft.

In step 911, thermal conditioning (e.g., coolant) is pumped into the aircraft. For example, fresh coolant may flow into the aircraft via a coolant outlet hose and used coolant may flow out of the aircraft via a coolant inlet hose. In some embodiments, the thermal conditioning subsystem (e.g., the TMS or other device or system) may dispense the coolant according to one or more cooling parameters. For example, charge control unit 923 may send one or more cooling parameters 926 (e.g., coolant flow rate, coolant pressure, coolant temperature, battery temperature) to the TMS indicating how coolant should be dispensed, and the TMS may dispense the coolant based on (e.g., after, using, in response to, constrained by, using information from) the one or more cooling parameters 926.

In step 913, coolant is purged from the aircraft. For aircraft that carry a reduced amount or no coolant onboard during flight, coolant must be purged from the aircraft before takeoff. For aircraft that carry coolant onboard during flight, step 913 may be skipped or abbreviated. In some embodiments, the thermal conditioning subsystem (e.g., the TMS) may be configured to detect or measure an amount of coolant being purged from an aircraft. Further, the thermal conditioning subsystem (e.g., the TMS) may be configured to determine an amount of coolant to be purged from the aircraft (e.g., none, half, all, etc.) and may command one or more pumps to purge that amount of coolant from the aircraft. For example, the thermal conditioning subsystem may determine the amount of coolant to purge via a data structure (e.g., lookup table), user input (e.g., via user interface 365), or any other suitable means.

In step 915, the thermal conditioning subsystem (e.g., the TMS) may stop thermal conditioning and the thermal conditioning handle is detached from the aircraft, for example as described and exemplified further with respect to FIG. 12.

In step 917, the ground charging subsystem may stop charging and the charger handle is detached from the aircraft, for example as described and exemplified further with respect to FIG. 11.

In step 919, the charger handle is pulled away. For example, a user may take the charger handle and return it to the charger. In some embodiments, based on (e.g., after, in response to, using information from) determining that charging has stopped, the ground charging subsystem (e.g., dispenser, charger) may automatically pull away, reel in, or otherwise remove the charger handle from the aircraft.

In step 921, the thermal conditioning handle is pulled away. For example, a user may take the thermal conditioning handle and return it to the TMS. In some embodiments, based on (e.g., after, in response to, using information from) determining that thermal conditioning has stopped, the thermal conditioning subsystem (e.g., the TMS) may automatically pull away, reel in, or otherwise remove the thermal conditioning handle from the aircraft.

FIG. 10 is a block diagram of an exemplary charging and cooling system 1000, consistent with disclosed embodiments. In some embodiments, at least one processor may be configured to perform operations including a charging and cooling algorithm. For example, at least one processor at a vertiport (e.g., GSS 300) may be configured to perform operations for a charging and cooling algorithm. In some embodiments, the charging and cooling algorithm may comprise a charging algorithm and a cooling algorithm, with each algorithm related to, interdependent with, or dependent on the other. In other embodiments, the charging and cooling algorithm may comprise a charging algorithm and a cooling algorithm, with each algorithm independent of the other.

In some embodiments, the at least one processor may be configured to receive input data for a charging and cooling algorithm from one or more of: a flight operations control center, an aircraft, a thermal conditioning subsystem, and a ground charging subsystem. A flight operations control center may refer to a system configured to manage flight data for aircraft. For example, flight operations control center 1001 may include an Integrated Operations Control Center (IOCC), a cloud-based data system, a server, a database, any combination of the foregoing, or any other suitable means of managing flight data for aircraft, including a fleet of aircraft. In some embodiments, the flight operations control center may be located at a location separate from the vertiport. Additionally or alternatively, in some embodiments, the flight operations control center may be located at the vertiport. In some embodiments, the flight operations control center may be configured to send flight data to the at least one processor. For example, flight operations control center 1001 may send flight plan data 1002 to the at least one processor. In some embodiments, charging and cooling system 1000 may implement one or more steps of the processes described herein, such as those discussed with respect to FIGS. 9, 11, and 12.

Flight plan data may refer to any data associated with a flight or aircraft. Flight plan data may include a flight schedule, a flight distance, a flight altitude, a time to departure, a departure time, a location, an aircraft mode, predicted weather, an expected weight, and historical battery data. A flight schedule may refer to a predetermined timetable outlining departure and arrival times of flights for one or more aircraft. A flight distance may refer to a distance traveled by an aircraft between a departure point and an arrival point. A flight altitude may refer to a vertical distance or height between an aircraft and a reference point, typically sea level. A time to departure may refer to a duration of time until a scheduled flight. A departure time may refer to a time of day (e.g., morning, afternoon, evening, etc.) during which a scheduled flight occurs. A location may refer to the physical location of the departure point or the arrival point. An aircraft mode may refer to a mode of flight (e.g., hover flight, forward flight). In some embodiments, flight plan data may include a duration or distance to be covered in each aircraft mode. Predicted weather may refer to a weather forecast for regions the flight is scheduled to fly through. For example, predicted weather may include temperatures, pressures, wind conditions, and precipitation expected throughout the flight. An expected weight may refer to a total expected weight, e.g., based on the number of passengers or an amount of cargo. In some embodiments, the weight of an aircraft may be predicted or measured (e.g., if the aircraft is charging with passengers or cargo on board) by one or more sensors onboard the aircraft and/or of the vertiport, of passengers or cargo to be transported during the flight. Historical battery data may include how much energy has historically been required to complete the flight. For example, in some embodiments, historical battery data may include historical battery consumption of each battery pack on a particular flight path. The historical battery information may further include details on flight modes, weight, and weather, and a processor (e.g., CCU 363) may determine its relevance to the next scheduled flight.

In some embodiments, flight plan data may further include an expected EPU output throughout the flight, e.g., as a unit of power or percentage of max EPU power. In some embodiments, flight plan data may include an expected EPU output for each EPU on an aircraft. For example, one EPU may consume more power during a given flight than another EPU and may therefore require more electric power during the next charging.

In some embodiments, flight plan data (e.g., flight plan data for planned or scheduled flights and/or predicted flights) may be received and analyzed for multiple subsequent flights. For example, a processor (e.g., part of IOCC, vertiport, or aircraft) may be configured to receive and analyze flight plan data. In some embodiments, if an aircraft will take multiple trips without the ability to re-charge, at least one processor may be configured to gather and analyze flight plan data for all subsequent flights to ensure the aircraft has sufficient charge for each trip. In some embodiments, an aircraft may have time to partially re-charge before a subsequent trip. Therefore, flight plan data may include information on the subsequent trip and information on the amount of re-charging that is available between trips. By receiving this information, a processor (e.g., CCU) may ensure that the battery packs have enough charge to support a sufficient portion of the subsequent flight(s). The processor may use the flight plan data to determine a required charge level (e.g., SOC, SOE) required of each battery pack.

In some embodiments, the aircraft may be configured to send aircraft data to the at least one processor. For example, aircraft 1003 may send aircraft data 1004, including indications of battery state and flight plan data.

In some embodiments, the thermal conditioning subsystem may be configured to send cooling data to the at least one processor. For example, thermal conditioning subsystem 1005 may send cooling data 1006, including one or more cooling parameters, such as coolant flow rate, cooling capacity, coolant mass, and/or coolant pressure.

In some embodiments, the ground charging subsystem may be configured to send power data to the at least one processor. Power data may refer to data indicating an amount of electric power a system or device can operate under without risking damage or performance degradation. Power data may include a maximum power capacity of a battery, a dispenser, a charger, a ground charging subsystem, and a vertiport. For example, ground charging subsystem 1007 may send power data 1008, including one or more electric charging parameters, available power capacity for the entire ground charging subsystem 1007, and available power capacity for a single charger, to the at least one processor at a vertiport (e.g., GSS 300).

In some embodiments, the at least one processor may be further configured to output data based on the charging and cooling algorithm. For example, the at least one processor may output data, including a calculated earliest departure time, a digital flag marking aircraft cooling need as optional, and a digital flag marking aircraft charging need as optional. In some embodiments, the earliest departure time may be sent to a flight planning system. Flight planning system 1011 may include at least one processor configured to plan, schedule, or coordinate flights. In some embodiments, the flight planning system may be part of the flight operations control center. In some embodiments, the flight planning system may be cloud-based. In some embodiments, the flight planning system may be configured to generate updated flight plan data. For example, after receiving a calculated earliest departure time, flight planning system 1011 may update or modify a flight schedule to accommodate a delay in departure time associated with the calculated earliest departure time. In some embodiments, the flight planning system may be configured to receive data including the earliest departure time, time at destination, weather, and airspace restrictions. In some embodiments, the flight planning system may be configured to adjust a flight plan for an aircraft based on the received data. Further, in some embodiments, the flight planning system may prepare or determine flight plans for future flights. Future flights may occur flights a day out, a week out, or any other length of time. Further, the flight planning system may involve an algorithm configured to account for irregular flight plans. Irregular flight plans may involve flight plans changed to accommodate any issues that cause a change to regularly scheduled flights. For example, irregular flight plans may be generated in response to a delay at a vertiport, e.g., a delay in charging, a delay in cooling, a delay due to staffing, or any other delay.

Referring to FIGS. 11 and 12, in some embodiments, the charging and cooling algorithm may comprise a separate charging algorithm and a separate cooling algorithm. Generally, it may be understood that process 1100 and process 1200 may be performed by at least one processor. The at least one processor may be part of a ground charging subsystem, a thermal conditioning subsystem, a vertiport, a flight controls operations center, any combination of the foregoing, or any other suitable system associated with the charging and/or cooling of an aircraft. For example, charging and cooling system 1000 may implement one or more steps of in processes 900, 1100, and/or 1200.

In some embodiments, the charging algorithm and cooling algorithm may contain a battery model. The battery model may be a proxy of a more detailed battery model that is a part of the aircraft battery management system.

FIG. 11 illustrates a flow diagram of an exemplary charging process 1100, consistent with disclosed embodiments. In some embodiments, only a portion of the steps of process 1100 may be performed. Moreover, some steps may be repeated, combined, or re-ordered. In some embodiments, process 1100 (e.g., at least one device implementing the process, including GSS 300, ground charging subsystem 310, CCU 363) may not proceed to one step until completing or attempting a preceding step.

In step 1101, the at least one processor may determine one or more electric charging parameters. For example, the at least one processor may determine a charge rate schedule based on indications of battery state and flight plan data received from an aircraft (e.g., via wired connection, wirelessly). The charge rate schedule may include charging a battery to a target SOC or SOE within a target timeframe. In some embodiments, the charge rate schedule may comprise a charging protocol profile as detailed above with respect to FIGS. 5A-5I. Further, the at least one processor may estimate an amount of heat generation associated with charging the battery according to the determined charge rate schedule. The estimation may further be based on a battery model and historical charging data. Additionally or alternatively, the at least one processor may receive data from the aircraft indicating a battery SOT and may use the received data in place of or in conjunction with the estimated amount of heat generation.

In step 1103, the at least one processor may determine if the determined charge rate schedule is sufficient to reach the target SOC. Additionally or alternatively, in step 1103, the at least one processor may determine if the ground charging subsystem has sufficient charging capacity.

In step 1107, based on (e.g., after, in response to, using information from) determining that the one or more conditions from step 1103 are not satisfied, the at least one processor may calculate the earliest departure time and send the earliest departure time to the flight planning system to adjust the flight plan. Then charging may continue according to the calculated earliest departure time.

In step 1105, based on (e.g., after, in response to, using information from) determining that the one or more conditions from step 1103 are satisfied, the at least one processor may determine if charging will be finished earlier than a determined thermal conditioning schedule.

In step 1109, if the at least one processor determines that the determined charge rate schedule will be finished earlier than the thermal conditioning schedule, then the at least one processor may adjust the target time for completion to the time when thermal conditioning is estimated to be finished. In some embodiments, the at least one processor may adjust the charge rate to accommodate the adjustment in the target time. The adjustment may involve a decrease of charge rate or switching charge mode to a slow charge mode.

In step 1111, based on (e.g., after, in response to, using information from) determining that the charge rate schedule will not finish before the thermal conditioning schedule, the at least one processor may start charging the batteries onboard the aircraft.

In step 1113, the at least one processor may periodically check if the energy level of the battery is greater than or equal to a minimum target energy (SOC or SOE). The at least one processor may perform this check at a regular time interval (e.g., every 1, 5, 15, 30, or 60 seconds). In loop 1114, the at least one processor may continue charging until the energy level of the battery is greater than or equal to the minimum target energy (SOC or SOE). In some embodiments, the at least one processor may be configured to modify the charge rate schedule while charging. For example, while charging a first aircraft during loop 1114, the ground charging subsystem may receive aircraft data from a second aircraft. The ground charging subsystem may then interrupt or modify the charge rate schedule to accommodate the second aircraft. The modification may be based at least in part on aircraft data from the first aircraft, aircraft data from the second aircraft, one or more electric charging parameters, and available charging capacity.

In step 1114, based on (e.g., after, in response to, using information from) determining that the energy level of the battery is greater than or equal to the target energy, the at least one processor may optionally set a digital flag indicating that further aircraft charging is not necessary.

In step 1115, based on (e.g., after, in response to, using information from) determining that the minimum target energy (SOC or SOE) is reached, the at least one processor may determine if there is charging capacity available at the charger for the aircraft. Further, in step 1115, based on (e.g., after, in response to, using information from) determining that the minimum target energy (SOC or SOE) is reached, the at least one processor may set a digital flag indicating that further charging is not necessary. For example, if a first aircraft has charged to its target SOE and there is a second aircraft that has not charged to its target SOE, the at least one processor may prioritize charging the second aircraft.

In response to (e.g., after) step 1115, if the at least one processor determines that is not charging capacity available, the at least one processor may stop charging. For example, if an aircraft has charged to its target SOE and there is not any available charging capacity remaining, the at least one processor may stop charging the aircraft.

In step 1117, if the at least one processor determines that there is charging capacity available, the at least one processor may check if the SOE is within epsilon of the max energy. Epsilon may refer to a limit past which the battery cannot be charged or should not be charged because it may, for example, negatively impact the battery's long-term health. In some embodiments, epsilon may be determined by an algorithm using historical battery data. Additionally or alternatively, in some embodiments, epsilon may be determined by a pilot of an aircraft and may be manually set. Further, in some embodiments, epsilon may be ignored, and charging may continue past epsilon. In some embodiments, the at least one processor may perform step 1117 at a regular interval (e.g., every 15, 30, or 60 seconds).

In some embodiments, in step 1117, the at least one processor may be configured to determine if an indication of battery state (e.g., SOE, SOC) is within a range defined by a respective epsilon. For example, if the at least one processor determines that the SOE is not within epsilon of the max energy, the at least one processor may determine to continue charging until the SOE is within epsilon of the max energy. Additionally or alternatively, the at least one processor may be configured to determine if SOC is within epsilon of the max charge capacity.

In some embodiments, the at least one processor may loop between checking the conditions of step 1115 and step 1117 and may determine to continue charging the aircraft until the respective condition is satisfied.

In step 1119, the at least one processor may stop charging the aircraft based on (e.g., after, in response to, using information from) determining the conditions of step 1115 or step 1117 are satisfied. For example, based on (e.g., after, in response to, using information from) determining that there is no more available charging capacity, the at least one processor (e.g., ground charging subsystem 310, CCU 363) may stop the flow of electric power to the aircraft.

FIG. 12 illustrates a flow diagram of an exemplary cooling process 1200, consistent with disclosed embodiments. In some embodiments, only a portion of the steps of process 900 may be performed. Moreover, some steps may be repeated, combined, or re-ordered. In some embodiments, process 900 (e.g., at least one device implementing the process, including GSS 300, thermal conditioning subsystem 320, CCU 363) may not proceed to one step until completing or attempting a preceding step.

In step 1201, the at least one processor may determine one or more cooling parameters. For example, the at least one processor may determine one or more cooling parameters (e.g., cooling schedule, coolant flow rate, target temperature) based at least on heat generation data. The at least one processor may determine the one or more cooling parameters to cool the batteries of the aircraft to maximum temperature before a departure time. In some embodiments, the at least one processor may determine one or more cooling parameters based on an indication of battery state. For example, the at least one processor may receive, from a sensor (e.g., temperature sensor), an indication of battery state (e.g., SOT) and may determine based on the received indication if one or more batteries require thermal conditioning (e.g., heating, cooling). In such embodiments, the aircraft may be charging or may be not charging (e.g., idling).

In step 1203, the at least one processor may determine if the available cooling capacity is sufficient to achieve the determined cooling schedule. For example, the at least one processor may communicate with the thermal conditioning subsystem to determine the available cooling capacity.

In step 1207, based on (e.g., after, in response to, using information from) determining the available cooling capacity is insufficient, the at least one processor may calculate an earliest departure time. Then cooling may proceed according to the calculated earliest departure time.

In step 1207, based on (e.g., after, in response to, using information from) determining that the available cooling capacity is sufficient, the at least one processor may start thermal conditioning of the aircraft battery.

In step 1209, the at least one processor may determine if the battery temperature is below a maximum temperature. In some embodiments, during charging, the cooling algorithm may check if the aircraft battery temperature is greater than the maximum temperature. The at least one processor may perform this check at a regular time interval (e.g., every 1, 2, 5, 10, 15, 20, 25, 30, 45, or 60 seconds). Cooling may continue until the temperature is less than or equal to the maximum temperature.

In step 1212, based on (e.g., after, in response to, using information from) determining that the aircraft battery temperature is less than or equal to the maximum temperature, the at least one processor may optionally set a digital flag indicating that further aircraft cooling is not necessary.

In step 1211, based on (e.g., after, in response to, using information from) determining that the aircraft battery temperature is less than or equal to the maximum temperature, the at least one processor may determine if cooling capacity is available.

In response to determining that cooling capacity is not available, the at least one processor may stop thermal conditioning.

In step 1213, based on (e.g., after, in response to, using information from) determining that cooling capacity is available, the at least one processor may check if the battery temperature is within epsilon of a minimum temperature. Epsilon may refer to a temperature limit below which the aircraft battery cannot function, may function poorly, or may become damaged.

In some embodiments, the at least one processor may loop between checking the conditions of step 1211 and step 1213 and may continue cooling the aircraft until the respective condition is satisfied. In some embodiments, the at least one processor may be configured to modify a thermal conditioning plan while cooling. For example, while cooling a first aircraft during loop 1210, the thermal conditioning subsystem may receive aircraft data from a second aircraft. The ground charging subsystem may then interrupt or modify the thermal conditioning plan to accommodate the second aircraft. The modification may be based at least in part on aircraft data from the first aircraft, aircraft data from the second aircraft, one or more cooling parameters, and available cooling capacity.

In step 1215, the at least one processor may stop thermal conditioning the aircraft battery based on (e.g., after, in response to, using information from) determining the conditions of step 1211 or step 1213 are satisfied. For example, in response to determining that there is no more available cooling capacity, the at least one processor (e.g., thermal conditioning subsystem 320, CCU 363) may stop the flow of coolant to the aircraft.

FIG. 13 illustrates a block diagram of an exemplary charging and cooling system network 1300, consistent with disclosed embodiments. Charging and cooling system network 1300 may include the same or similar elements to charging and cooling system 1000. For example, charging and cooling system network 1300 may comprise a flight operations control center 1301, one or more vertiports 1303, and one or more aircrafts 1305. In some embodiments, the flight operations control center 1301 may transmit, receive, and coordinate flight plan data, one or more electric charging parameters, and/or one or more cooling parameters for a plurality of vertiports 1303 and aircrafts 1305. For example, flight operations control center 1301 may send flight plan data (e.g., forecasted flight schedule, realized flight schedule) associated with a plurality of aircrafts 1305 (e.g., a fleet of aircrafts 1305) to a plurality of vertiports 1303. Vertiports 1303 may use the received flight plan data to determine one or more electric charging parameters and/or one or more cooling parameters. For example, a first aircraft may be charging at a first vertiport and has a scheduled flight in 2 hours. The first vertiport may receive flight plan data indicating a second aircraft will land at the first vertiport with an estimated 30% SOC and a subsequent flight in 15 minutes requiring 85% SOC. Once the second aircraft lands at the first vertiport, the first vertiport may automatically prioritize charging the second aircraft (e.g., allocating more of the available charging capacity) and deprioritize charging the first aircraft to minimize or prevent a delay. Charging for one or more aircraft (e.g., at one or more vertiports) may be changed (e.g., switched between fast and slow charging, or any charge or voltage change) based on (e.g., after, in response to, using information from) dynamically changing flight information (e.g., actual and/or predicted flight information).

As an additional example, a first aircraft may have a flight schedule including flying from a first vertiport to a second vertiport and then flying from the second vertiport to a third vertiport. Flight operations control center 1301 may share available charging capacity data between the first vertiport, second vertiport, and third vertiport. If the second vertiport has minimal available charging capacity while the first and third vertiports have abundant available charging capacity, the first vertiport may determine that the first aircraft should be charged to an SOC or SOE capable of completing both flights based on the data indicating that the second vertiport has minimal available charging capacity. In general, a vertiport may make similar determinations with respect to thermal conditioning of aircraft.

Additional aspects of the present disclosure may be further described via the following clauses:

1. A method of charging an aircraft, the method comprising:
    receiving a mode of operation indicating whether battery packs of the aircraft are connected in parallel prior to joining a charging bus;
    receiving charging protocol information; and
    controlling charging operations of the battery packs based on the mode of operation and the charging protocol information.
2. The method of clause 1, wherein the received mode of operation indicates a user selection between a first mode indicating that the battery packs are not connected in parallel prior to joining the charging bus and a second mode indicating that the battery packs are connected in parallel prior to joining the charging bus.
3. The method of clause 1 or 2, wherein controlling charging operations comprises: connecting at least a portion of the battery packs to the charging bus one at a time, beginning with the lowest voltage battery pack, when the received mode of operations indicates the battery packs are not connected in parallel prior to joining the charging bus.
4. The method of any one of clauses 1-3, wherein controlling charging operations comprises:
    connecting at least a portion of the battery packs on the charging bus in sets of connected battery packs, beginning with a battery pack set with the lowest voltage, when the received mode of operation indicates the battery packs are connected in parallel prior to joining the charging bus.
5. The method of any one of clauses 1-4, wherein controlling charging operations comprises:
    connecting at least one of the battery packs to the charging bus when the at least one battery pack is within a threshold voltage of a battery pack already connected to the charging bus.
6. The method of clause 5, wherein connecting the at least one battery pack to the charging bus comprises connecting multiple battery packs to the charging bus when each of the multiple battery packs is within the threshold voltage.
7. The method of any one of clauses 1-6, wherein controlling charging operations comprises:
    disconnecting a battery pack from the charging bus in response to determining that the battery pack reached a target state of charge.
8. The method of any one of clauses 1-7, wherein controlling charging operations comprises:
    disconnecting a connected set of battery packs from the charging bus once each battery pack in the connected set reaches a respective target state of charge, when the received mode of operation indicates the battery packs are connected in parallel prior to joining the charging bus.
9. The method of any one of clauses 1-8, wherein controlling charging operations comprises:
    connecting all battery packs that are within a threshold voltage to the charging bus, beginning with the battery pack at the lowest voltage, prior to charging the battery packs;
    charging the battery packs connected to the charging bus to within a threshold voltage of at least one battery pack remaining disconnected from charging bus; and connecting the at least one remaining battery pack to the charging bus.
10. The method of any one of clauses 1-9, wherein the received mode indicates whether the battery packs are connected to low voltage loads prior to joining the charging bus.
11. The method of clause 10, wherein controlling the charging operations comprises: controlling charging of the battery packs in consideration of the charge lost to the low voltage loads when the received mode of operation indicates the battery packs are connected to the low voltage loads.

12. The method of any one of clauses 1-11, further comprising:
    wherein the received mode of operation is from a user input device comprising at least one of: a switch, knob, button, lever, or display.
13. The method of clause 12, wherein the user input device is located in a pilot cockpit.
14. The method of any one of clauses 1-13, wherein the charging protocol information includes at least one of: an energy target for a battery pack, C-rate target for a battery pack, or time allotted for charging.
15. The method of any one of clauses 1-14, wherein the charging protocol information includes different energy targets for at least two of the battery packs.
16. The method of clause 15, wherein the different energy targets are based on flight information.
17. The method of any one of clauses 1-16,
    wherein a charging profile for charging the battery packs is developed based on the charging protocol information, the charging profile including a charge rate and time for charging at the charge rate; and
    wherein controlling charging operations of the battery packs is based on the charging profile.
18. The method of any one of clauses 1-17, wherein the charging protocol information includes at least one of: an electrical limit of a charging port, a limit of a battery pack contactor, a battery pack thermal limit, or a limit established based on information received from other aircraft.
19. The method of any one of clauses 1-18, wherein:
    charging protocol information includes at least one battery pack limit; and
    controlling the charging operations comprises monitoring a current into each of the battery packs and regulating a commanded charge to ensure the at least one battery pack limit is not exceeded.
20. The method of any one of clauses 1-19, wherein:
    charging protocol information includes at least one battery pack temperature limit; and
    controlling the charging operations comprises monitoring a temperature of each battery pack and sending a coolant command to ensure the at least one battery pack temperature limit is not exceeded,
    wherein the coolant command controls at least one of: a coolant flow rate, coolant pressure, or coolant temperature.
21. The method of any one of clauses 1-20, further comprising:
    receiving the charging protocol information from a user device,
    wherein the user input device comprises at least one of: a switch, a knob, a button, a lever, or a display.
22. The method of any one of clauses 1-21, further comprising:
    wherein the received mode of operation is from a first user input device mounted to a body of the aircraft or a second user input device in a pilot cockpit.
23. The method of clause 22, wherein the first user input device is configured to receive the charging protocol information when the second user input device is powered off.
24. The method of any one of clauses 1-23, wherein controlling charging operations comprises commanding a charge rate from a ground charging station via a wired or wireless connection.
25. The method of any one of clauses 1-24, wherein controlling charging operations comprises commanding, via a wired or wireless connection, a coolant flow rate or pressure from a ground charging station to regulate the temperature of the battery packs during the charging operations.
26. A charging control system for an aircraft comprising at least one processor configured to execute instructions to cause the system to perform the method of any one of clauses 1-25.
27. An aircraft comprising the control system of clause 26.
28. A computer-readable medium storing instructions which, when executed by at least one processor, cause the at least one processor to perform the method of any one of clauses 1-25.
29. A charging system for an aircraft, comprising:
    a communication connection to a ground charging station;
    a first user input device on a fuselage of the aircraft;
    a second user input device in a pilot cockpit of the aircraft; and
    a control unit mounted in the aircraft and in communication with a battery management system within the aircraft, the ground charging station, and the first and second user input devices,
    wherein the control unit is configured to control charging commands to the ground charging station based on information received from the battery management system, the ground charging station, the first user input device, and the second user input device.
30. The charging system of clause 29, wherein the communication connection to the ground charging station is a wired connection.
31. The charging system of clause 29, wherein the communication connection to the ground charging station is a wireless connection.
32. The charging system of any one of clauses 29-31,
    further comprising the ground charging station, wherein the ground charging station includes a connection to an electric grid charger or dispenser; and
    wherein controlling the charging comprises controlling a charge provided by the ground charging station from the electric grid or the dispenser.
33. The charging system of any one of clauses 29-32,
    further comprising the ground charging station, wherein the ground charging station comprises a communication connection to receive information on an operation of another aircraft; and
    wherein controlling the charging comprises controlling a charge provided by the ground charging station based on the information on operation of another aircraft.
34. The charging system of any one of clauses 29-33
    wherein the first user input device is at least one of: a display screen, button, knob, switch, or lever; and
    wherein the second user input device is at least one of: a display screen, button, knob, switch, or lever.
35. The charging system of any one of clauses 29-34, wherein the information received from the first user input and second user input devices comprise charging protocol information.
36. The charging system of any one of clauses 29-35,
    wherein the information received from at least one of the first or second user input devices comprises a preset charging protocol option selected from a list of present charging protocol options.

37. The charging system of any one of clauses 29-36, wherein the information received from the ground charging station comprises at least one of: a charging availability or a cooling ability of the ground charging station.
38. The charging system of any one of clauses 29-37, wherein controlling charging commands to the ground charging station comprises controlling at least one of: a commanded voltage, current, power, coolant flow, coolant pressure, or coolant temperature.
39. A method for charge control coordination, comprising:
    receiving an indication of a battery state associated with a battery aboard a first aircraft;
    receiving flight plan data associated with the first aircraft;
    determining one or more electric charging parameters for the first aircraft based on the received indication and the flight plan data; and
    charging the battery according to the one or more determined electric charging parameters.
40. The method of clause 39, wherein the indication of a battery state includes one or more of:
    a battery state of energy;
    a battery state of charge;
    a battery state of temperature; or
    a battery state of health.
41. The method of clause 39 or 40, wherein the flight plan data includes one or more of:
    a flight schedule;
    a flight distance;
    an altitude;
    a time to departure;
    a departure time;
    a location;
    an aircraft mode;
    predicted weather;
    an expected weight; or
    historical battery data.
42. The method of any one of clauses 39-41, wherein the one or more electric charging parameters include one or more of:
    a charging time;
    a charging rate;
    a charging current;
    a charging voltage;
    a charging power;
    a charging mode;
    a charging capacity;
    a target battery state of charge; or
    a target battery state of energy.
43. The method of clause 42, wherein the charging mode includes:
    a fast charge mode; or
    a slow charge mode.
44. The method of clause 42 or 43, wherein charging the battery includes switching the charging mode to another charging mode.
45. The method of clause 44, wherein switching the charging mode is based on one or more of:
    a change in flight plan data; and
    the indication of the battery state.
46. The method of any one of clauses 39-45, wherein determining the one or more electric charging parameters is further based on an optimization of battery health and a departure time.
47. The method of any one of clauses 39-46, further comprising:
    receiving an indication of a battery state associated with a battery aboard a second aircraft;
    receiving flight plan data associated with the second aircraft; and
    determining one or more electric charging parameters for the second aircraft,
    wherein the indication of the battery state and flight plan data associated with the first aircraft affects the determined one or more electric charging parameters of the second aircraft.
48. The method of clause 47, further comprising:
    setting one or more digital flags associated with the first aircraft or the second aircraft based on the corresponding indication of the battery state; and
    prioritizing charging one aircraft based on one or more of: the indication of the battery state, the flight plan data, or the one or more digital flags associated with each aircraft.
49. The method of clause 48, wherein the one or more digital flags are set based on the corresponding aircraft reaching the target battery state of energy.
50. The method of clause 48 or 49, further comprising:
    deprioritizing charging each aircraft associated with the one or more set digital flags; and
    allocating power to charge each aircraft associated with the one or more set digital flags after determining that all other aircrafts are also associated with the one or more set digital flag.
51. The method of any one of clauses 39-50, further comprising:
    sending data to one or more of: a vertiport, a flight operations control center, a database, a server, the aircraft, or a cloud-based system;
    receiving data from one or more of: a vertiport, a flight operations center, a database, a server, the aircraft, or a cloud-based system; and
    determining the one or more electric charging parameters based on the received data.
52. The method of any one of clauses 39-51, wherein determining the one or more electric charging parameters is further based on power data associated with the first aircraft, the second aircraft, or a charger.
53. The method of clause 52, wherein the power data includes one or more of:
    a maximum power capacity of the charger; and
    a maximum power capacity of the battery aboard the first aircraft or the second aircraft.
54. The method of any one of clauses 39-53, further comprising:
    allocating power to a charger based on an estimated load.
55. The method of any one of clauses 39-54, further comprising:
    determining one or more cooling parameters for the first aircraft or the second aircraft based on the received indication and the flight plan data; and
    cooling the battery aboard the first aircraft or the second aircraft according to the corresponding one or more determined cooling parameters.
56. The method of clause 55, further comprising:
    determining updated flight plan data associated with the first aircraft or the second aircraft based on the corresponding one or more determined electric charging parameters and the corresponding one or more determined cooling parameters.

57. The method of clause 56, further comprising:
  determining one or more updated electric charging parameters associated with the first aircraft or the second aircraft based on the updated flight plan data.
58. A charging control coordination system for an aircraft comprising at least one processor configured to execute instructions to cause the system to perform the method of any one of clauses 39-57.
59. A computer-readable medium storing instructions which, when executed by at least one processor, cause the at least one processor to perform the method of any one of clauses 39-57.
60. A method for aircraft thermal conditioning control coordination, comprising:
  receiving an indication of a battery state associated with a battery aboard a first aircraft;
  receiving flight plan data associated with the first aircraft;
  determining one or more cooling parameters for the first aircraft based on the received indication and the flight plan data; and
  thermally regulating the battery according to the one or more determined cooling parameters.
61. The method of clause 60, wherein the indication of a battery state includes one or more of:
  a battery state of energy;
  a battery state of charge;
  a battery state of health; or
  a battery state of temperature.
62. The method of clause 60 or 61, wherein the flight plan data includes one or more of:
  a flight schedule;
  a flight distance;
  an altitude;
  a time to departure;
  a departure time;
  a location;
  an aircraft mode;
  predicted weather;
  an expected weight; or
  historical battery data.
63. The method of any one of clauses 60-62, wherein the one or more cooling parameters include one or more of:
  a coolant flow rate;
  a coolant pressure;
  a coolant temperature;
  a cooling capacity; or
  a target battery temperature.
64. The method of any one of clauses 60-63, further comprising:
  receiving an indication of a battery state associated with a battery aboard a second aircraft;
  receiving flight plan data associated with the second aircraft;
  determining one or more cooling parameters for the second aircraft based on the received indication and the flight plan data; and
  determining one or more cooling parameters for the second aircraft,
  wherein the indication of the battery state and the flight plan data associated with the first aircraft affects the determined one or more cooling parameters of the second aircraft.
65. The method of clause 64, further comprising:
  setting one or more digital flags associated with the first aircraft or the second aircraft based on a state of the battery pack of the corresponding aircraft; and
  prioritizing thermal conditioning of one aircraft based on one or more of: the indication of the battery state, the flight plan data, or the one or more set digital flags associated with each aircraft.
66. The method of clause 65, wherein the one or more digital flags are set based on the corresponding aircraft reaching the target battery temperature.
67. The method of clause 65 or 66, further comprising:
  deprioritizing thermal conditioning of each aircraft associated with the one or more set digital flags; and
  allocating coolant for thermal conditioning of each aircraft associated with the one or more set digital flags after determining that all other aircrafts are also associated with the one or more set digital flags.
68. The method of any one of clauses 60-67, further comprising:
  sending data to one or more of: a vertiport, a flight operations center, a database, a server, the aircraft, or a cloud-based system;
  receiving data from one or more of: a vertiport, a flight operations control center, a database, a server, the aircraft, or a cloud-based system; and
  determining the one or more cooling parameters for the first aircraft or the second aircraft based on the received data.
69. The method of any one of clauses 60-68, further comprising:
  determining updated flight plan data for the first aircraft or the second aircraft based on the corresponding one or more determined cooling parameters.
70. The method of any one of clauses 60-69, further comprising:
  determining one or more updated cooling parameters for the first aircraft or the second aircraft based on the corresponding updated flight plan data.
71. A thermal conditioning control coordination system for an aircraft comprising at least one processor configured to execute instructions to cause the system to perform the method of any one of clauses 60-70.
72. A computer-readable medium storing instructions which, when executed by at least one processor, cause the at least one processor to perform the method of any one of clauses 60-70.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The invention claimed is:

1. A method of charging an aircraft, the method comprising:
    receiving a mode of operation indicating whether battery packs of the aircraft are connected in parallel prior to joining a charging bus;
    receiving charging protocol information; and
    controlling charging operations of the battery packs based on the mode of operation and the charging protocol information.

2. The method of claim 1, wherein the received mode of operation indicates a user selection between a first mode indicating that the battery packs are not connected in parallel prior to joining the charging bus and a second mode indicating that the battery packs are connected in parallel prior to joining the charging bus.

3. The method of claim 1, wherein controlling charging operations comprises:
    connecting at least a portion of the battery packs to the charging bus one at a time, beginning with the lowest voltage battery pack, when the received mode of operations indicates the battery packs are not connected in parallel prior to joining the charging bus.

4. The method of claim 1, wherein controlling charging operations comprises:
    connecting at least a portion of the battery packs on the charging bus in sets of connected battery packs, beginning with a battery pack set with the lowest voltage, when the received mode of operation indicates the battery packs are connected in parallel prior to joining the charging bus.

5. The method of claim 1, wherein controlling charging operations comprises:
    connecting at least one of the battery packs to the charging bus when the at least one battery pack is within a threshold voltage of a battery pack already connected to the charging bus.

6. The method of claim 5, wherein connecting the at least one battery pack to the charging bus comprises connecting multiple battery packs to the charging bus when each of the multiple battery packs is within the threshold voltage.

7. The method of claim 1, wherein controlling charging operations comprises:
    disconnecting a battery pack from the charging bus in response to determining that the battery pack reached a target state of charge.

8. The method of claim 1, wherein controlling charging operations comprises:
    disconnecting a connected set of battery packs from the charging bus once each battery pack in the connected set reaches a respective target state of charge, when the received mode of operation indicates the battery packs are connected in parallel prior to joining the charging bus.

9. The method of claim 1, wherein controlling charging operations comprises:
    connecting all battery packs that are within a threshold voltage to the charging bus, beginning with the battery pack at the lowest voltage, prior to charging the battery packs;
    charging the battery packs connected to the charging bus to within a threshold voltage of at least one battery pack remaining disconnected from charging bus; and
    connecting the at least one remaining battery pack to the charging bus.

10. The method of claim 1, wherein the received mode indicates whether the battery packs are connected to low voltage loads prior to joining the charging bus.

11. The method of claim 10, wherein controlling the charging operations comprises:
    controlling charging of the battery packs in consideration of the charge lost to the low voltage loads when the received mode of operation indicates the battery packs are connected to the low voltage loads.

12. The method of claim 1, further comprising:
    wherein the received mode of operation is from a user input device comprising at least one of: a switch, knob, button, lever, or display.

13. The method of claim 12, wherein the user input device is located in a pilot cockpit.

14. The method of claim 1, wherein the charging protocol information includes at least one of: an energy target for a battery pack, C-rate target for a battery pack, or time allotted for charging.

15. The method of claim 1, wherein the charging protocol information includes different energy targets for at least two of the battery packs.

16. The method of claim 15, wherein the different energy targets are based on flight information.

17. The method of claim 1,
    wherein a charging profile for charging the battery packs is developed based on the charging protocol information, the charging profile including a charge rate and time for charging at the charge rate; and
    wherein controlling charging operations of the battery packs is based on the charging profile.

18. The method of claim 1, wherein the charging protocol information includes at least one of: an electrical limit of a charging port, a limit of a battery pack contactor, a battery pack thermal limit, or a limit established based on information received from other aircraft.

19. The method of claim 1, wherein:
    charging protocol information includes at least one battery pack limit; and
    controlling the charging operations comprises monitoring a current into each of the battery packs and regulating a commanded charge to ensure the at least one battery pack limit is not exceeded.

20. The method of claim 1, wherein:
    charging protocol information includes at least one battery pack temperature limit; and
    controlling the charging operations comprises monitoring a temperature of each battery pack and sending a coolant command to ensure the at least one battery pack temperature limit is not exceeded,
    wherein the coolant command controls at least one of: a coolant flow rate, coolant pressure, or coolant temperature.

21. The method of claim 1, further comprising:
receiving the charging protocol information from a user input device,
wherein the user input device comprises at least one of: a switch, a knob, a button, a lever, or a display.

22. The method of claim 1, further comprising:
wherein the received mode of operation is from a first user input device mounted to a body of the aircraft or a second user input device in a pilot cockpit.

23. The method of claim 22, wherein the first user input device is configured to receive the charging protocol information when the second user input device is powered off.

24. The method of claim 1, wherein controlling charging operations comprises commanding a charge rate from a ground charging station via a wired or wireless connection.

25. The method of claim 1, wherein controlling charging operations comprises commanding, via a wired or wireless connection, a coolant flow rate or pressure from a ground charging station to regulate a temperature of the battery packs during the charging operations.

26. A charging control system for an aircraft comprising at least one processor configured to execute instructions to cause the system to:
receive a mode of operation indicating whether battery packs of the aircraft are connected in parallel prior to joining a charging bus;
receive charging protocol information; and
control charging operations of the battery packs based on the mode of operation and the charging protocol information.

27. A non-transitory computer-readable medium storing instructions which, when executed by at least one processor, cause the at least one processor to:
receive a mode of operation indicating whether battery packs of an aircraft are connected in parallel prior to joining a charging bus;
receive charging protocol information; and
control charging operations of the battery packs based on the mode of operation and the charging protocol information.

* * * * *